(12) United States Patent
Papadakis

(10) Patent No.: US 12,534,701 B2
(45) Date of Patent: *Jan. 27, 2026

(54) MICROBIAL STRAIN EXPRESSING AN INVERTASE/SUCROSE HYDROLASE

(71) Applicant: DSM IP Assets B.V., Heerlen (DK)

(72) Inventor: Manos Papadakis, Hørsholm (DK)

(73) Assignee: DSM IP Assets B.V., Heerlen (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/561,246

(22) PCT Filed: May 17, 2022

(86) PCT No.: PCT/EP2022/063314
§ 371 (c)(1),
(2) Date: Nov. 15, 2023

(87) PCT Pub. No.: WO2022/243311
PCT Pub. Date: Nov. 24, 2022

(65) Prior Publication Data
US 2025/0101371 A1 Mar. 27, 2025

(30) Foreign Application Priority Data

May 17, 2021 (DK) .............................. PA 202170248
Mar. 25, 2022 (DK) .............................. PA 202270138

(51) Int. Cl.
| | |
|---|---|
| C12N 1/20 | (2006.01) |
| C12N 9/12 | (2006.01) |
| C12N 9/24 | (2006.01) |
| C12P 19/04 | (2006.01) |
| C12R 1/19 | (2006.01) |

(52) U.S. Cl.
CPC ............. *C12N 1/20* (2013.01); *C12N 9/1205* (2013.01); *C12N 9/2402* (2013.01); *C12P 19/04* (2013.01); *C12N 2500/34* (2013.01); *C12R 2001/19* (2021.05); *C12Y 302/01026* (2013.01)

(58) Field of Classification Search
CPC ............................ C12N 9/2402; C12N 9/1205
See application file for complete search history.

(56) References Cited

U.S. PATENT DOCUMENTS

| | | |
|---|---|---|
| 2012/0171719 A1 | 7/2012 | Hong et al. |
| 2017/0175154 A1 | 6/2017 | Samain et al. |
| 2019/0119314 A1 | 4/2019 | Chassagne et al. |

FOREIGN PATENT DOCUMENTS

| | | |
|---|---|---|
| CN | 110669747 | 1/2020 |
| DK | 202270138 | 11/2022 |
| EP | 0402226 | 12/1990 |
| EP | 2227541 | 6/2013 |
| WO | WO 0104341 | 1/2001 |
| WO | WO 2009078687 | 6/2009 |
| WO | WO 2010070104 | 6/2010 |
| WO | WO 2010142305 | 12/2010 |
| WO | WO 2011150411 | 1/2011 |
| WO | WO 2012007481 | 1/2012 |
| WO | WO 2012112777 | 8/2012 |
| WO | WO 2013182206 | 12/2013 |
| WO | WO 2014048439 | 4/2014 |
| WO | WO 2014067696 | 5/2014 |
| WO | WO 2015188834 | 12/2015 |
| WO | WO 2015197082 | 12/2015 |
| WO | WO 2016040531 | 3/2016 |
| WO | WO 2016095924 | 6/2016 |
| WO | WO 2017042382 | 3/2017 |
| WO | WO 2017152918 | 9/2017 |
| WO | WO 2017182965 | 10/2017 |
| WO | WO 2019123324 | 6/2019 |
| WO | WO 2020255054 | 12/2020 |

OTHER PUBLICATIONS

UniProt A0A379AWT7; Sucrose-6-Phosphate Hydrolase (ScrB), deposited Nov. 2018. Retrieved from < https://www.uniprot.org/uniprotkb/A0A379AWT7/entry > on Jan. 21, 2025.*
Engels et al., "ScrB (Cg2927) is a sucrose-6-phosphate hydrolase essential for sucrose utilization by Corynebacterium glutamicum", Fed. Eurpoean Micro. Soc., 2008, vol. 289, pp. 80-89.*
Altschul et al. Nucl. Acids Res. 25, 3389 (1997).
Bruschi et al., Biotechnol. Adv. 30, 1001 (2012).
Bych et al. Current Opinion in Biotechnology, 2019, 56:130-137.
Carrol et al., Applied and Environmental Microbiology, 2005, 3077-3084.
Chen Adv. Carbohydr. Chem. Biochem. 72, 113 (2015).
Drouillard et al. Angew. Chem. Int. Ed. 45, 1778 (2006).
Dumont et al. Crit Rev Biotechnol 36(6): 1110-1122 (2016).
Fort et al. Chem. Comm. 2558 (2005).
GenBank, "acylneuraminate cytidylyltransferase family protein [Vibrio brasiliensis]", Accession No. WP_006881452.1, Mar. 26, 2023.
GenBank, "CMP-Neu5Ac synthetase [Campylobacter jejuni]", Accession No. AAK91728.1, Jul. 23, 2016.
GenBank, "E. coli gene lacZ coding for beta-galactosidase (EC 3.2.1.23)", Accession No. V00296.1 (GI:41901), Jul. 26, 2016.

(Continued)

Primary Examiner — Suzanne M Noakes
(74) Attorney, Agent, or Firm — Neal, Gerber & Eisenberg LLP

(57) ABSTRACT

The present disclosure relates to a genetically modified cell capable of utilizing sucrose as energy and carbon source following the expression of a single heterologous enzyme, which upon expression is translocated from the cytosol and which is capable of hydrolysing non-phosphorylated sucrose into fructose and glucose.
The identification of efficient enzymes capable of hydrolysing sucrose in its non-modified form, and which on its own enable the cell to utilize sucrose as a, or as the main and/or sole, carbon and/or energy source, i.e., without the need for multi-gene sucrose utilizing systems comprising several other heterologous polypeptides, such as other enzymes and/or transporters, is highly advantageous, since it allows for cost-effective use of sucrose in large scale production processes.

20 Claims, 4 Drawing Sheets

Specification includes a Sequence Listing.

(56) References Cited

OTHER PUBLICATIONS

GenBank, "*Escherichia coli nanA* gene for N-acetylneuraminate lyase, complete cds", Accession No. D00067.1 (GI216588), Jun. 15, 2010.
GenBank, "Major facilitator superfamily MFS_1 [Yersinia bercovieri ATCC 43970]", Accession No. EEQ08298.1., Jun. 1, 2009.
GenBank, "MFS transporter [Rosenbergiella nectarea]", Accession No. WP_092672081.1., Aug. 26, 2023.
GenBank, "MFS transporter [Rouxiella badensis]", Accession No. WP_017489914.1., Aug. 30, 2023.
GenBank, "Multispecies: MFS transporter [Pantoea]", Accession No. WP_048785139.1, Aug. 31, 2023.
GenBank, "Multispecies: sugar efflux transporter [Serratia]", Accession No. WP_060448169.1., Feb. 28, 2022.
GenBank, "putative N-acetylmannosamine-6-phosphate 2-epimerase [*Escherichia coli* str. K-12 substr. MG1655]", Gene ID: 947745.
GenBank, "N-acetylneuraminate synthase [Flavobacterium limnosediminis]", Accession No. WP 023580510.1, Jun. 1, 2019.
GenBank, "predicted N-acetylmannosamine kinase [*Escherichia coli* str. K-12 substr. W3110]", Accession No. BAE77265.1 (GI85676015), Sep. 29, 2018.
GenBank, "putative sialic acid synthase [Campylobacter jejuni]", Accession No. AAK91726.1, Jul. 23, 2016.
GenBank, "SacC protein [[Mannheimia] succiniciproducens MBEL55E]", Accession No. AAU37516.1, Jan. 31, 2014.
GenBank, "sucrose-6-phosphate hydrolase [Bacillus subtilis]", Accession No. WP_010886636.1, Mar. 15, 2021.
GenBank, "sugar efflux transporter [Yersinia alsatica]", Accession No. WP 087817556.1, Aug. 9, 2023.
GenBank, "UDP-N-acetylglucosamine 2-epimerase [*Escherichia coli* S88]", Accession No. CAR04561.1, Feb. 27, 2015.
GenBank, "Multispecies: sucrose-6-phosphate hydrolase [Enterobacterales]", Accession No. WP_000056853.1, Jul. 28, 2019.
GenBank, beta-fructofuranosidase protein [Arthrobacter globiformis], Accession No. BAD18121.1, Aug. 3, 2004.
GenBank, putative N-acetylglucosamine-6-phosphate 2-epimerase [Campylobacter jejuni], Accession No. AAK91727.1, Jul. 23, 2016.
GeneBank, "glycoside hydrolase family 32 protein [Avibacterium gallinarum]", Accession No. WP_103853210.1, Feb. 10, 2018.
H. H. Freeze and A. D. Elbein: Chapter 4: Glycosylation precursors, in: Essentials of Glycobiology, 2nd edition (Eds. A. Varki et al.), Cold Spring Harbour Laboratory Press (2009).
Jensen and Hammer, Appl Environ Microbiol. 1998, 64(1):82-7.
Khamduang et al. J. Ind. Microbiol. Biotechnol. 36, 1267 (2009).
Lara et al., Molecular Biotechnology, 2006, 34: 355-381.
Liang et al., Activities of Constitutive Promoters in *Escherichia coli*, J. Mol. Biol. (1999) 292, 19-37.
Lu et al 2021 ACS Synth. Biol. 10: 923-938.
Murphy, J Bacteriol. (1998); 180(8):2063-7.
Muyrers et al., EMBO Rep. (2000) 1(3): 239-243.
Needleman and Wunsch, 1970, J. Mol. Biol. 48: 443-453.
Parschat et al. High-Titer De Novo Biosynthesis of the Predominant Human Milk Oligosaccharide 2'-Fucosyllactose from Sucrose in *Escherichia coli*. ACS Synth. Biol. 2020, 9: 2784-2796.
Priem et al. Glycobiology 12, 235 (2002).
Rice, et al. EMBOSS: The European Molecular Biology Open Software Suite, 2000, Trends Genet. 16: 276-277.
Sabri, et al. Appl. Environ. Microbiol., 79, 478 (2013).
Steinsiek et al. Glucose Transport in *Escherichia coli* Mutant Strains with Defects in Sugar Transport Systems. Journal of Bacteriology, 2012, 194(21): 5897-5908.
UniProt, "PTS system glucose-specific EIICB component", Accession No. P69786, https://www.uniprot.org/uniprotkb/P69786/entry.
Urashima, et al. Milk Oligosaccharides, Nova Biomedical Books, New York, 2011.
Vetcher et al., Appl Environ Microbiol. (2005);71(4):1829-35.
Waddell C.S. and Craig N.L., Genes Dev. Feb. 1988;2(2):137-49.
Wenzel et al., Chem Biol. (2005), 12(3):349-56.
Wilson K. and Walker J., Principles and Techniques of Biochemistry and Molecular Biology (2010), Cambridge University Press.
Yim, et al. Molecular Characterization of the Promoter of osmY, a rpoS-DependentGene, Journal of Bacteriology(1994) 100-107.
Zhang, et al. Nature Genetics (1998) 20: 123-128.
Search Report issued for DK Patent Application No. PA202170248, mailed Sep. 15, 2021, 9 pages.
Isono, N. et al., "Cloning and heterologous expression of a beta-fructofuranosidase gene from Arthrobacter globiformis IFO 3062, and site-directed mutagenesis of the essential aspartic acid and glutamic acid of the active site", J. Biosci. Bioeng., vol. 97, No. 4, 2004, pp. 244-249.
Lowe, H. et al.:"Metabolic engineering to expand the substrate spectrum of Pseudomonas putida toward sucrose", Microbiologyopen, vol. 6, No. 4, 2017, pp. 1-9.
Database EMBL-EBI/Uniprotkb [online], 2018, "Sucrose-6-phosphate hydrolase (scrB) from Avibacterium gallinarum"; Accession No. A0A379AWT7.
Second Technical Examination Report issued for DK Patent Application No. PA202270138, mailed Dec. 6, 2022, 3 pages.
Intention to Grant issued for DK Patent Application No. PA202270138, mailed Jul. 25, 2023, 2 pages.
Granted claims of DK Patent Application No. PA202270138.
International Search Report and Written Opinion for PCT/EP2022/063314, mailed Nov. 24, 2022.

* cited by examiner

SEQUENCE LISTING

<160> NUMBER OF SEQ ID NOS: 68

<210> SEQ ID NO 1
<211> LENGTH: 483
<212> TYPE: PRT
<213> ORGANISM: Avibacterium gallinarum
<220> FEATURE:
<221> NAME/KEY: MISC_FEATURE
<222> LOCATION: (1)..(483)
<223> OTHER INFORMATION: SacC_Agal, glycoside hydrolase family 32 protein, WP_103853210.1

<400> SEQUENCE: 1

```
Met Ile Ile Phe Asn Glu Gly Lys Tyr Lys Ser Leu Tyr Ala Ala Glu
1               5                   10                  15

Gln Gly Glu Leu Glu Lys Ile Ala Gln Thr Val Ala Gln Asp Gln Asp
            20                  25                  30

Phe Arg Pro Val Tyr His Leu Ala Pro Pro Thr Gly Leu Leu Asn Asp
            35                  40                  45

Pro Asn Gly Leu Ile Phe Asp Gly Glu Lys Tyr His Leu Phe Tyr Gln
50                      55                  60

Trp Tyr Pro Phe Asp Ala Leu His Gly Met Lys His Trp Gln His Phe
65                  70                  75                  80

Ile Thr Gln Asp Phe Lys Gln Phe Ser Gln Ala Asp Leu Leu Val Pro
                85                  90                  95

Cys Glu Leu Tyr Glu Ser His Gly Cys Tyr Ser Gly Gly Ala Val Lys
                100                 105                 110

Ile Gly Asp Gln Ile Ala Val Phe Tyr Thr Gly Asn Thr Arg Arg Pro
            115                 120                 125

Ser Asp Asn Gln Arg Val Pro Tyr Gln Asn Leu Ala Ile Phe Ser Lys
            130                 135                 140

Asp Gly Lys Leu Leu Ser Lys Arg Pro Leu Ile Glu Gln Ala Pro Gln
145                 150                 155                 160

Gly Tyr Thr Glu His Val Arg Asp Pro Lys Pro Phe Leu Thr Lys Asp
                165                 170                 175

Gly Lys Ile Arg Phe Ile Cys Gly Ala Gln Arg Glu Asn Leu Thr Gly
            180                 185                 190

Thr Ala Leu Val Phe Glu Met Asp Asn Leu Ala Asp Thr Pro Arg Leu
            195                 200                 205

Leu Gly Glu Leu Ala Leu Pro Ala Phe Asp Asn Gln Gly Val Phe Met
210                 215                 220

Trp Glu Cys Pro Asp Leu Ser Gln Met Gly Asp Lys Ser Leu Phe Ile
225                 230                 235                 240

Trp Ser Pro Gln Gly Lys Ala Arg Glu Leu Glu Gln Tyr Gln Asn Asn
            245                 250                 255

Tyr His Ala Val Tyr Ala Leu Gly Glu Leu Ala Asp Arg Gln Phe His
            260                 265                 270

Ala Glu Gln Ile Ala Glu Leu Asp Gln Gly Phe Asp Phe Tyr Ala Pro
            275                 280                 285

Gln Thr Phe Ser Gly Thr Gln Thr Met Leu Leu Gly Trp Val Gly Leu
            290                 295                 300

Pro Asp Leu Ser Tyr Pro Thr Asp Leu Tyr Lys Trp His Ser Met Leu
305                 310                 315                 320

Ser Met Pro Arg Gln Leu Arg Leu Gln Asp Gly Lys Ile Tyr Gln Gln
            325                 330                 335

Pro Ile Glu Asn Ile Tyr Lys Asn Leu Thr Ala Leu Gln Ser Ile Thr
            340                 345                 350

Val Glu Lys Glu Ala Glu Ile Ala Asp Leu Asp Arg Ala Tyr Leu Lys
            355                 360                 365

Phe Asp Ala Asn Ala Gln Pro Phe Ser Leu Lys Phe Asn Asn Ala
370                 375                 380

Gln Asn Gln Arg Leu Ile Leu Ser Tyr Asp Gly Glu Met Leu Cys Leu
385                 390                 395                 400

Asp Arg Ser Gln Thr Glu Gln Thr Asp Ser Met Lys Ser Phe Gly Asp
            405                 410                 415

Lys Arg Tyr Cys Arg Ile Glu Asp Leu Arg Gln Val Glu Ile Phe Phe
```

```
                   420             425             430
Asp Arg Ser Val Ala Glu Ile Phe Leu Asn Gln Gly Glu Lys Ala Met
            435                 440                 445

Thr Ser Arg Phe Phe Ile Cys Ala Arg Glu Asn Gln Leu Cys Thr Asp
        450                 455                 460

Lys Pro Leu Thr Leu Gln Val Gly Tyr Pro Lys Ile Glu Val Asp
465                 470                 475                 480

Tyr Thr Lys

<210> SEQ ID NO 2
<211> LENGTH: 548
<212> TYPE: PRT
<213> ORGANISM: Arthrobacter globiformis
<220> FEATURE:
<221> NAME/KEY: MISC_FEATURE
<222> LOCATION: (1)..(548)
<223> OTHER INFORMATION: Bff, beta-fructofuranosidase protein,
      BAD18121.1

<400> SEQUENCE: 2

Met Glu Arg Thr Cys Ile Thr Val Arg Ala Ile Val Arg Phe His Ile
1               5                   10                  15

Glu Gln Arg Gln Thr Ile Val Asn Lys Gln Arg Thr Lys Arg Gly Ile
            20                  25                  30

Leu Thr Ala Ala Leu Ser Ile Gly Ala Leu Gly Ala Thr Leu Ile Ser
        35                  40                  45

Gly Pro Ala Val Ala Ala Thr Asp Ala Ala Pro Gly Phe Pro Gln Pro
    50                  55                  60

Thr Glu His Thr Gln Lys Ala Tyr Ser Pro Thr Asp Asn Phe Thr Ser
65                  70                  75                  80

Arg Trp Thr Arg Ala Asp Ala Lys Gln Leu Lys Ala Met Ser Asp Pro
                85                  90                  95

Asp Ala Gly Ser Arg Glu Asn Ser Met Pro Thr Glu Tyr Thr Met Pro
            100                 105                 110

Thr Val Ser Gln Asp Phe Pro Asp Met Ser Asn Glu Lys Val Trp Val
        115                 120                 125

Trp Asp Thr Trp Pro Leu Ile Asp Glu Asn Ala Asn Gln Tyr Ser Val
    130                 135                 140

Asn Gly Gln Glu Ile Ile Phe Ser Leu Val Ala Asp Arg Lys Leu Gly
145                 150                 155                 160

Phe Asp Glu Arg His Gln Tyr Ala Arg Ile Gly Tyr Phe Tyr Arg Pro
                165                 170                 175

Ala Gly Ile Pro Ala Asp Glu Arg Pro Glu Asp Gly Trp Thr Tyr
            180                 185                 190

Gly Gly Gln Val Phe Asp Glu Gly Val Thr Gly Lys Ile Phe Glu Asp
        195                 200                 205

Gln Ser Phe Thr His Gln Thr Gln Trp Ser Gly Ser Ala Arg Val Ser
    210                 215                 220

Lys Asn Gly Glu Ile Lys Leu Phe Phe Thr Asp Val Ala Phe Tyr Arg
225                 230                 235                 240

Asp Lys Asp Gly Gln Asp Val Lys Pro Tyr Asp Ser Arg Ile Ala Leu
                245                 250                 255

Ser Val Gly His Val His Ser Asn Lys Lys Gly Val Lys Leu Thr Gly
            260                 265                 270

Phe Asn Lys Val Lys Glu Leu Leu Gln Ala Asp Gly Lys Asn Tyr Gln
        275                 280                 285
```

Asn Ala Ala Gln Asn Ser Tyr Tyr Asn Phe Arg Asp Pro Phe Thr Phe
         290                 295                 300

Val Asp Pro Ala His Pro Gly Glu Thr Tyr Met Val Phe Glu Gly Asn
305                 310                 315                 320

Ser Ala Met Asp Arg Asp Glu Ala Lys Cys Thr Ala Glu Asp Leu Gly
                325                 330                 335

Tyr Arg Glu Gly Glu Thr Asn Gly Glu Thr Val Glu Gln Val Asn Asn
                340                 345                 350

Ser Gly Ala Thr Tyr Gln Ile Gly Asn Val Gly Leu Ala Arg Ala Lys
                355                 360                 365

Asn Lys Ala Leu Thr Glu Trp Glu Phe Leu Pro Pro Ile Leu Ser Ala
370                 375                 380

Asn Cys Val Thr Asp Gln Thr Glu Arg Pro Gln Ile Tyr Met Gln Asp
385                 390                 395                 400

Gly Lys Tyr Tyr Leu Phe Thr Ile Ser His Arg Ser Thr Phe Ala Thr
                405                 410                 415

Gly Ile Asp Gly Pro Glu Gly Val Tyr Gly Phe Val Gly Asn Gly Ile
                420                 425                 430

Arg Ser Asp Tyr Gln Pro Leu Asn Arg Gly Ser Gly Leu Ala Leu Gly
                435                 440                 445

Ser Pro Thr Asn Leu Asn Phe Ala Ala Gly Thr Pro Phe Ala Pro Asp
450                 455                 460

Tyr Asn Gln His Pro Gly Gln Phe Gln Ala Tyr Ser His Tyr Val Met
465                 470                 475                 480

Pro Gly Gly Leu Val Gln Ser Phe Ile Asp Thr Ile Gly Thr Lys Asp
                485                 490                 495

Asn Phe Val Arg Gly Gly Thr Leu Gly Pro Thr Val Lys Leu Asn Ile
                500                 505                 510

Lys Gly Asp Ser Ala Thr Val Asp Tyr Asn Tyr Gly Asp Asn Gly Leu
                515                 520                 525

Gly Gly Trp Ala Asp Ile Pro Ala Asn Arg Glu Leu Lys Asn Ser Lys
530                 535                 540

Ala Val Ala Lys
545

<210> SEQ ID NO 3
<211> LENGTH: 1452
<212> TYPE: DNA
<213> ORGANISM: Avibacterium gallinarum
<220> FEATURE:
<221> NAME/KEY: misc_feature
<222> LOCATION: (1)..(1452)
<223> OTHER INFORMATION: SacC_Agal

<400> SEQUENCE: 3

```
atgatcatct ttaacgaggg caaatacaaa agcctgtatg cagcagaaca gggtgaactg     60
gaaaaaattg cacagaccgt tgcacaggat caggattttc gtccggttta tcatctggca    120
ccgcctaccg gtctgctgaa tgatccgaat ggtctgattt ttgatggcga gaaatatcac    180
ctgttctatc agtggtatcc gtttgatgca ctgcatggta tgaaacattg gcagcatttt    240
atcacccagg actttaaaca gtttagccag gccgatctgc tggttccgtg tgaactgtat    300
gaaagccatg gttgttatag cggtggtgca gttaaaattg gtgatcagat tgcagtgttt    360
tataccggta atacccgtcg tccgagcgat aatcagcgtg ttccgtatca gaatctggcc    420
atttttagca aagatggtaa actgctgagc aaacgtccgc tgattgaaca ggcaccgcag    480
```

```
ggttataccg aacatgtgcg tgatccgaaa ccgtttctga ccaaagatgg caaaattcgc      540
tttatttgtg gtgcccagcg tgaaaatctg accggcaccg cactggtttt tgaaatggat      600
aatctggcag atacaccgcg tctgctgggc gaactggcac tgcctgcatt tgataatcag      660
ggcgttttta tgtgggaatg tccggatctg agccagatgg gcgataaaag tctgtttatt      720
tggagtccgc agggtaaagc acgcgaactg gaacagtatc agaacaatta tcatgcagtt      780
tatgcactgg gtgagctggc agatcgtcag tttcatgcag aacaaattgc agaactggat      840
cagggctttg atttttatgc accgcagacc tttagcggca cccagaccat gctgttaggt      900
tgggttggtc tgccggatct gtcatatccg accgatctgt ataaatggca tagcatgctg      960
agtatgcctc gtcagctgcg tctgcaggat ggtaaaatct atcagcagcc gattgagaac     1020
atctacaaaa acctgaccgc actgcagagc attaccgttg aaaagaagc agaaattgcc      1080 gatctggacc gtgcatatct gaaatttgat gcaaatgcac agccgttcag cctgaaattt     1140
ttcaataatg cacagaacca gcgtctgatc ctgagctatg atggtgaaat gctgtgtctg     1200
gatcgtagcc agaccgaaca gaccgatagc atgaaaagct ttggtgataa acgttattgc     1260
cgcattgaag atctgcgtca ggttgaaatc tttttttgatc gtagcgtggc agaaatcttt     1320
ctgaatcagg gtgaaaaagc aatgaccagc cgcttttta tctgtgcacg cgaaaatcag      1380
ctgtgtaccg ataaaccgct gacactgcag gttggttatc cgaaaaaaat cgaagtggac     1440
tacaccaaat aa                                                        1452

<210> SEQ ID NO 4
<211> LENGTH: 1647
<212> TYPE: DNA
<213> ORGANISM: Arthrobacter globiformis
<220> FEATURE:
<221> NAME/KEY: misc_feature
<222> LOCATION: (1)..(1647)
<223> OTHER INFORMATION: Bff, beta-fructofuranosidase

<400> SEQUENCE: 4
atggaacgta cctgtattac cgttcgtgca attgtgcgtt ttcatattga acagcgtcag       60
accattgtga ataaacagcg taccaaacgt ggtattctga ccgcagcact gagcattggt      120
gcactgggtg caaccctgat tagcggtccg gcagttgcag caaccgatgc agcaccgggt      180
tttccgcagc cgaccgaaca tacccagaaa gcatatagcc cgaccgataa ctttaccagc      240
cgttggaccc gtgcagatgc aaaacagctg aaagcaatga gcgatccgga tgcaggtagc      300
cgtgaaaata gcatgccgac agaatatacc atgccgaccg ttagccagga ttttccggat      360
atgagcaatg aaaagtttg gtttgggat acctggcctc tgattgatga aaatgcaaat       420
cagtatagcc tgaacggcca agaaattatc tttagcctgg ttgcagatcg caaactgggt      480
tttgatgaac gtcatcagta tgcacgtatc ggctattttct atcgtccggc aggtattccg      540
gcagatgaac gccctgaaga tggtggttgg acctatggtg gtcaggtgtt tgatgaaggt      600
gtgaccggta aaatctttga ggatcagagc tttacccatc agacccagtg gtctggtagc      660
gcacgtgtta gcaaaaatgg tgaaatcaaa ctgttcttta ccgacgtggc cttctatcgt      720
gataaagatg gtcaggatgt taaaccgtat gatagccgta ttgccctgag cgttggtcat      780
gttcatagca acaaaaaagg tgttaaactg accggcttca acaaagttaa agaactgctg      840
caggcagatg gcaaaaacta tcagaatgca gcacagaaca gctattataa ctttcgtgat      900
ccgtttacct ttgtggatcc ggcacatccg ggtgaaacct atatggtttt tgaaggtaat      960
```

-continued

```
agcgccatgg atcgtgatga agcaaaatgt acagccgaag atctgggtta tcgtgaaggt    1020
gaaaccaatg gcgaaaccgt tgaacaggtg aataatagcg gtgcaaccta tcagattggt    1080
aatgttggtc tggcacgtgc aaaaaacaaa gcactgaccg aatgggaatt tctgcctccg    1140
attctgagcg caaattgtgt gaccgatcag accgaacgtc cgcagattta tatgcaggat    1200
ggcaaatatt acctgtttac cattagccat cgtagcacct ttgcaaccgg tattgatggt    1260
ccggaaggtg tttatggttt tgttggtaat ggtatccgta gcgattatca gccgctgaat    1320
cgtggtagcg gtctggccct gggtagtccg acaaatctga attttgcagc aggcaccccg    1380
tttgcaccgg attataacca gcatccgggt cagtttcagg cctatagcca ttatgttatg    1440
cctggtggcc tggttcagag ttttattgat accattggca ccaaagataa ctttgtgcgt    1500
ggtggcaccc tgggtccgac cgtgaaactg aacattaaag gtgatagcgc aaccgtggat    1560
tacaattatg gtgataatgg tttaggtggc tgggcagata ttcctgcaaa tcgtgaactg    1620
aaaaatagca agccgtggc caaataa                                         1647
```

<210> SEQ ID NO 5
<211> LENGTH: 30
<212> TYPE: PRT
<213> ORGANISM: Bacillus subtilis
<220> FEATURE:
<221> NAME/KEY: MISC_FEATURE
<222> LOCATION: (1)..(30)
<223> OTHER INFORMATION: yvcE signal peptide

<400> SEQUENCE: 5

Met Arg Lys Ser Leu Ile Thr Leu Gly Leu Ala Ser Val Ile Gly Thr
1               5                   10                  15

Ser Ser Phe Leu Ile Pro Phe Thr Ser Lys Thr Ala Ser Ala
            20                  25                  30

<210> SEQ ID NO 6
<211> LENGTH: 25
<212> TYPE: PRT
<213> ORGANISM: Bacillus subtilis
<220> FEATURE:
<221> NAME/KEY: MISC_FEATURE
<222> LOCATION: (1)..(25)
<223> OTHER INFORMATION: yoqM signal peptide

<400> SEQUENCE: 6

Met Lys Leu Arg Lys Val Leu Thr Gly Ser Val Leu Ser Leu Gly Leu
1               5                   10                  15

Leu Val Ser Ala Ser Pro Ala Phe Ala
            20                  25

<210> SEQ ID NO 7
<211> LENGTH: 30
<212> TYPE: PRT
<213> ORGANISM: Bacillus subtilis
<220> FEATURE:
<221> NAME/KEY: MISC_FEATURE
<222> LOCATION: (1)..(30)
<223> OTHER INFORMATION: yuaB signal peptide

<400> SEQUENCE: 7

Met Lys Arg Lys Leu Leu Ser Ser Leu Ala Ile Ser Ala Leu Ser Leu
1               5                   10                  15

Gly Leu Leu Val Ser Ala Pro Thr Ala Ser Phe Ala Ala Glu
            20                  25                  30

```
<210> SEQ ID NO 8
<211> LENGTH: 21
<212> TYPE: PRT
<213> ORGANISM: Bacillus subtilis
<220> FEATURE:
<221> NAME/KEY: MISC_FEATURE
<222> LOCATION: (1)..(21)
<223> OTHER INFORMATION: pel signal peptide

<400> SEQUENCE: 8

Met Lys Lys Val Met Leu Ala Thr Ala Leu Phe Leu Gly Leu Thr Pro
1               5                   10                  15

Ala Gly Ala Asn Ala
            20

<210> SEQ ID NO 9
<211> LENGTH: 24
<212> TYPE: PRT
<213> ORGANISM: Bacillus subtilis
<220> FEATURE:
<221> NAME/KEY: MISC_FEATURE
<222> LOCATION: (1)..(24)
<223> OTHER INFORMATION: pelB signal peptide

<400> SEQUENCE: 9

Met Lys Arg Leu Cys Leu Trp Phe Thr Val Phe Ser Leu Phe Leu Val
1               5                   10                  15

Leu Leu Pro Gly Lys Ala Leu Gly
            20

<210> SEQ ID NO 10
<211> LENGTH: 24
<212> TYPE: PRT
<213> ORGANISM: Bacillus subtilis
<220> FEATURE:
<221> NAME/KEY: MISC_FEATURE
<222> LOCATION: (1)..(24)
<223> OTHER INFORMATION: yoaW signal peptide

<400> SEQUENCE: 10

Met Lys Lys Met Leu Met Leu Ala Phe Thr Phe Leu Leu Ala Leu Thr
1               5                   10                  15

Ile His Val Gly Glu Ala Ser Ala
            20

<210> SEQ ID NO 11
<211> LENGTH: 28
<212> TYPE: PRT
<213> ORGANISM: Bacillus subtilis
<220> FEATURE:
<221> NAME/KEY: MISC_FEATURE
<222> LOCATION: (1)..(28)
<223> OTHER INFORMATION: yqxl signal peptide

<400> SEQUENCE: 11

Met Phe Lys Lys Leu Leu Leu Ala Thr Ser Ala Leu Thr Phe Ser Leu
1               5                   10                  15

Ser Leu Val Leu Pro Leu Asp Gly His Ala Lys Ala
            20                  25

<210> SEQ ID NO 12
<211> LENGTH: 32
<212> TYPE: PRT
<213> ORGANISM: Bacillus subtilis
<220> FEATURE:
<221> NAME/KEY: MISC_FEATURE
<222> LOCATION: (1)..(32)
```

<223> OTHER INFORMATION: lipA signal peptide

<400> SEQUENCE: 12

Met Lys Phe Val Lys Arg Arg Ile Ile Ala Leu Val Thr Ile Leu Met
1               5                   10                  15

Leu Ser Val Thr Ser Leu Phe Ala Leu Gln Pro Ser Ala Lys Ala Ala
            20                  25                  30

<210> SEQ ID NO 13
<211> LENGTH: 28
<212> TYPE: PRT
<213> ORGANISM: Bacillus subtilis
<220> FEATURE:
<221> NAME/KEY: MISC_FEATURE
<222> LOCATION: (1)..(28)
<223> OTHER INFORMATION: lipB signal peptide

<400> SEQUENCE: 13

Met Lys Lys Val Leu Met Ala Phe Ile Ile Cys Leu Ser Leu Ile Leu
1               5                   10                  15

Ser Val Leu Ala Ala Pro Pro Ser Gly Ala Lys Ala
            20                  25

<210> SEQ ID NO 14
<211> LENGTH: 23
<212> TYPE: PRT
<213> ORGANISM: Bacillus subtilis
<220> FEATURE:
<221> NAME/KEY: MISC_FEATURE
<222> LOCATION: (1)..(23)
<223> OTHER INFORMATION: yogH signal peptide

<400> SEQUENCE: 14

Met Lys Arg Phe Ile Leu Val Leu Ser Phe Leu Ser Ile Ile Val Ala
1               5                   10                  15

Tyr Pro Ile Gln Thr Asn Ala
            20

<210> SEQ ID NO 15
<211> LENGTH: 28
<212> TYPE: PRT
<213> ORGANISM: Bacillus subtilis
<220> FEATURE:
<221> NAME/KEY: MISC_FEATURE
<222> LOCATION: (1)..(28)
<223> OTHER INFORMATION: ybfO signal peptide

<400> SEQUENCE: 15

Met Lys Arg Met Ile Val Arg Met Thr Leu Pro Leu Leu Ile Val Cys
1               5                   10                  15

Leu Ala Phe Ser Ser Phe Ser Ala Ser Ala Arg Ala
            20                  25

<210> SEQ ID NO 16
<211> LENGTH: 28
<212> TYPE: PRT
<213> ORGANISM: Bacillus subtilis
<220> FEATURE:
<221> NAME/KEY: MISC_FEATURE
<222> LOCATION: (1)..(28)
<223> OTHER INFORMATION: sacB signal peptide

<400> SEQUENCE: 16

Met Asn Ile Lys Lys Phe Ala Lys Gln Thr Val Leu Thr Phe Thr Thr
1               5                   10                  15

Ala Leu Leu Ala Gly Gly Ala Thr Gln Ala Phe Ala
            20                  25

<210> SEQ ID NO 17
<211> LENGTH: 28
<212> TYPE: PRT
<213> ORGANISM: Bacillus subtilis
<220> FEATURE:
<221> NAME/KEY: MISC_FEATURE
<222> LOCATION: (1)..(28)
<223> OTHER INFORMATION: bglS signal peptide

<400> SEQUENCE: 17

Met Pro Tyr Leu Lys Arg Val Leu Leu Leu Val Thr Gly Leu Phe
1               5                   10                  15

Met Ser Leu Phe Ala Val Thr Ala Thr Ala Ser Ala
            20                  25

<210> SEQ ID NO 18
<211> LENGTH: 28
<212> TYPE: PRT
<213> ORGANISM: Bacillus subtilis
<220> FEATURE:
<221> NAME/KEY: MISC_FEATURE
<222> LOCATION: (1)..(28)
<223> OTHER INFORMATION: yddT signal peptide

<400> SEQUENCE: 18

Met Arg Lys Lys Arg Val Ile Thr Cys Val Met Ala Ala Ser Leu Thr
1               5                   10                  15

Leu Gly Ser Leu Leu Pro Ala Gly Tyr Ala Ser Ala
            20                  25

<210> SEQ ID NO 19
<211> LENGTH: 25
<212> TYPE: PRT
<213> ORGANISM: Bacillus subtilis
<220> FEATURE:
<221> NAME/KEY: MISC_FEATURE
<222> LOCATION: (1)..(25)
<223> OTHER INFORMATION: yobB signal peptide

<400> SEQUENCE: 19

Met Lys Ile Arg Lys Ile Leu Leu Ser Ser Ala Leu Ser Phe Gly Met
1               5                   10                  15

Leu Ile Ser Ala Val Pro Ala Leu Ala
            20                  25

<210> SEQ ID NO 20
<211> LENGTH: 22
<212> TYPE: PRT
<213> ORGANISM: Saccharomyces cerevisiae
<220> FEATURE:
<221> NAME/KEY: MISC_FEATURE
<222> LOCATION: (1)..(22)
<223> OTHER INFORMATION: pelB signal peptide

<400> SEQUENCE: 20

Met Lys Tyr Leu Leu Pro Thr Ala Ala Ala Gly Leu Leu Leu Leu Ala
1               5                   10                  15

Ala Gln Pro Ala Met Ala
            20

<210> SEQ ID NO 21
<211> LENGTH: 21
<212> TYPE: PRT

<213> ORGANISM: Escherichia coli
<220> FEATURE:
<221> NAME/KEY: MISC_FEATURE
<222> LOCATION: (1)..(21)
<223> OTHER INFORMATION: phoA signal peptide

<400> SEQUENCE: 21

Met Lys Gln Ser Thr Ile Ala Leu Ala Leu Leu Pro Leu Leu Phe Thr
1               5                   10                  15

Pro Val Thr Lys Ala
            20

<210> SEQ ID NO 22
<211> LENGTH: 25
<212> TYPE: PRT
<213> ORGANISM: Escherichia coli
<220> FEATURE:
<221> NAME/KEY: MISC_FEATURE
<222> LOCATION: (1)..(25)
<223> OTHER INFORMATION: lamB

<400> SEQUENCE: 22

Met Met Ile Thr Leu Arg Lys Leu Pro Leu Ala Val Ala Val Ala Ala
1               5                   10                  15

Gly Val Met Ser Ala Gln Ala Met Ala
            20                  25

<210> SEQ ID NO 23
<211> LENGTH: 21
<212> TYPE: PRT
<213> ORGANISM: Escherichia coli
<220> FEATURE:
<221> NAME/KEY: MISC_FEATURE
<222> LOCATION: (1)..(21)
<223> OTHER INFORMATION: ompA signal peptide

<400> SEQUENCE: 23

Met Lys Lys Thr Ala Ile Ala Ile Ala Val Ala Leu Ala Gly Phe Ala
1               5                   10                  15

Thr Val Ala Gln Ala
            20

<210> SEQ ID NO 24
<211> LENGTH: 30
<212> TYPE: PRT
<213> ORGANISM: Escherichia coli
<220> FEATURE:
<221> NAME/KEY: MISC_FEATURE
<222> LOCATION: (1)..(30)
<223> OTHER INFORMATION: fhuD signal peptide

<400> SEQUENCE: 24

Met Ser Gly Leu Pro Leu Ile Ser Arg Arg Arg Leu Leu Thr Ala Met
1               5                   10                  15

Ala Leu Ser Pro Leu Leu Trp Gln Met Asn Thr Ala His Ala
            20                  25                  30

<210> SEQ ID NO 25
<211> LENGTH: 32
<212> TYPE: PRT
<213> ORGANISM: Escherichia coli
<220> FEATURE:
<221> NAME/KEY: MISC_FEATURE
<222> LOCATION: (1)..(32)
<223> OTHER INFORMATION: mdoD

<400> SEQUENCE: 25

```
Met Asp Arg Arg Arg Phe Ile Lys Gly Ser Met Ala Met Ala Ala Val
1               5                   10                  15

Cys Gly Thr Ser Gly Ile Ala Ser Leu Phe Ser Gln Ala Phe Ala
            20                  25                  30

<210> SEQ ID NO 26
<211> LENGTH: 26
<212> TYPE: PRT
<213> ORGANISM: Escherichia coli
<220> FEATURE:
<221> NAME/KEY: MISC_FEATURE
<222> LOCATION: (1)..(26)
<223> OTHER INFORMATION: ycdO signal peptide

<400> SEQUENCE: 26

Met Thr Ile Asn Phe Arg Arg Asn Ala Leu Gln Leu Ser Val Ala Ala
1               5                   10                  15

Leu Phe Ser Ser Ala Phe Met Ala Asn Ala
            20                  25

<210> SEQ ID NO 27
<211> LENGTH: 19
<212> TYPE: PRT
<213> ORGANISM: Escherichia coli
<220> FEATURE:
<221> NAME/KEY: MISC_FEATURE
<222> LOCATION: (1)..(19)
<223> OTHER INFORMATION: dsbA signal peptide

<400> SEQUENCE: 27

Met Lys Lys Ile Trp Leu Ala Leu Ala Gly Leu Val Leu Ala Phe Ser
1               5                   10                  15

Ala Ser Ala

<210> SEQ ID NO 28
<211> LENGTH: 26
<212> TYPE: PRT
<213> ORGANISM: Alcaligenes faecalis
<220> FEATURE:
<221> NAME/KEY: MISC_FEATURE
<222> LOCATION: (1)..(26)
<223> OTHER INFORMATION: AF-ss

<400> SEQUENCE: 28

Met Gln Lys Gly Leu Val Arg Thr Gly Leu Ala Ala Gly Leu Ile
1               5                   10                  15

Leu Gly Trp Ala Gly Ala Pro Thr His Ala
            20                  25

<210> SEQ ID NO 29
<211> LENGTH: 203
<212> TYPE: DNA
<213> ORGANISM: Artificial Sequence
<220> FEATURE:
<223> OTHER INFORMATION: PmglB_70UTR_SD8

<400> SEQUENCE: 29
tgcgtcgcca ttctgtcgca acacgccaga atgcggcggc gatcactaac tcaacaaatc      60
aggcgatgta accgctttca atctgtgagt gatttcacag tatcttaaca atgtgatagc     120
tatgattgca ccgtgcctac aagcatcgtg gaggtccgtg actttcacgc atacaacaaa     180
cattaaccaa gagaaaaaca gct                                              203
```

<210> SEQ ID NO 30
<211> LENGTH: 203
<212> TYPE: DNA
<213> ORGANISM: Artificial Sequence
<220> FEATURE:
<223> OTHER INFORMATION: PmglB_70UTR_SD10

<400> SEQUENCE: 30

```
tgcgtcgcca ttctgtcgca acacgccaga atgcggcggc gatcactaac tcaacaaatc    60
aggcgatgta accgctttca atctgtgagt gatttcacag tatcttaaca atgtgatagc   120
tatgattgca ccgtgcctac aagcatcgtg gaggtccgtg actttcacgc atacaacaaa   180
cattaaccaa ctgagaaaca gct                                            203
```

<210> SEQ ID NO 31
<211> LENGTH: 203
<212> TYPE: DNA
<213> ORGANISM: Artificial Sequence
<220> FEATURE:
<223> OTHER INFORMATION: PmglB-54UTR

<400> SEQUENCE: 31

```
tgcgtcgcca ttctgtcgca acacgccaga atgcggcggc gatcactaac tcaacaaatc    60
aggcgatgta accgctttca atctgtgagt gatttcacag tatcttaaca atgtgatagc   120
tatgattgca ccgtgcctac aagcatcgtg gaggtccgtg actttcacgc atacaacaaa   180
cattaacaaa aaccggagat acc                                            203
```

<210> SEQ ID NO 32
<211> LENGTH: 141
<212> TYPE: DNA
<213> ORGANISM: Artificial Sequence
<220> FEATURE:
<223> OTHER INFORMATION: Plac_70UTR

<400> SEQUENCE: 32

```
tgtgagttag ctcactcatt aggcaccccca ggctttacac tttatgcttc cggctcgtat    60
gttgtgtgga atgcctacaa gcatcgtgga ggtccgtgac tttcacgcat acaacaaaca   120
ttaaccaagg aggaaacagc t                                              141
```

<210> SEQ ID NO 33
<211> LENGTH: 203
<212> TYPE: DNA
<213> ORGANISM: Artificial Sequence
<220> FEATURE:
<223> OTHER INFORMATION: PmglB_70UTR_SD9

<400> SEQUENCE: 33

```
tgcgtcgcca ttctgtcgca acacgccaga atgcggcggc gatcactaac tcaacaaatc    60
aggcgatgta accgctttca atctgtgagt gatttcacag tatcttaaca atgtgatagc   120
tatgattgca ccgtgcctac aagcatcgtg gaggtccgtg actttcacgc atacaacaaa   180
cattaaccaa aggaaaaaca gct                                            203
```

<210> SEQ ID NO 34
<211> LENGTH: 203
<212> TYPE: DNA
<213> ORGANISM: Artificial Sequence
<220> FEATURE:
<223> OTHER INFORMATION: PmglB_70UTR_SD4

<400> SEQUENCE: 34

```
tgcgtcgcca ttctgtcgca acacgccaga atgcggcggc gatcactaac tcaacaaatc        60
aggcgatgta accgctttca atctgtgagt gatttcacag tatcttaaca atgtgatagc       120
tatgattgca ccgtgcctac aagcatcgtg gaggtccgtg actttcacgc atacaacaaa       180
cattaaccaa ctaggaaaca gct                                               203
```

```
<210> SEQ ID NO 35
<211> LENGTH: 203
<212> TYPE: DNA
<213> ORGANISM: Artificial Sequence
<220> FEATURE:
<223> OTHER INFORMATION: PmglB_70UTR_SD5

<400> SEQUENCE: 35
tgcgtcgcca ttctgtcgca acacgccaga atgcggcggc gatcactaac tcaacaaatc        60
aggcgatgta accgctttca atctgtgagt gatttcacag tatcttaaca atgtgatagc       120
tatgattgca ccgtgcctac aagcatcgtg gaggtccgtg actttcacgc atacaacaaa       180
cattaaccaa ccgagaaaca gct                                               203
```

```
<210> SEQ ID NO 36
<211> LENGTH: 310
<212> TYPE: DNA
<213> ORGANISM: Artificial Sequence
<220> FEATURE:
<223> OTHER INFORMATION: PglpF_SD4

<400> SEQUENCE: 36
atgcgcaaat gcggcacgcc ttgcagatta cggtttgcca cacttttcat ccttctcctg        60
gtgacataat ccacatcaat cgaaaatgtt aataaatttg ttgcgcgaat gatctaacaa       120
acatgcatca tgtacaatca gatggaataa atggcgcgat aacgctcatt ttatgacgag       180
gcacacacat tttaagttcg atatttctcg tttttgctcg ttaacgataa gtttacagca       240
tgcctacaag catcgtggag gtccgtgact tcacgcata caacaaacat taaccaacta       300
ggaaacagct                                                              310
```

```
<210> SEQ ID NO 37
<211> LENGTH: 203
<212> TYPE: DNA
<213> ORGANISM: Artificial Sequence
<220> FEATURE:
<223> OTHER INFORMATION: PmglB_70UTR_SD7

<400> SEQUENCE: 37
tgcgtcgcca ttctgtcgca acacgccaga atgcggcggc gatcactaac tcaacaaatc        60
aggcgatgta accgctttca atctgtgagt gatttcacag tatcttaaca atgtgatagc       120
tatgattgca ccgtgcctac aagcatcgtg gaggtccgtg actttcacgc atacaacaaa       180
cattaaccaa gagcaaaaca gct                                               203
```

```
<210> SEQ ID NO 38
<211> LENGTH: 203
<212> TYPE: DNA
<213> ORGANISM: Artificial Sequence
<220> FEATURE:
<223> OTHER INFORMATION: PmglB_70UTR

<400> SEQUENCE: 38
tgcgtcgcca ttctgtcgca acacgccaga atgcggcggc gatcactaac tcaacaaatc        60
aggcgatgta accgctttca atctgtgagt gatttcacag tatcttaaca atgtgatagc       120
```
tatgattgca ccgtgcctac aagcatcgtg gaggtccgtg actttcacgc atacaacaaa    180
cattaaccaa ggaggaaaca gct                                            203

<210> SEQ ID NO 39
<211> LENGTH: 189
<212> TYPE: DNA
<213> ORGANISM: Artificial Sequence
<220> FEATURE:
<223> OTHER INFORMATION: PglpA_70UTR

<400> SEQUENCE: 39
gaaaacattc ataaattaaa tgtgaattgc cgcacacatt attaaataag atttacaaaa    60
tgttcaaaat gacgcatgaa atcacgtttc actttcgaat tatgagcgaa tatgcgcgat    120
gcctacaagc atcgtggagg tccgtgactt tcacgcatac aacaaacatt aaccaaggag    180
gaaacagct                                                            189

<210> SEQ ID NO 40
<211> LENGTH: 239
<212> TYPE: DNA
<213> ORGANISM: Artificial Sequence
<220> FEATURE:
<223> OTHER INFORMATION: PglpT_70UTR

<400> SEQUENCE: 40
ccatttagcc atagtaaaaa catgaattgt ttgatttcgc gcatattcgc tcataattcg    60
aaagtgaaac gtgatttcat gcgtcatttt gaacattttg taaatcttat ttaataatgt    120
gtgcggcaat tcacatttaa tttatgaatg ttttcttaac atcgcggcat gcctacaagc    180
atcgtggagg tccgtgactt tcacgcatac aacaaacatt aaccaaggag gaaacagct    239

<210> SEQ ID NO 41
<211> LENGTH: 291
<212> TYPE: DNA
<213> ORGANISM: Artificial Sequence
<220> FEATURE:
<223> OTHER INFORMATION: PgatY_70UTR

<400> SEQUENCE: 41
cggcaaccta tgcctgatgc gacgctgaag cgtcttatca tgcctacata gcactgccac    60
gtatgtttac accgcatccg gcataaaaac acgcgcactt tgctacggct tccctatcgg    120
gaggccgttt ttttgccttt cactcctcga ataattttca tattgtcgtt tttgtgatcg    180
ttatctcgat atttaaaaac aaataatttc attatatttt gtgcctacaa gcatcgtgga    240
ggtccgtgac tttcacgcat acaacaaaca ttaaccaagg aggaaacagc t            291

<210> SEQ ID NO 42
<211> LENGTH: 300
<212> TYPE: DNA
<213> ORGANISM: Artificial Sequence
<220> FEATURE:
<223> OTHER INFORMATION: PglpF

<400> SEQUENCE: 42
gcggcacgcc ttgcagatta cggtttgcca cacttttcat ccttctcctg gtgacataat    60
ccacatcaat cgaaaatgtt aataaatttg ttgcgcgaat gatctaacaa acatgcatca    120
tgtacaatca gatggaataa atggcgcgat aacgctcatt ttatgacgag gcacacacat    180
tttaagttcg atatttctcg tttttgctcg ttaacgataa gtttacagca tgcctacaag    240
catcgtggag gtccgtgact ttcacgcata caacaaacat taaccaagga ggaaacagct    300

<210> SEQ ID NO 43
<211> LENGTH: 310
<212> TYPE: DNA
<213> ORGANISM: Artificial Sequence
<220> FEATURE:
<223> OTHER INFORMATION: PglpF_SD10

<400> SEQUENCE: 43
atgcgcaaat gcggcacgcc ttgcagatta cggtttgcca cacttttcat ccttctcctg    60
gtgacataat ccacatcaat cgaaaatgtt aataaatttg ttgcgcgaat gatctaacaa   120
acatgcatca tgtacaatca gatggaataa atggcgcgat aacgctcatt ttatgacgag   180
gcacacacat tttaagttcg atatttctcg tttttgctcg ttaacgataa gtttacagca   240
tgcctacaag catcgtggag gtccgtgact ttcacgcata caacaaacat taaccaactg   300
agaaacagct                                                          310

<210> SEQ ID NO 44
<211> LENGTH: 310
<212> TYPE: DNA
<213> ORGANISM: Artificial Sequence
<220> FEATURE:
<223> OTHER INFORMATION: PglpF_SD5

<400> SEQUENCE: 44
atgcgcaaat gcggcacgcc ttgcagatta cggtttgcca cacttttcat ccttctcctg    60
gtgacataat ccacatcaat cgaaaatgtt aataaatttg ttgcgcgaat gatctaacaa   120
acatgcatca tgtacaatca gatggaataa atggcgcgat aacgctcatt ttatgacgag   180
gcacacacat tttaagttcg atatttctcg tttttgctcg ttaacgataa gtttacagca   240
tgcctacaag catcgtggag gtccgtgact ttcacgcata caacaaacat taaccaaccg   300
agaaacagct                                                          310

<210> SEQ ID NO 45
<211> LENGTH: 310
<212> TYPE: DNA
<213> ORGANISM: Artificial Sequence
<220> FEATURE:
<223> OTHER INFORMATION: PglpF_SD8

<400> SEQUENCE: 45
atgcgcaaat gcggcacgcc ttgcagatta cggtttgcca cacttttcat ccttctcctg    60
gtgacataat ccacatcaat cgaaaatgtt aataaatttg ttgcgcgaat gatctaacaa   120
acatgcatca tgtacaatca gatggaataa atggcgcgat aacgctcatt ttatgacgag   180
gcacacacat tttaagttcg atatttctcg tttttgctcg ttaacgataa gtttacagca   240
tgcctacaag catcgtggag gtccgtgact ttcacgcata caacaaacat taaccaagag   300
aaaaacagct                                                          310

<210> SEQ ID NO 46
<211> LENGTH: 350
<212> TYPE: DNA
<213> ORGANISM: Artificial Sequence
<220> FEATURE:
<223> OTHER INFORMATION: PmglB_16UTR

<400> SEQUENCE: 46
tgcgtcgcca ttctgtcgca acacgccaga atgcggcggc gatcactaac tcaacaaatc    60

```
aggcgatgta accgctttca atctgtgagt gatttcacag tatcttaaca atgtgatagc    120
tatgattgca ccgttttaac gttgtaaccc gtatgtaaca gtgataatc acttttgccg     180 aggtaacagc gtcataacaa caattaaagc cgttttctgg agcgttaccg ggcatggaag    240
aacgaatttt aaaagtgag cttcggcgtt cagtaacact tcattaactc tactgccccg     300
ccgagcattt atctcaagca ctaccctgca taagcaagga ggaaacagct                350
```

<210> SEQ ID NO 47
<211> LENGTH: 310
<212> TYPE: DNA
<213> ORGANISM: Artificial Sequence
<220> FEATURE:
<223> OTHER INFORMATION: PglpF_SD9

<400> SEQUENCE: 47

```
atgcgcaaat gcggcacgcc ttgcagatta cggtttgcca cacttttcat ccttctcctg    60
gtgacataat ccacatcaat cgaaaatgtt aataaatttg ttgcgcgaat gatctaacaa    120
acatgcatca tgtacaatca gatggaataa atggcgcgat aacgctcatt ttatgacgag   180
gcacacacat tttaagttcg atatttctcg ttttgctcg ttaacgataa gtttacagca    240
tgcctacaag catcgtggag gtccgtgact ttcacgcata caacaaacat taaccaaagg   300
aaaaacagct                                                           310
```

<210> SEQ ID NO 48
<211> LENGTH: 300
<212> TYPE: DNA
<213> ORGANISM: Artificial Sequence
<220> FEATURE:
<223> OTHER INFORMATION: PglpF_SD7

<400> SEQUENCE: 48

```
gcggcacgcc ttgcagatta cggtttgcca cacttttcat ccttctcctg gtgacataat    60
ccacatcaat cgaaaatgtt aataaatttg ttgcgcgaat gatctaacaa acatgcatca   120
tgtacaatca gatggaataa atggcgcgat aacgctcatt ttatgacgag gcacacacat   180
tttaagttcg atatttctcg ttttgctcg ttaacgataa gtttacagca tgcctacaag    240
catcgtggag gtccgtgact ttcacgcata caacaaacat taaccaagag caaaacagct   300
```

<210> SEQ ID NO 49
<211> LENGTH: 310
<212> TYPE: DNA
<213> ORGANISM: Artificial Sequence
<220> FEATURE:
<223> OTHER INFORMATION: PglpF_SD6

<400> SEQUENCE: 49

```
atgcgcaaat gcggcacgcc ttgcagatta cggtttgcca cacttttcat ccttctcctg    60
gtgacataat ccacatcaat cgaaaatgtt aataaatttg ttgcgcgaat gatctaacaa   120
acatgcatca tgtacaatca gatggaataa atggcgcgat aacgctcatt ttatgacgag   180
gcacacacat tttaagttcg atatttctcg ttttgctcg ttaacgataa gtttacagca    240
tgcctacaag catcgtggag gtccgtgact ttcacgcata caacaaacat taaccaagag   300
ctaaacagct                                                           310
```

<210> SEQ ID NO 50
<211> LENGTH: 189
<212> TYPE: DNA

<213> ORGANISM: Artificial Sequence
<220> FEATURE:
<223> OTHER INFORMATION: PglpA_16UTR

<400> SEQUENCE: 50

```
gaaaacattc ataaattaaa tgtgaattgc cgcacacatt attaaataag atttacaaaa      60
tgttcaaaat gacgcatgaa atcacgtttc actttcgaat tatgagcgaa tatgcgcgat     120
gcctacaagc atcgtggagg tccgtgactt tcacgcatac aacaaacatt aaccaaggag     180
gaaacagct                                                             189
```

<210> SEQ ID NO 51
<211> LENGTH: 107
<212> TYPE: DNA
<213> ORGANISM: Escherichia coli
<220> FEATURE:
<221> NAME/KEY: misc_feature
<222> LOCATION: (1)..(107)
<223> OTHER INFORMATION: Plac

<400> SEQUENCE: 51

```
tgtgagttag ctcactcatt aggcacccca ggctttacac tttatgcttc cggctcgtat      60
gttgtgtgga attgtgagcg ataacaatt tcacacagga aacagct                   107
```

<210> SEQ ID NO 52
<211> LENGTH: 300
<212> TYPE: DNA
<213> ORGANISM: Artificial Sequence
<220> FEATURE:
<223> OTHER INFORMATION: PglpF_SD3

<400> SEQUENCE: 52

```
gcggcacgcc ttgcagatta cggtttgcca cactttttcat ccttctcctg gtgacataat     60
ccacatcaat cgaaaatgtt aataaatttg ttgcgcgaat gatctaacaa acatgcatca    120
tgtacaatca gatggaataa atggcgcgat aacgctcatt ttatgacgag gcacacacat    180
tttaagttcg atatttctcg tttttgctcg ttaacgataa gtttacagca tgcctacaag    240
catcgtggag gtccgtgact ttcacgcata caacaaacat taaccaagaa caaaacagct    300
```

<210> SEQ ID NO 53
<211> LENGTH: 300
<212> TYPE: DNA
<213> ORGANISM: Artificial Sequence
<220> FEATURE:
<223> OTHER INFORMATION: PglpF_SD1

<400> SEQUENCE: 53

```
gcggcacgcc ttgcagatta cggtttgcca cactttcat ccttctcctg gtgacataat      60
ccacatcaat cgaaaatgtt aataaatttg ttgcgcgaat gatctaacaa acatgcatca    120
tgtacaatca gatggaataa atggcgcgat aacgctcatt ttatgacgag gcacacacat    180
tttaagttcg atatttctcg tttttgctcg ttaacgataa gtttacagca tgcctacaag    240
catcgtggag gtccgtgact ttcacgcata caacaaacat taaccaaatt cgaaacagct    300
```

<210> SEQ ID NO 54
<211> LENGTH: 152
<212> TYPE: DNA
<213> ORGANISM: Klebsiella pneumoniae
<220> FEATURE:
<221> NAME/KEY: misc_feature
<222> LOCATION: (1)..(152)
<223> OTHER INFORMATION: Pscr promoter sequence

<400> SEQUENCE: 54

```
ggttaacggc ccactttgct ggcgacatca caattcttaa accggtttag caattttat      60 tttcaccgcg ttaccgacat gtttaccata tcaactaaac cggtttagca aacattagca    120
cactcactga tttacctttg gatgtcacca ac                                   152
```

<210> SEQ ID NO 55
<211> LENGTH: 332
<212> TYPE: PRT
<213> ORGANISM: Neisseria meningitidis
<220> FEATURE:
<221> NAME/KEY: MISC_FEATURE
<222> LOCATION: (1)..(332)
<223> OTHER INFORMATION: LgtA, -1,3-N-acetyl-glucosaminyltransferase

<400> SEQUENCE: 55

```
Met Gln Pro Leu Val Ser Val Leu Ile Cys Ala Tyr Asn Val Glu Lys
1               5                   10                  15

Tyr Phe Ala Gln Ser Leu Ala Ala Val Val Asn Gln Thr Trp Arg Asn
            20                  25                  30

Leu Glu Ile Leu Ile Val Asp Asp Gly Ser Thr Asp Gly Thr Leu Ala
        35                  40                  45

Ile Ala Lys Asp Phe Gln Lys Arg Asp Ser Arg Ile Lys Ile Leu Ala
    50                  55                  60

Gln Ala Gln Asn Ser Gly Leu Ile Pro Ser Leu Asn Ile Gly Leu Asp
65                  70                  75                  80

Glu Leu Ala Lys Ser Gly Met Gly Glu Tyr Ile Ala Arg Thr Asp Ala
                85                  90                  95

Asp Asp Ile Ala Ala Pro Asp Trp Ile Glu Lys Ile Val Gly Glu Met
            100                 105                 110

Glu Lys Asp Arg Ser Ile Ile Ala Met Gly Ala Trp Leu Glu Val Leu
        115                 120                 125

Ser Glu Glu Lys Asp Gly Asn Arg Leu Ala Arg His His Arg His Gly
    130                 135                 140

Lys Ile Trp Lys Lys Pro Thr Arg Pro Glu Asp Ile Ala Asp Phe Phe
145                 150                 155                 160

Pro Phe Gly Asn Pro Ile His Asn Asn Thr Met Ile Met Arg Arg Ser
                165                 170                 175

Val Ile Asp Gly Gly Leu Arg Tyr Asn Thr Glu Arg Asp Trp Ala Glu
            180                 185                 190

Asp Tyr Gln Phe Trp Tyr Asp Val Ser Lys Leu Gly Arg Leu Ala Tyr
        195                 200                 205

Tyr Pro Glu Ala Leu Val Lys Tyr Arg Leu His Ala Asn Gln Val Ser
    210                 215                 220

Ser Lys Tyr Ser Ile Arg Gln His Glu Ile Ala Gln Gly Ile Gln Lys
225                 230                 235                 240

Thr Ala Arg Asn Asp Phe Leu Gln Ser Met Gly Phe Lys Thr Arg Phe
                245                 250                 255

Asp Ser Leu Glu Tyr Arg Gln Ile Lys Ala Val Ala Tyr Glu Leu Leu
            260                 265                 270

Glu Lys His Leu Pro Glu Glu Asp Phe Glu Arg Ala Arg Arg Phe Leu
        275                 280                 285

Tyr Gln Cys Phe Lys Arg Thr Asp Thr Leu Pro Ala Gly Ala Trp Leu
    290                 295                 300

Asp Phe Ala Ala Asp Gly Arg Met Arg Arg Leu Phe Thr Leu Arg Gln
```

```
                305                 310                 315                 320
Tyr Phe Gly Ile Leu His Arg Leu Leu Lys Asn Arg
                    325                 330

<210> SEQ ID NO 56
<211> LENGTH: 273
<212> TYPE: PRT
<213> ORGANISM: Helicobacter pylori
<220> FEATURE:
<221> NAME/KEY: MISC_FEATURE
<222> LOCATION: (1)..(273)
<223> OTHER INFORMATION: GalT, -1,4-galactosyltransferase

<400> SEQUENCE: 56

Met Arg Val Phe Ala Ile Ser Leu Asn Gln Lys Val Cys Asp Thr Phe
1               5                   10                  15

Gly Leu Val Phe Arg Asp Thr Thr Leu Leu Asn Ser Ile Asn Ala
            20                  25                  30

Thr His His Gln Ala Gln Ile Phe Asp Ala Ile Tyr Ser Lys Thr Phe
        35                  40                  45

Glu Gly Gly Leu His Pro Leu Val Lys Lys His Leu His Pro Tyr Phe
    50                  55                  60

Ile Thr Gln Asn Ile Lys Asp Met Gly Ile Thr Thr Asn Leu Ile Ser
65                  70                  75                  80

Glu Val Ser Lys Phe Tyr Tyr Ala Leu Lys Tyr His Ala Lys Phe Met
                85                  90                  95

Ser Leu Gly Glu Leu Gly Cys Tyr Ala Ser His Tyr Ser Leu Trp Glu
            100                 105                 110

Lys Cys Ile Glu Leu Asn Glu Ala Ile Cys Ile Leu Glu Asp Asp Ile
        115                 120                 125

Thr Leu Lys Glu Asp Phe Lys Glu Gly Leu Asp Phe Leu Glu Lys His
    130                 135                 140

Ile Gln Glu Leu Gly Tyr Ile Arg Leu Met His Leu Leu Tyr Asp Ala
145                 150                 155                 160

Ser Val Lys Ser Glu Pro Leu Ser His Lys Asn His Glu Ile Gln Glu
                165                 170                 175

Arg Val Gly Ile Ile Lys Ala Tyr Ser Glu Gly Val Gly Thr Gln Gly
            180                 185                 190

Tyr Val Ile Thr Pro Lys Ile Ala Lys Val Phe Leu Lys Cys Ser Arg
        195                 200                 205

Lys Trp Val Val Pro Val Asp Thr Ile Met Asp Ala Thr Phe Ile His
    210                 215                 220

Gly Val Lys Asn Leu Val Leu Gln Pro Phe Val Ile Ala Asp Asp Glu
225                 230                 235                 240

Gln Ile Ser Thr Ile Ala Arg Lys Glu Glu Pro Tyr Ser Pro Lys Ile
                245                 250                 255

Ala Leu Met Arg Glu Leu His Phe Lys Tyr Leu Lys Tyr Trp Gln Phe
            260                 265                 270

Val

<210> SEQ ID NO 57
<211> LENGTH: 439
<212> TYPE: PRT
<213> ORGANISM: Artificial Sequence
<220> FEATURE:
<223> OTHER INFORMATION: GalTK, -1,3-galactosyltransferase

<400> SEQUENCE: 57
```

```
Met Ile Ser Val Tyr Ile Ile Ser Leu Lys Glu Ser Gln Arg Arg Leu
1               5                   10                  15

Asp Thr Glu Lys Leu Val Leu Glu Ser Asn Glu Lys Phe Lys Gly Arg
            20                  25                  30

Cys Val Phe Gln Ile Phe Asp Ala Ile Ser Pro Lys His Glu Asp Phe
            35                  40                  45

Glu Lys Phe Val Gln Glu Leu Tyr Asp Ser Ser Leu Leu Lys Ser
50                  55                  60

Asp Trp Phe His Ser Asp Tyr Cys Tyr Gln Glu Leu Leu Pro Gln Glu
65                  70                  75                  80

Phe Gly Cys Tyr Leu Ser His Tyr Leu Leu Trp Lys Glu Cys Val Lys
                85                  90                  95

Leu Asn Gln Pro Val Val Ile Leu Glu Asp Asp Val Ala Leu Glu Ser
            100                 105                 110

Asn Phe Met Gln Ala Leu Glu Asp Cys Leu Lys Ser Pro Phe Asp Phe
            115                 120                 125

Val Arg Leu Tyr Gly His Tyr Trp Gly Gly His Lys Thr Asn Leu Cys
            130                 135                 140

Ala Leu Pro Val Tyr Thr Glu Thr Glu Ala Glu Ala Ser Ile Glu
145                 150                 155                 160

Lys Thr Pro Ile Glu Asn Tyr Glu Val Thr Ser Pro Pro Pro Asn
                165                 170                 175

Pro Thr Arg Asp Thr Gln Gln Asp Phe Ile Thr Glu Thr Gln Gln Asp
            180                 185                 190

Pro Lys Glu Leu Ser Glu Pro Cys Lys Ile Ala Pro Gln Lys Ile Ser
            195                 200                 205

Phe Asn Gln Val Val Phe Lys Lys Ile Lys Arg Lys Leu Asn Arg Phe
210                 215                 220

Ile Gly Ser Ile Leu Ala Arg Thr Glu Val Tyr Lys Asn Ile Val Ala
225                 230                 235                 240

Lys Tyr Asp Asp Leu Thr Thr Lys Tyr Asp Asp Leu Thr Thr Lys Tyr
            245                 250                 255

Asp Asp Leu Thr Thr Lys Tyr Asp Asp Leu Thr Thr Lys Tyr Asp Asp
            260                 265                 270

Leu Asn Lys Asn Ile Ala Glu Lys Tyr Asp Glu Leu Met Gly Lys Tyr
            275                 280                 285

Glu Ser Leu Leu Ala Lys Glu Val Asn Ile Lys Glu Thr Phe Trp Glu
            290                 295                 300

Ser Arg Ala Asp Ser Glu Lys Glu Ala Leu Phe Leu Asp His Phe Tyr
305                 310                 315                 320

Leu Thr Ser Val Tyr Val Ala Thr Thr Ala Gly Tyr Tyr Leu Thr Pro
                325                 330                 335

Lys Gly Ala Lys Thr Phe Ile Glu Ala Thr Glu Arg Phe Lys Ile Ile
            340                 345                 350

Glu Pro Val Asp Met Phe Ile Asn Asn Pro Thr Tyr His Asp Ile Ala
            355                 360                 365

Asn Phe Thr Tyr Val Pro Cys Pro Val Ser Leu Asn Lys His Ala Phe
370                 375                 380

Asn Ser Thr Ile Gln Asn Ala Lys Lys Pro Asp Ile Ser Leu Lys Pro
385                 390                 395                 400

Pro Lys Lys Ser Tyr Phe Asp Asn Leu Phe Tyr His Lys Phe Asn Ala
                405                 410                 415
```

-continued

```
Arg Lys Cys Leu Lys Ala Phe Asn Lys Tyr Ser Lys Gln Tyr Ala Pro
            420                 425                 430
Leu Lys Thr Pro Lys Glu Val
        435

<210> SEQ ID NO 58
<211> LENGTH: 292
<212> TYPE: PRT
<213> ORGANISM: Sulfuriflexus mobilis
<220> FEATURE:
<221> NAME/KEY: MISC_FEATURE
<222> LOCATION: (1)..(292)
<223> OTHER INFORMATION: Smob, a-1,2-fucosylosyl-transferase

<400> SEQUENCE: 58

Met Ile Ile Ser Gln Ile Ile Gly Gly Leu Gly Asn Gln Met Phe Gln
1               5                   10                  15

Tyr Ala Ala Gly Arg Ala Leu Ser Leu Val Arg Gly Gln Pro Leu Leu
            20                  25                  30

Leu Asp Val Thr Gly Phe Ala Gly Tyr Gly Leu His Gln Gly Phe Glu
        35                  40                  45

Leu Gln Arg Val Phe Asp Cys Pro Ile Gly Ile Ala Thr Glu Glu Asp
    50                  55                  60

Val Arg Gly Ile Leu Gly Trp Gln Phe Ser Ala Gly Ile Arg Arg Ile
65                  70                  75                  80

Val Ala Arg Pro Gly Met Ala Ala Phe Arg Arg Lys Gly Phe Ile Val
                85                  90                  95

Glu Pro His Phe His Tyr Trp Pro Glu Ile Lys Asn Val Pro Arg Asp
            100                 105                 110

Cys Tyr Leu Leu Gly Tyr Trp Gln Ser Glu Arg Tyr Phe Arg Ala Ala
        115                 120                 125

Thr Ala Asp Ile Arg Ala Asp Phe Ser Phe Lys Ser Pro Leu Val Asn
    130                 135                 140

Arg Asn Ala Glu Thr Ala Ala Gln Ile Asp Gln Val Asn Ala Ile Ser
145                 150                 155                 160

Leu His Met Arg Arg Gly Asp Tyr Val Asn Asn Pro Lys Thr Ser Ala
                165                 170                 175

Thr His Gly Leu Cys Ser Leu Asp Tyr Tyr Gln Ala Ala Ile Lys Phe
            180                 185                 190

Val Ser Glu Arg Val Glu Glu Pro Phe Phe Ile Phe Ser Asp Asp
        195                 200                 205

Ile Ala Trp Val Lys Ala Asn Leu Lys Leu Asp Phe Pro Cys Gln Tyr
    210                 215                 220

Val Asp His Asn His Gly Ala Glu Ser Phe Asn Asp Met His Leu Met
225                 230                 235                 240

Ser Leu Cys Gln His His Ile Ile Ala Asn Ser Ser Phe Ser Trp Trp
                245                 250                 255

Gly Ala Trp Leu Asn Ser Asp Pro Lys Lys Ile Val Leu Ala Pro Lys
            260                 265                 270

Lys Trp Phe Ala Asn Lys Asn Ile Lys Asp Leu Phe Pro Pro Gly
        275                 280                 285

Trp Val Ser Leu
    290

<210> SEQ ID NO 59
<211> LENGTH: 387
<212> TYPE: PRT
```

```
<213> ORGANISM: Rouxiella badensis
<220> FEATURE:
<221> NAME/KEY: MISC_FEATURE
<222> LOCATION: (1)..(387)
<223> OTHER INFORMATION: Bad, MFS transporter

<400> SEQUENCE: 59
```

| | | | | | | | | | | | | | | |
|---|---|---|---|---|---|---|---|---|---|---|---|---|---|---|
| Met | Ser | Ser | Arg | Arg | Leu | Ser | Ile | Ile | Phe | Ala | Thr | Phe | Leu | Leu | Val |
| 1 | | | | 5 | | | | | 10 | | | | | 15 | |
| Ser | Phe | Leu | Thr | Gly | Ile | Ala | Gly | Ala | Leu | Gln | Ala | Pro | Thr | Leu | Ser |
| | | | 20 | | | | | 25 | | | | | 30 | | |
| Leu | Phe | Leu | Thr | Asn | Glu | Val | Lys | Val | Arg | Pro | Leu | Trp | Val | Gly | Leu |
| | | 35 | | | | | 40 | | | | | 45 | | | |
| Phe | Tyr | Thr | Val | Asn | Ala | Leu | Gly | Gly | Ile | Val | Ile | Ser | Phe | Leu | Leu |
| | 50 | | | | | 55 | | | | | 60 | | | | |
| Ala | Asn | Tyr | Ser | Asp | Lys | Lys | Gly | Asp | Arg | Arg | Lys | Leu | Leu | Phe | Phe |
| 65 | | | | | 70 | | | | | 75 | | | | | 80 |
| Cys | Thr | Leu | Met | Ala | Ile | Gly | Asn | Ser | Leu | Ile | Phe | Ala | Tyr | Ser | Arg |
| | | | | 85 | | | | | 90 | | | | | 95 | |
| Asp | Tyr | Leu | Val | Leu | Ile | Ser | Val | Gly | Val | Leu | Leu | Ala | Ala | Ile | Gly |
| | | | 100 | | | | | 105 | | | | | 110 | | |
| Asn | Ala | Ser | Met | Pro | Gln | Leu | Phe | Ala | Leu | Ala | Arg | Glu | Tyr | Ala | Asp |
| | | 115 | | | | | 120 | | | | | 125 | | | |
| Arg | Ser | Ala | His | Glu | Val | Val | Met | Phe | Ser | Ser | Met | Met | Arg | Ala | Thr |
| | 130 | | | | | 135 | | | | | 140 | | | | |
| Leu | Ser | Leu | Ala | Trp | Val | Leu | Gly | Pro | Pro | Ile | Ser | Phe | Thr | Leu | Ala |
| 145 | | | | | 150 | | | | | 155 | | | | | 160 |
| Leu | Asn | Tyr | Gly | Phe | Thr | Leu | Met | Tyr | Leu | Cys | Ala | Ala | Gly | Val | Phe |
| | | | | 165 | | | | | 170 | | | | | 175 | |
| Ile | Phe | Ser | Ala | Leu | Met | Val | Trp | Phe | Phe | Leu | Pro | Ser | Val | Gly | Arg |
| | | | 180 | | | | | 185 | | | | | 190 | | |
| Ile | Glu | Gln | Pro | Val | Asp | Lys | Val | Val | His | Val | Ser | Ala | Trp | Lys | |
| | | 195 | | | | | 200 | | | | | 205 | | | |
| Asn | Arg | Asp | Val | Arg | Leu | Leu | Phe | Phe | Ala | Ser | Leu | Leu | Met | Trp | Thr |
| | 210 | | | | | 215 | | | | | 220 | | | | |
| Cys | Asn | Ile | Met | Tyr | Ile | Ile | Asp | Met | Pro | Leu | Tyr | Ile | Thr | Ser | Asp |
| 225 | | | | | 230 | | | | | 235 | | | | | 240 |
| Leu | Gly | Leu | Pro | Glu | Gly | Leu | Ala | Gly | Leu | Leu | Met | Gly | Ala | Ala | Ala |
| | | | | 245 | | | | | 250 | | | | | 255 | |
| Gly | Leu | Glu | Ile | Pro | Val | Met | Leu | Ile | Ala | Gly | Tyr | Leu | Val | Lys | Arg |
| | | | 260 | | | | | 265 | | | | | 270 | | |
| Thr | Gly | Lys | Arg | Arg | Leu | Met | Leu | Cys | Ala | Ala | Val | Phe | Gly | Ile | Leu |
| | | 275 | | | | | 280 | | | | | 285 | | | |
| Phe | Tyr | Leu | Gly | Leu | Val | Leu | Phe | Gln | Phe | Lys | Ala | Ala | Leu | Met | Ile |
| | 290 | | | | | 295 | | | | | 300 | | | | |
| Leu | Gln | Leu | Phe | Asn | Ala | Ile | Phe | Ile | Gly | Ile | Ile | Ala | Gly | Ile | Gly |
| 305 | | | | | 310 | | | | | 315 | | | | | 320 |
| Met | Leu | Tyr | Phe | Gln | Asp | Leu | Met | Pro | Gly | Arg | Ala | Gly | Ser | Ala | Thr |
| | | | | 325 | | | | | 330 | | | | | 335 | |
| Thr | Leu | Phe | Thr | Asn | Ser | Ile | Ser | Thr | Gly | Ala | Ile | Leu | Ala | Gly | Val |
| | | | | 340 | | | | | 345 | | | | | 350 | |
| Ile | Gln | Gly | Thr | Ile | Val | Gln | Asn | Phe | Gly | His | Tyr | Gln | Val | Tyr | Trp |
| | | | 355 | | | | | 360 | | | | | 365 | | |
| Met | Ala | Leu | Ala | Leu | Ala | Val | Gly | Ala | Leu | Val | Leu | Met | Thr | Arg | Val |
| | 370 | | | | | 375 | | | | | 380 | | | | |

Lys Asn Val
385

<210> SEQ ID NO 60
<211> LENGTH: 394
<212> TYPE: PRT
<213> ORGANISM: Rosenbergiella nectarea
<220> FEATURE:
<221> NAME/KEY: MISC_FEATURE
<222> LOCATION: (1)..(394)
<223> OTHER INFORMATION: Nec, MFS transporter

<400> SEQUENCE: 60

Met Gln Ser Phe Thr Pro Pro Ala Pro Lys Gly Gly Asn Pro Val Phe
1               5                   10                  15

Met Met Phe Met Leu Val Thr Phe Phe Val Ser Ile Ala Gly Ala Leu
            20                  25                  30

Gln Ala Pro Thr Leu Ser Leu Tyr Leu Ser Gln Glu Leu Ala Ala Lys
        35                  40                  45

Pro Phe Met Val Gly Leu Phe Phe Thr Ile Asn Ala Val Thr Gly Ile
    50                  55                  60

Ile Ile Ser Phe Ile Leu Ala Lys Arg Ser Asp Arg Lys Gly Asp Arg
65                  70                  75                  80

Arg Arg Leu Leu Met Phe Cys Cys Ala Met Ala Ile Ala Asn Ala Leu
                85                  90                  95

Met Phe Ala Phe Val Arg Gln Tyr Val Val Leu Ile Thr Leu Gly Leu
            100                 105                 110

Ile Leu Ser Ala Leu Thr Ser Val Met Pro Gln Leu Phe Ala Leu
        115                 120                 125

Ala Arg Glu Tyr Ala Asp Arg Thr Gly Arg Glu Val Val Met Phe Ser
    130                 135                 140

Ser Val Met Arg Thr Gln Met Ser Leu Ala Trp Val Ile Gly Pro Pro
145                 150                 155                 160

Ile Ser Phe Ala Leu Ala Leu Asn Tyr Gly Phe Ile Thr Leu Tyr Leu
                165                 170                 175

Val Ala Ala Ala Leu Phe Leu Leu Ser Leu Ile Leu Ile Lys Thr Thr
            180                 185                 190

Leu Pro Ser Val Pro Arg Leu Tyr Pro Ala Glu Asp Leu Ala Lys Ser
        195                 200                 205

Ala Ala Ser Gly Trp Lys Arg Thr Asp Val Arg Phe Leu Phe Ala Ala
    210                 215                 220

Ser Val Leu Met Trp Val Cys Asn Leu Met Tyr Ile Ile Asp Met Pro
225                 230                 235                 240

Leu Tyr Ile Ser Lys Ser Leu Gly Met Pro Glu Ser Phe Ala Gly Val
                245                 250                 255

Leu Met Gly Thr Ala Ala Gly Leu Glu Ile Pro Val Met Leu Leu Ala
            260                 265                 270

Gly Tyr Leu Ala Lys Arg Val Gly Lys Arg Pro Leu Val Ile Val Ala
        275                 280                 285

Ala Val Cys Gly Leu Ala Phe Tyr Pro Ala Met Leu Val Phe His Gln
    290                 295                 300

Gln Thr Gly Leu Leu Ile Ile Gln Leu Leu Asn Ala Val Phe Ile Gly
305                 310                 315                 320

Ile Val Ala Gly Leu Val Met Leu Trp Phe Gln Asp Leu Met Pro Gly
                325                 330                 335

```
Lys Ala Gly Ala Ala Thr Thr Leu Phe Thr Asn Ser Val Ser Thr Gly
                340                 345                 350

Met Ile Phe Ala Gly Leu Cys Gln Gly Leu Leu Ser Asp Leu Leu Gly
            355                 360                 365

His Gln Ala Ile Tyr Val Leu Ala Thr Val Leu Met Val Ile Ala Leu
        370                 375                 380

Leu Leu Leu Leu Arg Val Lys Glu Gln Ala
385                 390

<210> SEQ ID NO 61
<211> LENGTH: 393
<212> TYPE: PRT
<213> ORGANISM: Yersinia bercovieri
<220> FEATURE:
<221> NAME/KEY: MISC_FEATURE
<222> LOCATION: (1)..(393)
<223> OTHER INFORMATION: YberC, MFS transporter

<400> SEQUENCE: 61

Met Lys Ser Ala Leu Thr Phe Ser Arg Arg Ile Asn Pro Val Phe Leu
1               5                   10                  15

Ala Phe Phe Val Val Ala Phe Leu Ser Gly Ile Ala Gly Ala Leu Gln
            20                  25                  30

Ala Pro Thr Leu Ser Leu Phe Leu Ser Thr Glu Val Lys Val Arg Pro
        35                  40                  45

Leu Trp Val Gly Leu Phe Tyr Thr Val Asn Ala Ile Ala Gly Ile Thr
    50                  55                  60

Val Ser Phe Ile Leu Ala Lys Arg Ser Asp Ser Arg Gly Asp Arg Arg
65                  70                  75                  80

Lys Leu Ile Met Val Cys Tyr Leu Met Ala Val Gly Asn Cys Leu Leu
                85                  90                  95

Phe Ala Phe Asn Arg Asp Tyr Leu Thr Leu Ile Thr Ala Gly Val Leu
            100                 105                 110

Leu Ala Ser Val Ala Asn Thr Ala Met Pro Gln Ile Phe Ala Leu Ala
        115                 120                 125

Arg Glu Tyr Ala Asp Ser Ser Ala Arg Glu Val Val Met Phe Ser Ser
    130                 135                 140

Ile Met Arg Ala Gln Leu Ser Leu Ala Trp Val Ile Gly Pro Pro Leu
145                 150                 155                 160

Ser Phe Met Leu Ala Leu Asn Tyr Gly Phe Thr Leu Met Phe Ser Ile
                165                 170                 175

Ala Ala Gly Ile Phe Val Leu Ser Ala Leu Val Val Trp Phe Ile Leu
            180                 185                 190

Pro Ser Val Pro Arg Ala Glu Pro Val Val Asp Ala Pro Val Val Val
        195                 200                 205

Gln Gly Ser Leu Phe Ala Asp Lys Asn Val Leu Leu Phe Ile Ala
    210                 215                 220

Ser Met Leu Met Trp Thr Cys Asn Thr Met Tyr Ile Ile Asp Met Pro
225                 230                 235                 240

Leu Tyr Ile Thr Ala Ser Leu Gly Leu Pro Glu Arg Leu Ala Gly Leu
                245                 250                 255

Leu Met Gly Thr Ala Ala Gly Leu Glu Ile Pro Ile Met Leu Leu Ala
            260                 265                 270

Gly Tyr Ser Val Arg Tyr Phe Gly Lys Arg Lys Ile Met Leu Phe Ala
        275                 280                 285

Val Leu Ala Gly Val Leu Phe Tyr Thr Gly Leu Val Leu Phe Lys Phe
```

```
              290                 295                 300
Lys Thr Ala Leu Met Leu Gln Ile Phe Asn Ala Ile Phe Ile Gly
305                 310                 315                 320

Ile Val Ala Gly Ile Gly Met Leu Tyr Phe Gln Asp Leu Met Pro Gly
                325                 330                 335

Arg Ala Gly Ala Ala Thr Thr Leu Phe Thr Asn Ser Ile Ser Thr Gly
                340                 345                 350

Val Ile Leu Ala Gly Val Leu Gln Gly Gly Leu Thr Glu Thr Trp Gly
                355                 360                 365

His Asp Ser Val Tyr Val Met Ala Met Val Leu Ser Ile Leu Ala Leu
                370                 375                 380

Ile Ile Cys Ala Arg Val Arg Glu Ala
385                 390

<210> SEQ ID NO 62
<211> LENGTH: 393
<212> TYPE: PRT
<213> ORGANISM: Yersinia frederiksenii
<220> FEATURE:
<221> NAME/KEY: MISC_FEATURE
<222> LOCATION: (1)..(393)
<223> OTHER INFORMATION: Fred, MFS transporter

<400> SEQUENCE: 62

Met Lys Ser Ala Leu Thr Phe Ser Arg Arg Ile Asn Pro Val Phe Leu
1               5                   10                  15

Ala Phe Phe Val Val Ala Phe Leu Ser Gly Ile Ala Gly Ala Leu Gln
                20                  25                  30

Ala Pro Thr Leu Ser Leu Phe Leu Ser Thr Glu Val Lys Val Arg Pro
                35                  40                  45

Leu Trp Val Gly Leu Phe Tyr Thr Val Asn Ala Ile Ala Gly Ile Thr
        50                  55                  60

Val Ser Phe Val Leu Ala Lys Arg Ser Asp Leu Arg Gly Asp Arg Arg
65                  70                  75                  80

Lys Leu Ile Leu Val Cys Tyr Leu Met Ala Val Gly Asn Cys Leu Leu
                85                  90                  95

Phe Ala Phe Asn Arg Asp Tyr Leu Thr Leu Ile Thr Ala Gly Val Leu
                100                 105                 110

Leu Ala Ala Val Ala Asn Thr Ala Met Pro Gln Ile Phe Ala Leu Ala
                115                 120                 125

Arg Glu Tyr Ala Asp Asn Ser Ala Arg Glu Val Val Met Phe Ser Ser
                130                 135                 140

Ile Met Arg Ala Gln Leu Ser Leu Ala Trp Val Ile Gly Pro Pro Leu
145                 150                 155                 160

Ser Phe Met Leu Ala Leu Asn Tyr Gly Phe Thr Leu Met Phe Cys Ile
                165                 170                 175

Ala Ala Gly Ile Phe Val Leu Ser Ala Leu Val Val Trp Phe Ile Leu
                180                 185                 190

Pro Ser Val Gln Arg Ala Glu Pro Val Met Asp Ala Pro Thr Val Ala
                195                 200                 205

Gln Gly Ser Leu Phe Ala Asp Lys Asp Val Leu Leu Leu Phe Ile Ala
                210                 215                 220

Ser Met Leu Met Trp Thr Cys Asn Thr Met Tyr Ile Ile Asp Met Pro
225                 230                 235                 240

Leu Tyr Ile Thr Ala Ser Leu Gly Leu Pro Glu Arg Leu Ala Gly Leu
                245                 250                 255
```

```
Leu Met Gly Thr Ala Ala Gly Leu Glu Ile Pro Ile Met Leu Leu Ala
            260                 265                 270

Gly Tyr Ser Val Arg Arg Phe Gly Lys Arg Lys Ile Met Leu Phe Ala
            275                 280                 285

Val Leu Ala Gly Val Leu Phe Tyr Thr Gly Leu Val Leu Phe Lys Phe
            290                 295                 300

Lys Ser Ala Leu Met Leu Leu Gln Ile Phe Asn Ala Ile Phe Ile Gly
305                 310                 315                 320

Ile Val Ala Gly Ile Gly Met Leu Tyr Phe Gln Asp Leu Met Pro Gly
                325                 330                 335

Arg Ala Gly Ala Ala Thr Thr Leu Phe Thr Asn Ser Ile Ser Thr Gly
            340                 345                 350

Val Ile Leu Ala Gly Val Leu Gln Gly Val Leu Thr Glu Thr Trp Gly
            355                 360                 365

His Asn Ser Val Tyr Val Met Ala Met Ile Leu Ala Ile Leu Ser Leu
            370                 375                 380

Ile Ile Cys Ala Arg Val Arg Glu Ala
385                 390

<210> SEQ ID NO 63
<211> LENGTH: 392
<212> TYPE: PRT
<213> ORGANISM: Pantoea vagans
<220> FEATURE:
<221> NAME/KEY: MISC_FEATURE
<222> LOCATION: (1)..(392)
<223> OTHER INFORMATION: Vag, MFS transporter

<400> SEQUENCE: 63

Met Lys Ser Leu Leu Thr Arg Lys Arg Ile Asn Pro Val Phe Leu
1               5                   10                  15

Ala Phe Met Ala Ala Ser Phe Met Ile Gly Val Ala Gly Ala Leu Gln
                20                  25                  30

Ala Pro Thr Leu Ser Leu Phe Leu Thr Arg Glu Val Gln Ala Arg Pro
            35                  40                  45

Leu Trp Val Gly Leu Phe Phe Thr Val Asn Ala Ile Ala Gly Ile Val
        50                  55                  60

Val Ser Met Leu Val Ala Lys Arg Ser Asp Ser Arg Gly Asp Arg Arg
65                  70                  75                  80

Thr Leu Ile Leu Phe Cys Cys Ala Met Ala Phe Cys Asn Ala Leu Leu
                85                  90                  95

Phe Ala Phe Thr Arg His Tyr Leu Thr Leu Ile Thr Leu Gly Val Leu
            100                 105                 110

Leu Ser Ala Leu Ala Ser Val Ser Met Pro Gln Ile Phe Ala Leu Ala
            115                 120                 125

Arg Glu Tyr Ala Asp Gln Ser Ala Arg Glu Ala Val Met Phe Ser Ser
        130                 135                 140

Val Met Arg Ala Gln Leu Ser Leu Ala Trp Val Ile Gly Pro Pro Leu
145                 150                 155                 160

Ser Phe Ala Leu Ala Leu Asn Phe Gly Phe Val Thr Leu Phe Leu Val
                165                 170                 175

Ala Ala Ala Leu Phe Leu Val Cys Ile Leu Leu Ile Lys Phe Thr Leu
            180                 185                 190

Pro Ser Val Pro Arg Ala Glu Pro Leu Met Arg Ser Gly Gly Met Pro
            195                 200                 205
```

```
Leu Ser Gly Trp Arg Asp Arg Asp Val Arg Leu Leu Phe Ile Ala Ser
    210                 215                 220

Val Thr Met Trp Thr Cys Asn Thr Met Tyr Ile Ile Asp Met Pro Leu
225                 230                 235                 240

Tyr Ile Ser Val Thr Leu Gly Leu Pro Glu Lys Leu Ala Gly Leu Leu
                245                 250                 255

Met Gly Thr Ala Ala Gly Leu Glu Ile Pro Val Met Leu Leu Ala Gly
                260                 265                 270

His Tyr Ala Lys Arg Val Gly Lys Arg Asn Leu Met Leu Ile Ala Val
                275                 280                 285

Ala Ala Gly Val Leu Phe Tyr Ala Gly Leu Ala Met Phe Ala Ser Gln
            290                 295                 300

Thr Ala Leu Met Ala Leu Gln Leu Phe Asn Ala Val Phe Ile Gly Ile
305                 310                 315                 320

Ile Ala Gly Ile Gly Met Leu Trp Phe Gln Asp Leu Met Pro Gly Arg
                325                 330                 335

Pro Gly Ala Ala Thr Thr Met Phe Thr Asn Ser Ile Ser Thr Gly Met
            340                 345                 350

Ile Leu Ala Gly Val Ile Gln Gly Thr Leu Ser Glu Arg Phe Gly His
                355                 360                 365

Ile Ala Val Tyr Trp Leu Ala Leu Gly Leu Ala Val Ala Ala Phe Ala
            370                 375                 380

Met Ser Ala Arg Val Lys Asn Val
385                 390

<210> SEQ ID NO 64
<211> LENGTH: 398
<212> TYPE: PRT
<213> ORGANISM: Serratia marcescens
<220> FEATURE:
<221> NAME/KEY: MISC_FEATURE
<222> LOCATION: (1)..(398)
<223> OTHER INFORMATION: Marc, MFS transporter

<400> SEQUENCE: 64

Met Gln Arg Leu Ser Arg Leu Ser Leu Arg Ile Asn Pro Ile Phe Ala
1               5                   10                  15

Ala Phe Leu Leu Ile Ala Phe Leu Ser Gly Ile Ala Gly Ala Leu Leu
                20                  25                  30

Thr Pro Thr Leu Ser Leu Phe Leu Thr Thr Glu Val Lys Val Arg Pro
            35                  40                  45

Leu Trp Val Gly Leu Phe Tyr Thr Ala Asn Ala Val Ala Gly Ile Val
        50                  55                  60

Val Ser Phe Leu Leu Ala Lys Arg Ser Asp Thr Arg Gly Asp Arg Arg
65                  70                  75                  80

Arg Leu Ile Leu Leu Cys Cys Leu Met Ala Val Gly Asn Cys Leu Leu
                85                  90                  95

Phe Ala Phe Asn Arg Asp Tyr Leu Thr Leu Ile Thr Ala Gly Val Leu
            100                 105                 110

Met Ser Ala Val Ala Asn Thr Ala Met Pro Gln Ile Phe Ala Leu Ala
            115                 120                 125

Arg Glu Tyr Ala Asp Ser Glu Ala Arg Glu Val Val Met Phe Ser Ser
        130                 135                 140

Val Met Arg Ala Gln Leu Ser Leu Ala Trp Val Ile Gly Pro Pro Leu
145                 150                 155                 160

Ser Phe Ala Leu Ala Leu Asn Tyr Gly Phe Thr Val Met Phe Leu Ile
```

```
                    165                 170                 175
Ala Ala Val Thr Phe Ala Val Cys Val Leu Leu Val Gly Phe Met Leu
                180                 185                 190

Pro Ser Val Pro Arg Ala Ala Glu Asn Glu Gly Leu Gln Gly Gly Val
            195                 200                 205

Ser Ala Pro Ile Ala Pro Ala Ser Ala Trp Arg Asn Arg Asp Val Arg
210                 215                 220

Leu Leu Phe Ile Ala Ser Met Leu Met Trp Thr Cys Asn Thr Leu Tyr
225                 230                 235                 240

Ile Ile Asp Met Pro Leu Tyr Ile Thr Ala Asp Leu Gly Leu Pro Glu
                245                 250                 255

Gly Leu Ala Gly Val Leu Met Gly Thr Ala Ala Gly Leu Glu Ile Pro
            260                 265                 270

Ala Met Leu Leu Ala Gly Tyr Tyr Val Lys Arg Phe Gly Lys Arg Asn
        275                 280                 285

Met Met Leu Leu Ala Val Val Ala Gly Val Leu Phe Tyr Leu Gly Leu
        290                 295                 300

Thr Val Leu Glu Ser Lys Pro Ala Leu Ile Ala Leu Gln Leu Leu Asn
305                 310                 315                 320

Ala Val Phe Ile Gly Ile Val Ala Gly Ile Gly Met Leu Tyr Phe Gln
                325                 330                 335

Asp Leu Met Pro Gly Arg Pro Gly Ala Ala Thr Thr Leu Phe Thr Asn
            340                 345                 350

Ser Ile Ser Thr Gly Val Ile Leu Ala Gly Val Leu Gln Gly Ala Leu
        355                 360                 365

Val Glu Asn Leu Gly His Gly Ser Val Tyr Trp Met Ala Ala Leu Leu
        370                 375                 380

Ala Leu Ala Ala Leu Gly Met Ser Ala Lys Val Arg Glu Val
385                 390                 395

<210> SEQ ID NO 65
<211> LENGTH: 505
<212> TYPE: PRT
<213> ORGANISM: Klebsiella pneumoniae
<220> FEATURE:
<221> NAME/KEY: MISC_FEATURE
<222> LOCATION: (1)..(505)
<223> OTHER INFORMATION: ScrY

<400> SEQUENCE: 65

Met Tyr Lys Lys Arg Lys Leu Ala Ile Leu Ile Ala Leu Leu Thr Gly
1               5                   10                  15

Thr Ala Ala His Gly Gln Thr Asp Leu Asn Ser Ile Glu Ala Arg
            20                  25                  30

Leu Ala Ala Leu Glu Lys Arg Leu Gln Asp Ala Glu Thr Arg Ala Ser
        35                  40                  45

Thr Ala Glu Ser Arg Ala Ala Ser Ala Glu Lys Val Gln Gln Leu
    50                  55                  60

Thr Gln Gln Gln Gln Thr Gln Ala Thr Thr Gln Val Ala Arg
65                  70                  75                  80

Arg Thr Thr Gln Leu Glu Glu Lys Ala Glu Arg Pro Gly Gly Phe Glu
                85                  90                  95

Phe His Gly Tyr Ala Arg Ser Gly Val Ile Met Asn Asp Ser Ala Ala
            100                 105                 110

Ser Thr Lys Ser Gly Ala Tyr Met Thr Pro Ala Gly Glu Thr Gly Gly
        115                 120                 125
```

Ala Ile Gly Arg Leu Gly Asn Gln Ala Asp Thr Tyr Val Glu Met Asn
130                 135                 140

Leu Glu His Lys Gln Thr Leu Asp Asn Gly Ala Thr Thr Arg Phe Lys
145                 150                 155                 160

Val Met Val Ala Asp Gly Gln Thr Thr Tyr Asn Asp Trp Thr Ala Ser
            165                 170                 175

Ser Ser Asp Leu Asn Val Arg Gln Ala Phe Val Glu Leu Gly Asn Leu
        180                 185                 190

Pro Thr Phe Glu Gly Pro Phe Lys Gly Ser Thr Leu Trp Ala Gly Lys
    195                 200                 205

Arg Phe Asp Arg Asp Asn Phe Asp Ile His Trp Ile Asp Ser Asp Val
210                 215                 220

Val Phe Leu Ala Gly Thr Gly Gly Ile Tyr Asp Val Lys Trp Asn
225                 230                 235                 240

Asp Ser Leu Arg Ser Asn Phe Ser Leu Tyr Gly Arg Asn Phe Gly Asp
                245                 250                 255

Ile Ala Asp Ser Ser Asn Ser Val Gln Asn Tyr Ile Val Ser Met Asn
            260                 265                 270

Asn Phe Ala Gly Pro Val Gln Met Met Val Ser Gly Met Arg Ala Lys
        275                 280                 285

Asp Asn Asp Asp Arg Gln Asp Ala Asn Gly Asn Leu Val Lys Gly Asp
290                 295                 300

Ala Ala Asn Thr Gly Val His Ala Leu Leu Gly Leu His Asn Glu Ser
305                 310                 315                 320

Phe Tyr Gly Leu Arg Asp Gly Thr Ser Lys Thr Ala Leu Leu Tyr Gly
                325                 330                 335

His Gly Leu Gly Ala Glu Val Lys Gly Ile Gly Ser Asp Gly Ala Leu
            340                 345                 350

Arg Pro Gly Ala Asn Thr Trp Arg Phe Ala Ser Tyr Gly Thr Thr Pro
        355                 360                 365

Leu Ser Asp Arg Trp Phe Ile Ala Pro Ala Val Leu Ala Gln Ser Ser
370                 375                 380

Lys Asp Arg Tyr Val Asp Gly Asp Ser Tyr Gln Trp Ala Thr Leu Asn
385                 390                 395                 400

Leu Arg Leu Ile Gln Glu Val Thr Gln Asn Phe Ala Leu Ala Trp Glu
                405                 410                 415

Gly Ser Tyr Gln Tyr Met Asp Leu Gln Pro Glu Gly Tyr Asn Asp Arg
            420                 425                 430

His Ala Val Asn Gly Ser Phe Tyr Lys Leu Thr Phe Ala Pro Thr Phe
        435                 440                 445

Lys Val Gly Ser Ile Gly Asp Phe Phe Ser Arg Pro Glu Ile Arg Phe
450                 455                 460

Tyr Thr Ser Trp Met Asp Trp Ser Lys Lys Leu Asp Asn Tyr Ala Asn
465                 470                 475                 480

Asp Asp Ala Leu Gly Ser Asn Gly Phe Lys Ser Gly Gly Glu Trp Ser
                485                 490                 495

Phe Gly Met Gln Met Glu Thr Trp Phe
            500                 505

<210> SEQ ID NO 66
<211> LENGTH: 456
<212> TYPE: PRT
<213> ORGANISM: Klebsiella pneumoniae
<220> FEATURE:

-continued

```
<221> NAME/KEY: MISC_FEATURE
<222> LOCATION: (1)..(456)
<223> OTHER INFORMATION: ScrA

<400> SEQUENCE: 66
```

| | | | | | | | | | | | | | | |
|---|---|---|---|---|---|---|---|---|---|---|---|---|---|---|
| Met | Asp | Phe | Glu | Gln | Ile | Ser | Arg | Ser | Leu | Leu | Pro | Leu | Leu | Gly | Gly |
| 1 | | | | 5 | | | | | 10 | | | | | 15 | |
| Lys | Glu | Asn | Ile | Ala | Ser | Ala | Ala | His | Cys | Ala | Thr | Arg | Leu | Arg | Leu |
| | | | 20 | | | | | 25 | | | | | 30 | | |
| Val | Leu | Val | Asp | Asp | Ala | Leu | Ala | Asp | Gln | Gln | Ala | Ile | Gly | Lys | Ile |
| | | 35 | | | | | 40 | | | | | 45 | | | |
| Asp | Gly | Val | Lys | Gly | Cys | Phe | Arg | Asn | Ala | Gly | Gln | Met | Gln | Ile | Ile |
| 50 | | | | | 55 | | | | | 60 | | | | | |
| Phe | Gly | Thr | Gly | Val | Val | Asn | Lys | Val | Tyr | Ala | Ala | Phe | Ile | Gln | Ala |
| 65 | | | | | 70 | | | | | 75 | | | | | 80 |
| Ala | Gly | Ile | Ser | Glu | Ser | Ser | Lys | Ser | Glu | Ala | Ala | Asp | Leu | Ala | Ala |
| | | | | 85 | | | | | 90 | | | | | 95 | |
| Lys | Lys | Leu | Asn | Pro | Phe | Gln | Arg | Ile | Ala | Arg | Leu | Leu | Ser | Asn | Ile |
| | | | 100 | | | | | 105 | | | | | 110 | | |
| Phe | Val | Pro | Ile | Ile | Pro | Ala | Ile | Val | Ala | Ser | Gly | Leu | Leu | Met | Gly |
| | | 115 | | | | | 120 | | | | | 125 | | | |
| Leu | Leu | Gly | Met | Val | Lys | Thr | Tyr | Gly | Trp | Val | Asp | Pro | Ser | Asn | Ala |
| | | 130 | | | | | 135 | | | | | 140 | | | |
| Leu | Tyr | Ile | Met | Leu | Asp | Met | Cys | Ser | Ser | Ala | Ala | Phe | Ile | Ile | Leu |
| 145 | | | | | 150 | | | | | 155 | | | | | 160 |
| Pro | Ile | Leu | Ile | Gly | Phe | Thr | Ala | Ala | Arg | Glu | Phe | Gly | Gly | Asn | Pro |
| | | | | 165 | | | | | 170 | | | | | 175 | |
| Tyr | Leu | Gly | Ala | Thr | Leu | Gly | Gly | Ile | Leu | Thr | His | Pro | Ala | Leu | Thr |
| | | | 180 | | | | | 185 | | | | | 190 | | |
| Asn | Ala | Trp | Gly | Val | Ala | Ala | Gly | Phe | His | Thr | Met | Asn | Phe | Phe | Gly |
| | | 195 | | | | | 200 | | | | | 205 | | | |
| Ile | Glu | Val | Ala | Met | Ile | Gly | Tyr | Gln | Gly | Thr | Val | Phe | Pro | Val | Leu |
| | | | 210 | | | | | 215 | | | | | 220 | | |
| Leu | Ala | Val | Trp | Phe | Met | Ser | Met | Val | Glu | Lys | Arg | Leu | Arg | Arg | Val |
| 225 | | | | | 230 | | | | | 235 | | | | | 240 |
| Ile | Pro | Asp | Ala | Leu | Asp | Leu | Ile | Leu | Thr | Pro | Phe | Leu | Thr | Val | Ile |
| | | | | 245 | | | | | 250 | | | | | 255 | |
| Ile | Ser | Gly | Phe | Ile | Ala | Leu | Leu | Ile | Gly | Pro | Ala | Gly | Arg | Ala | |
| | | | 260 | | | | | 265 | | | | | 270 | | |
| Leu | Gly | Asp | Gly | Ile | Ser | Phe | Ile | Leu | Ser | Thr | Leu | Ile | Ser | His | Ala |
| | | | 275 | | | | | 280 | | | | | 285 | | |
| Gly | Trp | Leu | Ala | Gly | Leu | Leu | Phe | Gly | Gly | Leu | Tyr | Ser | Val | Ile | Val |
| | | 290 | | | | | 295 | | | | | 300 | | | |
| Ile | Thr | Gly | Ile | His | His | Ser | Phe | His | Ala | Ile | Glu | Ala | Gly | Leu | Leu |
| 305 | | | | | 310 | | | | | 315 | | | | | 320 |
| Gly | Asn | Pro | Ser | Ile | Gly | Val | Asn | Phe | Leu | Leu | Pro | Ile | Trp | Ala | Met |
| | | | | 325 | | | | | 330 | | | | | 335 | |
| Ala | Asn | Val | Ala | Gln | Gly | Gly | Ala | Cys | Phe | Ala | Val | Trp | Phe | Lys | Thr |
| | | | 340 | | | | | 345 | | | | | 350 | | |
| Lys | Asp | Ala | Lys | Ile | Lys | Ala | Ile | Thr | Leu | Pro | Ser | Ala | Phe | Ser | Ala |
| | | | 355 | | | | | 360 | | | | | 365 | | |
| Met | Leu | Gly | Ile | Thr | Glu | Ala | Ala | Ile | Phe | Gly | Ile | Asn | Leu | Arg | Phe |
| | | 370 | | | | | 375 | | | | | 380 | | | |
| Val | Lys | Pro | Phe | Ile | Ala | Ala | Leu | Val | Gly | Gly | Ala | Ala | Gly | Gly | Ala |

```
                385                 390                 395                 400

Trp Val Val Ser Met His Val Tyr Met Thr Ala Val Gly Leu Thr Ala
                    405                 410                 415

Ile Pro Gly Met Ala Ile Val Gln Ala Ser Ser Leu Leu Asn Tyr Ile
                    420                 425                 430

Ile Gly Met Ala Ile Ala Phe Ala Val Ala Phe Ala Leu Ser Leu Thr
                    435                 440                 445

Leu Lys Tyr Lys Thr Asp Ala Glu
    450                 455

<210> SEQ ID NO 67
<211> LENGTH: 466
<212> TYPE: PRT
<213> ORGANISM: Salmonella enterica subsp. enterica serovar Typhimurium
<220> FEATURE:
<221> NAME/KEY: MISC_FEATURE
<222> LOCATION: (1)..(466)
<223> OTHER INFORMATION: ScrB

<400> SEQUENCE: 67

Met Ser Leu Pro Ser Arg Leu Pro Ala Ile Leu Gln Ala Val Met Gln
1               5                   10                  15

Gly Gln Pro Arg Ala Leu Ala Asp Ser His Tyr Pro Arg Trp His His
            20                  25                  30

Ala Pro Val Thr Gly Leu Met Asn Asp Pro Asn Gly Phe Ile Glu Phe
        35                  40                  45

Ala Gly Arg Tyr His Leu Phe Tyr Gln Trp Asn Pro Leu Ala Cys Asp
    50                  55                  60

His Thr Phe Lys Cys Trp Ala His Trp Ser Ser Ile Asp Leu Leu His
65                  70                  75                  80

Trp Gln His Glu Pro Ile Ala Leu Met Pro Asp Glu Glu Tyr Asp Arg
                85                  90                  95

Asn Gly Cys Tyr Ser Gly Ser Ala Val Asp Asn Asn Gly Thr Leu Thr
            100                 105                 110

Leu Cys Tyr Thr Gly Asn Val Lys Phe Ala Glu Gly Arg Thr Ala
        115                 120                 125

Trp Gln Cys Leu Ala Thr Glu Asn Ala Asp Gly Thr Phe Arg Lys Ile
    130                 135                 140

Gly Pro Val Leu Pro Leu Pro Glu Gly Tyr Thr Gly His Val Arg Asp
145                 150                 155                 160

Pro Lys Val Trp Arg His Glu Asp Leu Trp Tyr Met Val Leu Gly Ala
                165                 170                 175

Gln Asp Arg Gln Lys Arg Gly Lys Val Leu Leu Phe Ser Ser Ala Asp
            180                 185                 190

Leu His Gln Trp Thr Ser Met Gly Glu Ile Ala Gly His Gly Ile Asn
        195                 200                 205

Gly Leu Asp Asp Val Gly Tyr Met Trp Glu Cys Pro Asp Leu Phe Pro
    210                 215                 220

Leu Gly Asp Gln His Ile Leu Ile Cys Cys Pro Gln Gly Ile Ala Arg
225                 230                 235                 240

Glu Glu Glu Cys Tyr Leu Asn Thr Tyr Pro Ala Val Trp Met Ala Gly
                245                 250                 255

Glu Phe Asp Tyr Ala Ala Gly Ala Phe Arg His Gly Glu Leu His Glu
            260                 265                 270

Leu Asp Ala Gly Phe Glu Phe Tyr Ala Pro Gln Thr Met Leu Thr Ser
        275                 280                 285
```

```
Asp Gly Arg Arg Leu Leu Val Gly Trp Met Gly Val Pro Glu Gly Glu
        290                 295                 300
Glu Met Leu Gln Pro Thr Leu Asn Asn Gly Trp Ile His Gln Met Thr
305                 310                 315                 320
Cys Leu Arg Glu Leu Glu Phe Ile Asn Gly Gln Leu Tyr Gln Arg Pro
                325                 330                 335
Leu Arg Glu Leu Ser Ala Leu Arg Gly Glu Ala Asn Gly Trp Ser Gly
            340                 345                 350
Asn Ala Leu Pro Leu Ala Pro Met Glu Ile Asp Leu Gln Thr Arg Gly
        355                 360                 365
Gly Asp Met Leu Ser Leu Asp Phe Gly Gly Val Leu Thr Leu Glu Cys
    370                 375                 380
Asp Ala Ser Gly Leu Arg Leu Ala Arg Arg Ser Leu Ala Ser Asp Glu
385                 390                 395                 400
Met His Tyr Arg Tyr Trp Arg Gly Asn Val Arg Ser Leu Arg Val Phe
                405                 410                 415
Ile Asp Gln Ser Ser Val Glu Ile Phe Ile Asn Gly Gly Glu Gly Val
            420                 425                 430
Met Ser Arg Tyr Phe Pro Ala Cys Ser Gln Leu Thr Phe Ser
        435                 440                 445
Gly Ile Thr Pro Asp Ala Phe Cys Tyr Trp Pro Leu Arg Thr Cys Met
    450                 455                 460
Val Glu
465

<210> SEQ ID NO 68
<211> LENGTH: 334
<212> TYPE: PRT
<213> ORGANISM: Salmonella enterica subsp. enterica serovar Typhimurium
<220> FEATURE:
<221> NAME/KEY: MISC_FEATURE
<222> LOCATION: (1)..(334)
<223> OTHER INFORMATION: ScrR

<400> SEQUENCE: 68

Met Lys Thr Lys Arg Val Thr Ile Lys Asp Ile Ala Glu Gln Ala Gly
1               5                   10                  15
Val Ser Lys Ala Thr Ala Ser Leu Val Leu Asn Gly Arg Gly Lys Glu
            20                  25                  30
Leu Arg Val Ala Gln Glu Thr Arg Glu Arg Val Leu Ser Ile Ala Arg
        35                  40                  45
Lys His His Tyr Gln Pro Ser Ile His Ala Arg Ser Leu Arg Asn Asn
    50                  55                  60
Arg Ser His Thr Ile Gly Leu Val Val Pro Glu Ile Thr Asn His Gly
65                  70                  75                  80
Phe Ala Val Phe Ala His Glu Leu Glu Met Leu Cys Arg Glu Ala Gly
                85                  90                  95
Val Gln Leu Leu Ile Ser Cys Thr Asp Glu Asn Pro Gly Gln Glu Ser
            100                 105                 110
Val Val Val Asn Asn Met Ile Ala Arg Gln Val Asp Gly Met Ile Val
        115                 120                 125
Ala Ser Cys Met His Asn Asp Ala Asp Tyr Leu Lys Leu Ser Gln Gln
    130                 135                 140
Leu Pro Val Val Leu Phe Asp Arg Cys Pro Asn Glu Ser Ala Leu Pro
145                 150                 155                 160
```

-continued

```
Leu Val Met Thr Asp Ser Ile Thr Pro Thr Ala Glu Leu Ile Ser Arg
                165             170                 175

Ile Ala Pro Gln His Ser Asp Glu Phe Trp Phe Leu Gly Gly Gln Ala
            180             185                 190

Arg Leu Ser Pro Ser Arg Asp Arg Leu Thr Gly Phe Thr Gln Gly Leu
        195             200                 205

Ala Gln Ala Gly Ile Ala Leu Arg Pro Glu Trp Val Ile Asn Gly Asn
    210             215                 220

Tyr His Pro Ser Ser Gly Tyr Glu Met Phe Ala Ala Leu Cys Ala Arg
225             230             235                 240

Leu Gly Arg Pro Pro Lys Ala Leu Phe Thr Ala Ala Cys Gly Leu Leu
            245             250                 255

Glu Gly Val Leu Arg Tyr Met Ser Gln His His Leu Leu Asp Ser Asp
            260             265                 270

Ile His Leu Thr Ser Phe Asp Asp His Tyr Leu Tyr Asp Ser Leu Ser
        275             280                 285

Leu Arg Ile Asp Thr Val Gln Gln Asp Asn Arg Gln Leu Ala Trp His
        290             295                 300

Cys Tyr Asp Leu Ile Ser Gln Leu Ile Glu Gly Asp Thr Pro Glu Thr
305             310             315                 320

Leu Gln Arg Tyr Leu Pro Ala Thr Leu Gln Phe Arg His Gln
                325             330
```

MICROBIAL STRAIN EXPRESSING AN INVERTASE/SUCROSE HYDROLASE

CROSS-REFERENCE TO RELATED APPLICATIONS

This application is a National Stage entry pursuant to 35 U.S.C. § 371 of International Application No. PCT/EP2022/063314, filed on May 17, 2022, which claims priority to Denmark Application No. PA202170248, filed on May 17, 2021 and Denmark Application No. PA202270138, filed on Mar. 25, 2022, the entire contents of all of which are hereby incorporated by reference in their entirety.

SEQUENCE LISTING

This instant application contains a sequence listing which has been submitted in a ascii text file via Patent Center and is hereby incorporated by reference in its entirety. Said text file, created on Nov. 15, 2023, is named 032991-8010 sequence listing.txt, and is 83,807 bytes in size.

FIELD

The disclosure relates to a genetically modified cell capable of utilizing sucrose as energy and carbon source following the expression of a single heterologous enzyme, which upon expression is translocated from the cytosol and which is capable of hydrolysing non-phosphorylated sucrose into fructose and glucose.

BACKGROUND

The use of microbial cells in biosynthetic production such as useful chemicals as well as pharmaceutical products has continuously developed during the last decades. In this respect the biotechnological industry strives to develop (an)aerobic bioprocesses fueled by abundant and cheap carbon sources, like sucrose. This applies both in the biosynthetic production of human milk oligosaccharides, as well as for the production of other biosynthetic products.

Human milk oligosaccharides (HMO(s)) have become of great interest in the last decade, due to the discovery of their important functionality in human development. Besides their prebiotic properties, HMO(s) have been linked to additional positive effects, expanding their field of application. The health benefits of HMO(s) have enabled their approval for use in foods, such as infant formulas and foods, and for consumer health products.

To date, the structures of at least 115 HMO(s) have been determined, and considerably more are probably present in human milk.

Due to the limited availability of HMO(s), an effective commercial, i.e., large scale production, is highly desirable. The manufacturing of large-scale quantities as well as qualities, required for food and medical applications, through chemical synthesis, has yet to be provided. Furthermore, chemical synthetic routes to HMO(s) involve several noxious chemicals, which impose a contamination risk to the final product.

To bypass the drawbacks associated with chemical synthesis of HMO(s), several enzymatic methods and fermentative approaches have been developed. Fermentation based processes have been developed for several HMO(s), such as 2'-fucosyllactose, 3-fucosyllactose, lacto-N-tetraose, lacto-N-neotetraose, 3'-sialyllactose and 6'-sialyllactose. Fermentation based processes typically utilize genetically modified bacterial strains, such as recombinant *Escherichia coli* (*E. coli*), or yeast, such as *Saccharomyces cerevisiae* (*S. cerevisiae*) (see for example Bych et al Current Opinion in Biotechnology 56:130-137 and Lu et al 2021 ACS Synth. Biol. 10: 923-938).

Biosynthetic production of HMO(s) in modified bacterial strains is a valuable, cost-efficient and large-scale applicable solution for HMO manufacturing. It relies on genetically modified bacteria constructed so as to express the glycosyltransferases needed for synthesis of the desired oligosaccharides and takes advantage of the bacteria's innate pool of nucleotide sugars as HMO precursors.

Recent developments in biotechnological production of HMO(s) have made it possible to overcome certain inherent limitations of bacterial expression systems. For example, HMO-producing bacterial cells may be genetically modified to increase the limited intracellular pool of nucleotide sugars in the bacteria (WO2012/112777), to improve activity of enzymes involved in the HMO production (WO2016/040531), or to facilitate the secretion of synthesized HMO(s) into the extracellular media (WO2010/142305, WO2017/042382). Further, expression of genes of interest in recombinant cells may be regulated by using particular promoter sequences or other gene expression regulators, like e.g., as recently described in WO2019/123324.

The metabolic pathways of such biosynthetic production of HMO(s) require a carbon source which is mainly a simple carbon building block. Typically, glycerol, glucose, or lactose have been used, (see e.g. WO2001/04341, Priem et al. Glycobiology 12, 235 (2002), Fort et al. Chem. Comm. 2558 (2005), Drouillard et al. Angew. Chem. Int. Ed. 45, 1778 (2006), WO2010/070104, WO2012/112777, WO2013/182206, WO2014/048439).

Further, around 50% of wild-type *E. coli* are able to utilize sucrose as a, or even as the sole, carbon and energy source, but most of them are pathogenic. However, in some cases, sucrose would be a cheaper sole carbon and sole energy source. It can be directly fermented (either as cane juice or as molasses), or it can be easily made into pure sugar by high-temperature crystallization, whereas glucose has to be converted from starch by milling and enzymatic hydrolysis. Further, sucrose-based bioprocesses are more environmentally friendly and sustainable than glucose-based bioprocesses. Finally, the lack of a chemically reactive reducing end in the sucrose molecule, leads to a much cleaner impurity profile after heat-sterilisation and fermentation, when compared with glucose. As a result of these primary factors, the associated overall bioprocess cost is decreased relative to that with glucose. In addition, sucrose is highly abundant and readily available.

For this reason, attempts have been made to create de novo non-pathogenic strains of *E. coli* that can live and grow on sucrose (Suc$^+$) (e.g., Sabri et al. *Appl. Environ. Microbiol* 79, 478 (2013)) and to produce industrially profitable products by them, such as amino acids, biofuel, carotenoids etc. *E. coli* strains have been engineered by transfer of sucrose catabolic capabilities into non-sucrose-utilizing strains mainly in industry to synthesize chemical materials such as petrochemicals. However, these Suc$^+$ transformants have generally been less productive than Suc$^-$ strains (Khamduang et al. J. Ind. Microbiol. Biotechnol. 36, 1267 (2009)). Therefore, complete sucrose utilizing cassette systems have been transferred which in combination confer efficient sucrose catabolism when integrated onto the *E. coli* chromosome (Bruschi et al. *Biotechnol. Adv.* 30, 1001 (2012)).

WO2012/007481 and WO2009/078687 describes *E. coli* transformants that express either a sucrose phosphorylase, sucrose-6-phosphate hydrolase or a sucrose invertase in combination with a fructokinase. Thereby, the microorganism is able to produce 2'-fucosyllactose, utilizing sucrose as its main carbon source. Furthermore, WO2014/067696 describes an *E. coli* transformant comprising a csc-gene cluster comprising the genes sucrose permease, fructokinase, sucrose hydrolase, and a transcriptional repressor (genes cscB, cscK, cscA, and cscR, respectively), that enables it to grow on sucrose and to produce fucose.

WO2015/197082 describes *E. coli* that comprises a heterologous PTS-dependent sucrose utilization transport system containing a sucrose specific porin, a sucrose transport protein and a sucrose-6-phosphate hydrolase. The oxidation of glucose-6-phosphate and fructose thus provides a biological energy source by the organism's own metabolic system. Also, glucose-6-phosphate and fructose serve as carbon source for producing sugar nucleotides in the cell's natural biosynthetic pathway. The so-produced sugar nucleotides are donors for glycosylating carbohydrate acceptors (e.g. lactose), internalized through a specific permease by the cell, and thereby manufacturing oligosaccharides of interest. The glycosylation is mediated by one or more glycosyl transferases which are directly produced by expressing heterologous genes. The organism lacks any enzyme degrading either the acceptor or the oligosaccharide product in the cell.

The present disclosure for the first time shows a genetically modified cell capable of utilizing sucrose as energy and/or carbon source following the expression of a single heterologous enzyme, thus overcoming the need for the expression of multiple proteins and protein complexes in order to enable the utilization of sucrose as an energy and carbon source.

SUMMARY

Presently disclosed is a genetically modified cell capable of utilizing sucrose as energy and carbon source following the expression of a single heterologous enzyme, which upon expression is to a sufficient extent translocated from the cytosol and which is capable of hydrolysing sucrose into fructose and glucose. The genetically modified cell described herein is thus capable of utilizing sucrose as its main, or in some embodiments even as its sole carbon and energy source.

The identification of efficient enzymes capable of hydrolysing sucrose in its non-modified form, and which alone or on its own enable the cell to utilize sucrose as the main and/or the sole, carbon and/or energy source, i.e. without the need for a multi-gene sucrose utilizing cassette system, comprising several other heterologous polypeptides, such as other enzymes and/or transporters, is highly advantageous, since it allows for cost-effective use of sucrose in large scale biosynthesis production processes. It reduces considerably the need and costs associated therewith of the removal of by-products and metabolites from the fermentation product during purification of the final product. A further advantage of the use of a sucrose hydrolysing enzyme capable of hydrolysing sucrose into fructose and glucose on the extracellular or periplasmic side of the genetically modified cell, is that sucrose does not enter the cell, where if in excess sucrose will contribute to metabolic overflow leading to formation of metabolites like lactate, acetate and ethanol which can negatively affect cell growth and production capabilities.

In its broadest sense, the present disclosure thus relates to a genetically modified cell which comprises a heterologous nucleic acid sequence encoding a heterologous polypeptide, which upon expression is at least to a sufficient degree translocated from the cytosol to be located extracellularly, periplasmic and/or membrane-bound or membrane-embedded and which is capable of hydrolysing sucrose into fructose and glucose outside the cell or in the periplasmic space, wherein the expression of said heterologous polypeptide alone or on its own enables the utilization of sucrose as the main and/or the sole, carbon source and/or energy source of said genetically modified cell, without sucrose entering the cytosol of the host cell. The polypeptide is after expression typically located extracellularly and/or in the periplasmic space and/or in the cytosolic membrane. When said heterologous polypeptide is an invertase, it is capable of hydrolysing non-phosphorylated sucrose into fructose and glucose.

Thus, an aspect of the invention relates to a genetically modified cell which comprises a heterologous nucleic acid sequence encoding a an invertase, wherein said invertase is SacC Agal comprising or consisting of the amino acid sequence of SEQ ID NO: 1 or a functional homologue thereof, having an amino acid sequence which is at least 80% identical to SEQ ID NO: 1.

The heterologous nucleic acid sequence can be provided to the cell episomally (i.e., by a multi-copy plasmid) and/or chromosomally (i.e., by genomic integration). It can comprise a single, or multiple copies of the heterologous gene, such as at least two genomically integrated copies of the heterologous nucleic acid sequence encoding the invertase. In embodiments, the heterologous nucleic acid sequence encodes an episomal and/or genomically integrated copy of the invertase The heterologous polypeptide is capable of hydrolysing non-phosphorylated sucrose, i.e., sucrose in its non-modified form, into fructose and glucose. In one embodiment, the heterologous polypeptide is an invertase. The heterologous polypeptide on its own does not transport sucrose and it does not encode a complete sucrose utilization system. In another embodiment, the invertase is capable of hydrolysing non-phosphorylated sucrose. An invertase of the present invention is in that regard an invertase capable of hydrolysing sucrose into fructose and glucose in the periplasmic space and/or on the extracellular side of the cell. Furthermore, in embodiments, the expression of said invertase enables utilization of sucrose as the main and/or the sole carbon source and/or as the main and/or the sole energy source of the genetically modified cell of the present invention. In that regard, in embodiments, the genetically modified cell of the present invention does not contain a complete sucrose utilization system.

In addition, in the genetically modified cell the endogenous glucose transport system is fully or partially inactivated. Accordingly, in a preferred embodiment, the ptsG gene of the genetically modified cell, encoding a cytoplasmic-membrane glucose permease is fully or partially inactivated.

In a presently preferred embodiment, a genetically modified cell according to the present disclosure is further capable of producing one or more human milk oligosaccharide(s) (HMO(s)).

In one embodiment, the heterologous polypeptide is any one of SEQ ID NOs: 1 or 2, or a functional homologue of any one of SEQ ID NOs: 1 or 2, having an amino acid sequence which is at least 70% identical to any one of SEQ ID NOs: 1 or 2.

In a presently preferred embodiment, the heterologous polypeptide is a glycoside hydrolase family 32 protein from

*Avibacterium gallinarum*, as shown in SEQ ID NO: 1 (SacC Agal), or a functional homologue thereof, having an amino acid sequence which is at least 70%, such as at least 80%, such as at least 85%, such as at least 90%, such as at least 95% or such as ae least 99% identical to SEQ ID NO: 1.

In another presently preferred embodiment, the heterologous polypeptide is a beta-fructofuranosidase protein from *Arthrobacter globiformis* IFO 3062, as shown in SEQ ID NO: 2 (Bff), or a functional homologue thereof, having an amino acid sequence which is at least 70%, such as at least 80%, such as at least 85%, such as at least 90%, such as at least 95% or such as ae least 99% identical to SEQ ID NO: 2.

The heterologous nucleic acid sequence can further comprise a regulatory element for regulating the expression of the heterologous nucleic acid sequence, comprising e.g., one or more inducible promoter sequence(s) and/or one or more constitutive promoter sequence(s). The regulatory element can be a promoter selected from the group consisting of a PglpF (SEQ ID NO: 42) or Plac (SEQ ID NO: 51) or PmglB_UTR70 (SEQ ID NO: 38) or PglpA_70UTR (SEQ ID NO: 39) or PglpT_70UTR (SEQ ID NO: 40) or variants of these promoters as identified in Table 6.

The heterologous nucleic acid sequence can further encode a signal peptide capable of enhancing the continuous secretion of said heterologous polypeptide into the periplasm of the genetically modified cell and/or into the fermentation media. In a preferred embodiment, said signal peptide is selected from table 1, and is preferably the signal peptide of SEQ ID NO: 28.

Typically, a genetically modified cell according to any of the preceding claims is a single-celled organism, such as a prokaryotic or a eukaryotic cell. In particular embodiments the genetically modified cell is selected from a yeast cell of the genera Komagataella, *Kluyveromyces, Yarrowia, Pichia, Saccaromyces, Schizosaccharomyces* or *Hansenula* or from a filamentous fungous of the genera *Aspargillus, Fusarium* or Thricoderma. Alternatively, in embodiments, the genetically modified cell is selected from the group consisting of *Escherichia* sp., *Bacillus* sp., *lactobacillus* sp. and *Campylobacter* sp. In particular, a genetically modified cell according to the present disclosure can be *Escherichia coli*.

The invention also relates to the use of a genetically modified cell according to the present invention, for biosynthetic production. In particular, the invention relates to the biosynthetic production of one or more HMO(s). In that regard, the present invention relates to a method for the biosynthetic production of one or more HMO(s), the method comprising the steps of: a) providing a genetically modified cell according to the invention, b) culturing the cell of (a) in a suitable cell culture medium, containing sucrose as a carbon source, and c) harvesting the HMO(s) produced in step (b). Accordingly, in a method for the biosynthetic production of one or more HMO(s) of the present invention, the invertase in the genetically modified cell of step a) on its own is capable of hydrolysing sucrose into fructose and glucose on the extracellular side and/or in the periplasmic space of the genetically modified cell, and wherein the expression of said enzyme is sufficient to enable utilization of sucrose as carbon and/or as energy source of said genetically modified cell. Thus, in embodiments, the sucrose in step b) is the main and/or sole carbon source and/or energy source.

Alternatively, the invention also relates to a method for biosynthetic production in a genetically modified host cell capable of producing a desired biosynthetic product, the method comprising the steps of: a) providing a non-sucrose-utilizing (Suc⁻) host cell or a host cell with limited and/or inefficiently ability to utilize sucrose capable of producing the desired biosynthetic product, b) introducing into said host cell a heterologous nucleic acid sequence encoding a invertase, wherein said invertase is SacC Agal comprising or consisting of the amino acid sequence of SEQ ID NO: 1 or a functional homologue thereof, having an amino acid sequence which is at least 80% identical to SEQ ID NO: 1, optionally wherein, the ptsG gene of said host cell, encoding a glucose permease is fully or partially inactivated, c) culturing the cell of (b) in a suitable cell culture medium, containing sucrose as the, the main and/or the sole, carbon source and/or as an, the main and/or the sole energy source, and d) harvesting the biosynthetic product produced in step c).

A modified cell according to the present disclosure can be used for the expression of a heterologous polypeptide as described herein, which can be harvested, purified and/or isolated and be used for the in vitro production of fructose and glucose from sucrose.

A modified cell according to the present disclosure can be used to produce fructose and glucose.

A modified cell according to the present disclosure can be used for the biosynthetic production of one or more HMO(s).

The invention thus also relates to an invertase which is capable of hydrolysing sucrose into glucose and fructose, for use in a biosynthetic production, wherein the invertase is SacC Agal comprising or consisting of the amino acid sequence of SEQ ID NO: 1 or a functional homologue thereof, having an amino acid sequence which is at least 80% identical to SEQ ID NO: 1. In addition the invertase is capable of hydrolysing non-phosphorylated sucrose into fructose and glucose in the periplasmic space and/or on the extracellular side of the cell used in the biosynthetic production. Accordingly, the invertase of the present invention may also be for use in the biosynthetic production of one or more HMOs.

The present disclosure thus further relates to a method for the biosynthetic production of one or more HMO(s), the method comprising the steps of (a) providing a genetically modified cell according to the present disclosure, (b) culturing the cell of (a) in a suitable cell culture medium containing sucrose as one, or as the main, or even the sole carbon source, and (c) harvesting the HMO(s) produced in step (b).

Figure 1:
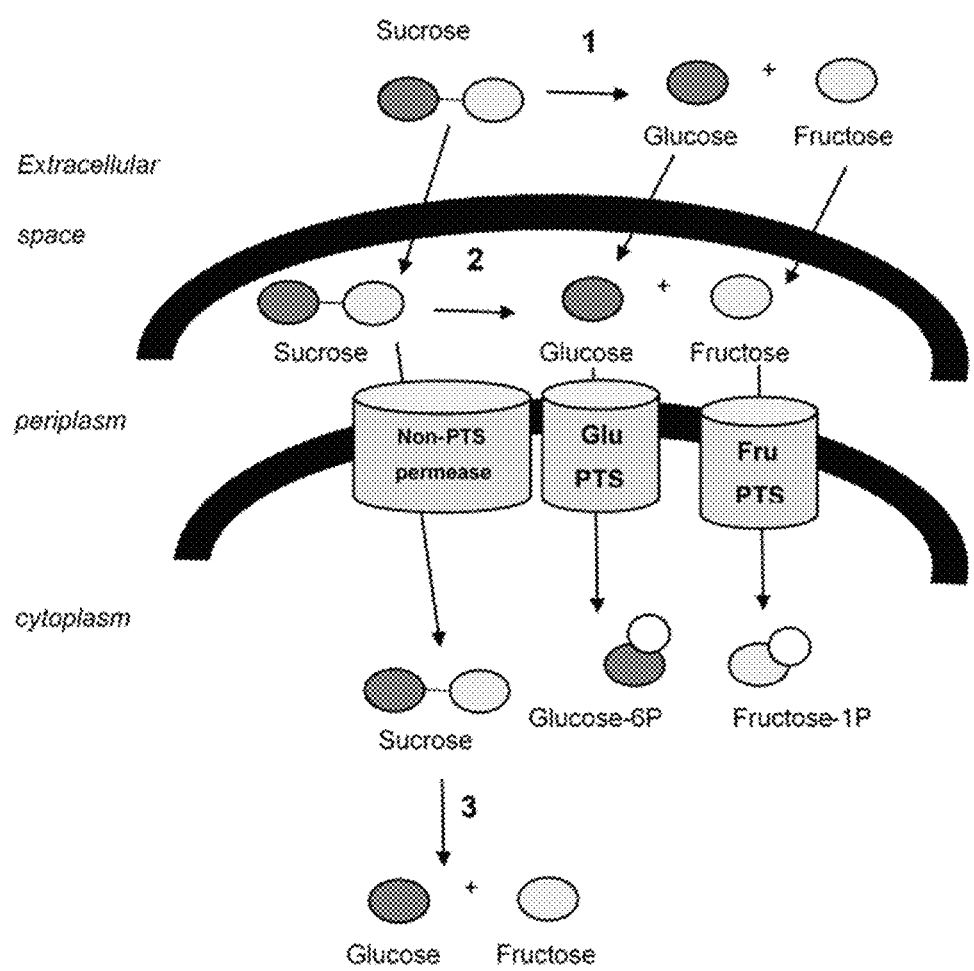
FIG. 1

A genetically modified cell capable of utilizing sucrose as energy and carbon source by simply expressing a single heterologous enzyme, as described in the framework of the present disclosure. The possible localizations of such heterologous enzymes are denoted by a numeric indicator: cell exterior (1), periplasm (2) or cytoplasm (3).

FIG. 2

Batch growth profile on sucrose for *E. coli* cells that do or do not express proteins that enable the utilization of sucrose as the main and/or the sole, carbon source and/or energy source. ScrYA-ScrBR: sucrose utilization technology as described in WO2015/197082, SacC_Msuc & SacA_Bsuc: enzymes used for sucrose hydrolysis as described in WO2009/078687A2, SacC_Agal & Bff: enzymes for sucrose utilization as described in the present disclosure.

FIG. 3

Batch growth profile on sucrose for *E. coli* cells expressing the enzyme SacC_Agal or the sucrose utilization system ScrBRYA. ScrYA-ScrBR: sucrose utilization technology as described in WO2015/197082, SacC_Agal (×1, ×2, ×3): enzymes for sucrose utilization as described in the present disclosure. The copy number of the SacC_Agal gene in different strains is provided in the parenthesis; ×1 denotes one SacC_Agal copy, ×2 denotes two SacC_Agal copies and ×3 denotes three SacC_Agal copies.

FIG. 4

Relative growth rate on sucrose in batch mode cultures of strains that do or do not express proteins that enable the utilization of sucrose a, and/or the main and/or the sole, carbon source and/or energy source. ScrYA-ScrBR: sucrose utilization technology as described in WO2015197082, SacC_Msuc & SacA_Bsub: enzymes used for sucrose hydrolysis as described in WO2009078687A2, SacC_Agal and Bff: enzymes for sucrose utilization as described in the present disclosure. The copy number of the SacC_Agal gene in different strains is provided in the parenthesis; ×1 denotes one SacC_Agal copy, ×2 denotes two SacC_Agal copies and ×3 denotes three SacC_Agal copies.

FIG. 5

Relative production of LNnT of an *E. coli* cell expressing two copies of SacC_Agal under control of the PlgpF promoter (MP9 and MP10) or under control of the Pscr promoter (MP11 and MP12) as compared to *E. coli* cells expressing the enzyme or the sucrose utilization system ScrBRYA (MP2) (max expression set to 100%). In addition, MP10 and MP12 have a ptsG gene deletion.

FIG. 6

Growth of strains MP13, MP14 and MP15 on sucrose. Batch growth profile on sucrose for *E. coli* cells that do or do not express protein(s) that enable the utilization of sucrose as the main and/or the sole, carbon source and/or energy source. The strain MP13 is not capable of utilizing sucrose, while the strains MP14 and MP15 express the extracellular sucrose hydrolase SacC_Agal from one or two PglpF-driven genomic copies, respectively.

DETAILED DESCRIPTION

The present disclosure provides a novel means to use sucrose as a, and/or the main and/or even the sole carbon and/or energy source in microbial biosynthesis processes. Prior attempts to create e.g., Suc+ strains of non-pathogenic *E. coli* that can live and grow on sucrose have generally been less productive than Suc− strains and/or necessitated the introduction of complete systems including several heterologous genes into the host cell.

The present disclosure for the first time discloses a genetic modification of a non-sucrose-utilizing (Suc−) cell or of an inefficiently sucrose-utilizing cell, which makes the cell capable of utilizing sucrose efficiently as energy and/or carbon source, following the expression of a single heterologous polypeptide. The single heterologous polypeptide upon expression is translocated from the cytosol into the extracellular space and/or to the cytosolic and/or periplasmic membrane and is capable of hydrolysing sucrose into fructose and glucose. The present disclosure thus for the first time discloses a genetically modified cell, which prior to the modification was non-sucrose-utilizing (Suc−), or which prior to the modification was only limited and/or inefficiently able to utilize sucrose, which has become capable of utilizing sucrose as energy and/or carbon source following the expression of a single heterologous polypeptide, which upon expression is translocated from the cytosol into the extracellular space and/or to the cytosolic and/or periplasmic membrane, and which is capable of hydrolysing sucrose into fructose and glucose.

An aspect of the invention relates to a genetically modified cell, comprising a heterologous nucleic acid sequence encoding a heterologous polypeptide enzyme, preferably an invertase, which on its own upon expression, is in a sufficient amount located extracellularly, in the periplasm and/or membrane-bound or membrane-embedded, and wherein said heterologous polypeptide enzyme is capable of hydrolysing sucrose into fructose and glucose on the extracellular side and/or in the periplasm of the genetically modified cell, and wherein further the expression of said heterologous polypeptide enzyme is sufficient to enables utilization of sucrose as carbon and/or as energy source of said genetically modified cell. In a preferred embodiment the heterologous polypeptide enzyme is located extracellularly and or in the periplasm of the genetically modified cell.

In that regard, the present invention also relates to a genetically modified cell which comprises a heterologous nucleic acid sequence encoding an invertase, wherein said invertase is SacC Agal comprising or consisting of the amino acid sequence of SEQ ID NO: 1 or a functional homologue thereof, having an amino acid sequence which is at least 80% identical to SEQ ID NO: 1.

The identification of new efficient polypeptides capable of hydrolysing sucrose, and which on their own enable the genetically modified prior (Suc−) cell, or only limited sucrose-utilizing cell, to utilize sucrose as a, or as the main and/or sole carbon and/or energy source, i.e. without the need for the introduction of other heterologous polypeptides assisting with sucrose utilization into the cell, such as transporters, porins, permeases, kinases and/or phosphotransferase systems (PTS), is highly advantageous, since it allows for cost-effective use of sucrose in large scale biosynthesis production processes. The advantages of using sucrose as carbon source is for example the low cost. Furthermore glucose-degradation products which can be an issue when glucose is used as carbon-source will be avoided, whereas sucrose-based impurities are rarely observed when sucrose is used as carbon-source. Sucrose may also have additional benefits such as enabling proteins to retain their secondary structure and to protect against harmful external factors.

Prior efforts to convert suc− *E. coli* strains to suc+ strains have necessitated the incorporation of several heterologous genes, e.g., referred to as complete sucrose utilizing cassette systems, such as the PTS system, which in combination allows a genetically modified cell to utilize sucrose as sole carbon and/or sole energy source. These systems typically comprise incorporation of one or more porin(s), one or more permease(s) and one or more phospho-glycosyl hydrolase(s). The porin(s) and transporter(s) facilitate the active transport of sucrose across the cell membrane, and once in the cytosol, sucrose undergoes phosphorylation (6-P-sucrose) in order to be recognized by a sucrose-6-P hydrolase, which facilitates hydrolysis of sucrose-6-P into glucose-6-P and fructose, thus allowing for glucose-6-P to be incorporated into the central carbon metabolism. Thus, these systems require incorporation of multiple heterologous genes, rely on active transport of sucrose into the cytosol via heterologous transporters and phosphorylation of sucrose to be recognized by the specific glycoside hydrolase capable of hydrolyzing sucrose-6-P.

Utilization of Sucrose

The present disclosure relates to simple and efficient means to provide to a host organism, that does not naturally contain the relevant genes, a new ability to utilize sucrose or to enhance an already existing but inefficient sucrose utilization capacity.

Thus, a genetically modified cell of the disclosed invention is provided with a single gene encoding a heterologous polypeptide (enzyme) capable of hydrolysing sucrose outside the cytosol of the cell, thereby providing the cell with the capability to catabolically utilize sucrose as a carbon source, as well as an energy source, without transporting the sucrose into the cytosol of the cell.

The gene that enables the cell to utilize sucrose is a heterologous gene (i.e., derived from a different organism and transferred to the genetically modified cell by conventional recombinant DNA manipulation techniques).

In one embodiment of the present invention, the enzyme capable of hydrolysing sucrose expressed by the cell is located in the periplasm or in the extracellular space of the cell.

Typically, two kinds of sucrose catabolism can be used by $Suc^+$ microorganisms. The phosphoenolpyruvate-sugar phosphotransferase (PEP-PTS) system and the non-PTS system. With the phosphoenolpyruvate (PEP)-dependent phosphotransferase system ("PTS"), sucrose is transported across the cytoplasmic membrane via a sucrose-specific PEP-dependent phosphotransferase, while in the non-PTS system, sucrose is taken up by a sucrose permease. Concomitantly, sucrose is then phosphorylated in the cytosol to generate intracellular sucrose-6-phosphate, which is hydrolysed to glucose-6-phosphate and fructose that are then directed into the central carbon metabolism of the cell.

However, the current invention relates to the use of an invertase or a sucrose-6-phosphate hydrolase, which upon expression is translocated from the cytosol to the cytosolic membrane, the periplasmic membrane and/or to the extracellular space and which allows the cell to utilize sucrose as carbon and energy source without the need for transport of the sucrose into the cytosol. Also, the invertase itself does not require the sucrose to be phosphorylated before hydrolysis.

Thus, the current invention facilitates a de novo or at least improved sucrose hydrolysis of sucrose for the host cell, in the cytoplasm, periplasm or in the extracellular medium, thereby providing the cell with a carbon and energy source in the form of glucose and fructose.

The advantage of using a sucrose hydrolysing enzyme capable of hydrolysing sucrose into fructose and glucose on the extracellular side or in the periplasm of the genetically modified cell that is not able to take-up sucrose, is that localized gradients with high concentrations of sugar that appear in fed-batch and continuous processes in large-scale (Lara et al 2006, Molecular Biotechnology 34: p 355-381), is not instantly available to the production cells.

Instead, the sucrose is only acted upon by the small fraction of hydrolysing enzymes that are present within the gradient and sucrose is therefore hydrolysed at a very low rate. This in turn postpones sucrose hydrolysis until the sucrose is more evenly distributed in the fermentation vessel and exposed to a larger fraction of the exported hydrolysing enzyme. The delayed release of glucose and fructose from sucrose results in a reduction or abolishment of gradients of metabolically available sugar, thus reducing or abolishing overflow-metabolism in the cells. Overflow-metabolism, which is induced in large scale fermentations when gradients of carbon-sources appear due to insufficient mixing of the feed, lead to formation of metabolites like acetate and increase in maintenance energy requirement, which in turn affect cell growth and product yields. The use of a sucrose hydrolysing enzyme of the present invention can therefore lead to a more stable production host with higher product yields in large-scale fermentations.

The present invention shows that this can be even further improved by reducing the cells uptake rate of the extracellularly formed glucose, e.g., by deleting glucose transporter genes such as ptsG encoding the glucose-specific EIICB component of the native *E. coli* PTS system. Without being bound by theory it is believed that the deletion of ptsG reduces the glucose uptake rate by the cell thereby limiting the formation rate of glucose-6-phosphate in the cell, thus additionally reducing the overflow-metabolism.

The examples clearly demonstrate that the herein for the first-time disclosed approach of using a single polypeptide capable of hydrolysing sucrose into fructose and glucose on the extracellular side or in the periplasm of the genetically modified cell is superior to the use of the PEP-PTS system as described in the prior art.

As Sole Carbon Source

The genetically modified cell of the invention can utilize sucrose as the sole carbon source, thereby being independent of addition of other sugars in the fermentation process. Instead, the cell can utilize the fructose and glucose produced from the hydrolysis of sucrose as a carbon source.

An Extracellular, Periplasmic and/or Membrane-Bound or Membrane-Embedded Heterologous Polypeptide.

In carrying out the invention, the heterologous nucleic acid encoding a heterologous polypeptide capable of sucrose hydrolysis, may be expressed cytosolic, periplasmic and/or extracellularly, as long as it's functionality in enabling the utilization of sucrose as the main and/or the sole, carbon source and/or energy source in the genetically modified cell of the invention is retained. The functionality of the heterologous polypeptide is that it hydrolyses sucrose and when it is an invertase, it hydrolyses non-phosphorylated sucrose. Upon expression of the heterologous polypeptide, it is translocated to the extracellular media, however, in this process, it may also exert its sucrose hydrolysing function, thus at least to some degree hydrolysing sucrose in the cytosol and/or in the periplasm. Sucrose hydrolysis in the cytosol may occur to a limited extent if passive transport of the sucrose into the cytosol occur before the active polypeptide has been exported to the periplasm or extracellular side of the cell.

When translocated to a membrane according to the present disclosure, the enzyme will either be embedded into said membrane and/or attached thereto. The enzyme can either penetrate the membrane (transmembrane) or associate with one or the other side of a membrane (integral monotopic). The enzyme can be integrally, peripherally, or transiently associated with the cell membrane.

In another embodiment of the invention the enzyme capable of hydrolysing sucrose is soluble (i.e. not membrane bound) and located in the periplasm or in the extracellular space of the cell.

In the Present Context, a Membrane is a Periplasmic and/or Cytosolic Membrane.

In one embodiment, the heterologous polypeptide of the invention is embedded in and/or attached to a membrane, wherein the membrane is a plasma membrane, periplasmic and/or cytosolic membrane. In one embodiment, the membrane is the plasma membrane, and the enzyme is anchored, embedded and/or attached either at the periplasmic, the extracellular and/or the cytosolic side of the membrane.

In the context of the present disclosure, the membrane may be the cytosolic/inner membrane and/or the periplasmic/outer membrane, as long as the membrane in which the polypeptide is embedded and/or attached to allows the polypeptide to exert its function. If the heterologous polypeptide is associated with the cytosolic/inner membrane of the genetically modified cell it is preferably on the side facing the periplasmic space.

The Term "which does not Encode a Sucrose Utilization System".

As described above, the utilization of sucrose as the main and/or the sole carbon and/or energy source may be obtained by expression of a phosphoenolpyruvate-dependent sugar phosphotransferase (PEP-PTS) system, which is a multicomponent system that requires the interaction of 4 different enzymes. An example is the scr PEP-PTS system (WO2015/197082), where the gene scrA codes for the sucrose transport protein Enzyme IIScr that provides intracellular sucrose-6-phosphate from extracellular sucrose via an active transport through the cell membrane and the concomitant phosphorylation. The sucrose specific ScrY porin (encoded by scrY) facilitate the sucrose diffusion through the outer membrane. The ScrB invertase enzyme (encoded by scrB) splits the accumulated sucrose-6-phosphate by hydrolysis to glucose-6-phosphate and fructose. The repressor protein (encoded by scrB) negatively controls the expression of the scrYAB genes and is induced by sucrose or fructose or the E. coli csc PEP-PTS system described in WO2014/067696 comprising the genes; sucrose permase, fructokinase, sucrose hydrolase, and a transcriptional repressor (genes cscB, cscK, cscA, and cscR, respectively). A PEP-PTS system is, however, not within the scope of the current invention since it requires expression of multiple different heterologous polypeptides for it to enable a cell which prior to the insertion of the multiple genes was not capable of utilizing sucrose or at least not efficiently capable to utilizing sucrose, i.e., not as the main and/or sole carbon and/or energy source, to be able to utilize sucrose as the main and/or the sole carbon and/or energy source. Therefore, the invention relates to a genetically modified cell as described above, wherein the heterologous nucleic acid sequence does not encode a complete sucrose utilization system, i.e. where the cell does not encode scrYABR (such as SEQ ID NO: 65 to 68) or cscBKAR.

Thus, in one embodiment, the invention relates to a genetically modified cell as described above, wherein the genetically modified cell does not express a complete, multicomponent sucrose utilization system, comprising a porin, a sucrose transporter and an invertase not capable of hydrolysing non-phosphorylated sucrose. In a further embodiment, the invention relates to a genetically modified cell as described above, wherein the genetically modified cell does not comprise one or more heterologous nucleic acid sequences that comprise a sucrose utilization system comprising a porin, a sucrose transporter and an invertase not capable of hydrolysing non-phosphorylated sucrose.

In one embodiment of the invention the enzyme capable of hydrolysing sucrose is not scrB (such as SEQ ID NO: 67) or cscA A Heterologous Polypeptide As demonstrated in the experimental section, the present disclosure identifies polypeptides of heterologous origin which are on their own capable of enabling the utilization of sucrose as the main and/or the sole carbon source and/or energy source in a genetically modified host cell, prior (Suc⁻) or only limited or inefficiently sucrose-utilizing, i.e., without the need for the introduction of a heterologous complete sucrose utilizing system, such as but not limited to a complete sucrose utilizing cassette, into the host cell.

Accordingly, a heterologous polypeptide of the current invention relates to an enzyme which is capable of hydrolysing sucrose on its own. In particular, a heterologous polypeptide of the current invention relates to an enzyme which is capable of hydrolysing non-phosphorylated sucrose.

Typically, said enzyme is an invertase. In particular, said enzyme is an invertase which is capable of exerting its function intracellularly, periplasmic and extracellularly. In particular again, the heterologous polypeptide described herein relates to an invertase which upon expression is translocated from the cytosol into the extracellular space and/or to the cytosolic and/or periplasmic membrane, and which is capable of hydrolysing sucrose, such as non-phosphorylated sucrose, into fructose and glucose outside the cell or in the periplasmic space.

In relation to the invention, the term invertase relates to an enzyme capable of hydrolysing the terminal non-reducing beta-D-fructofuranoside residues in beta-D-fructofuranosides, such as the beta-D-fructofuranoside residue in sucrose as described for the enzyme entry EC 3.2.1.26.

In one embodiment of the invention, the invertase favours hydrolysis of non-phosphorylated sucrose.

In another embodiment of the invention, said enzyme is a sucrose-6-phosphate hydrolase classified as EC 3.1.B3, which according to the current disclosure surprisingly can function as an invertase hydrolysing non-phosphorylated sucrose into fructose and glucose. Alternatively, said enzyme functions as an extracellular sucrose-6-phosphate hydrolase.

Thereby, the heterologous polypeptide of the present disclosure enables the utilization of sucrose as the main and/or sole carbon and/or energy source by catalysing the generation of glucose and fructose from sucrose extracellularly and/or in the periplasm of the host cell.

The present disclosure discloses two exemplary heterologous polypeptide sequences which allow the utilization of sucrose as energy and carbon source in a cell previously incapable or only inefficiently capable of utilizing sucrose as energy and/or carbon source. As is demonstrated in the experimental section, this is achieved in the absence of any further genetic modifications, intended to otherwise help to facilitate the utilization of sucrose as energy and/or carbon source.

In a presently preferred embodiment, the heterologous polypeptide is the glycoside hydrolase family 32 (GH32) protein from *Avibacterium gallinarum*, with an amino acid sequence as shown in SEQ ID NO: 1 (SacC_Agal), or a functional homologue thereof, having an amino acid sequence which is at least 70% such as at least 80%, such as at least 85%, such as at least 90%, such as at least 95%, such as at least 98%, such as at least 99%, or such as at least 99.9%, identical to SEQ ID NO: 1.

In another presently preferred embodiment, the heterologous polypeptide is the beta-fructofuranosidase protein from *Arthrobacter globiformis* IFO 3062, as shown in SEQ ID NO: 2 (Bff), or a functional homologue thereof, having an amino acid sequence which is at least 70% such as at least 80%, such as at least 85%, such as at least 90%, such as at least 95%, such as at least 98%, such as at least 99%, or such as at least 99.9%, identical to SEQ ID NO: 2.

SacC_Agal and Bff

The presently identified heterologous polypeptides, capable of carrying out the invention as described, are in the present context identified as "SacC_Agal" and as "Bff".

The polypeptide herein referred to as SacC_Agal as shown in SEQ ID NO: 1 is 100% identical to the GeneBank ID: WP_103853210.1 and is characterized as a glycoside hydrolase and a sucrose-6-phosphate hydrolase, and according to the current disclosure able to function as an invertase hydrolysing unmodified sucrose.

The polypeptide herein referred to as Bff as shown in SEQ ID NO: 2 is 100% identical to the GeneBank ID: BAD18121.1 and is categorised as a beta-fructofuranosidase protein, and as shown in Example 1 of the present disclosure, it enables the utilization of sucrose as the main and/or the sole, carbon source and as the main and/or the sole energy source of the genetically modified cell of the present disclosure.

Accordingly, in a presently preferred embodiment, the current invention relates to a genetically modified cell expressing a heterologous polypeptide selected from the group consisting of SEQ ID NO: 1, SEQ ID NO: 2 and a functional homologue of any one of SEQ ID NOs: 1 or 2, having an amino acid sequence which is at least 70%, such as at least 80%, such as at least 85%, such as at least 90%, such as at least 95%, such as at least 98% identical to any one of SEQ ID NOs: 1 or 2.

In another preferred embodiment, the invention relates to a genetically modified cell comprising a heterologous nucleic acid sequence encoding a heterologous polypeptide, wherein the encoded polypeptide is the glycoside hydrolase family 32 protein from *Avibacterium gallinarum*, as shown in SEQ ID NO: 1 [SacC Agal], or a functional homologue thereof, having an amino acid sequence which is at least 80%, such as at least 81, 82, 83, 84, 85, 86, 87, 88, 89, 90, 91, 92, 93, 94, 95, 96, 97, 98 or 99% identical to SEQ ID NO: 1.

In yet another preferred embodiment, the invention relates to a genetically modified cell comprising a heterologous nucleic acid sequence encoding a heterologous polypeptide, wherein the encoded polypeptide is beta-fructofuranosidase protein from *Arthrobacter globiformis* IFO 3062, as shown in SEQ ID NOs: 2 [Bff], or a functional homologue thereof, having an amino acid sequence which is at least 80%, such as at least 81, 82, 83, 84, 85, 86, 87, 88, 89, 90, 91, 92, 93, 94, 95, 96, 97, 98 or 99% identical to SEQ ID NO: 2.

A Functional Homologue

A functional homologue of the polypeptide SacC_Agal as shown in SEQ ID NO: 1, or of the polypeptide Bff as shown in SEQ ID NO: 2, may e.g. be obtained by mutagenesis. The functional homologue(s) should have a remaining functionality of at least 5%, such as 10%, 15%, 20%, 25%, 30%, 35%, 40%, 50%, 60%, 70%, 80%, 90% or 100% compared to the functionality of a polypeptide with an amino acid sequence as shown in SEQ ID NO: 1 or SEQ ID NO: 2. The functional homologue can have a higher functionality compared to the functionality of a polypeptide with an amino acid sequence as shown in SEQ ID NO: 1 and/or SEQ ID NO: 2. A functional homologue of a polypeptide with an amino acid sequence as shown in SEQ ID NO: 1 or SEQ ID NO: 2, should enable the utilization of sucrose as the main and/or the sole carbon and as an, the main and/or the sole energy source of the genetically modified cell.

As demonstrated in the experimental section, functionality is easily tested by introducing a heterologous polypeptide according to the present disclosure into a host cell that cannot grow on sucrose, i.e. a (Suc⁻) strain, and then growing the genetically modified strain in a batch mode and under selected cultivation conditions, e.g. but not limited to at 28° C. in medium containing e.g. 15 g/L sucrose as the main or the sole carbon source and/or energy source.

To eliminate the possibility that a (Suc⁻) strain does, unbeknown to the skilled person in the art, already comprise several heterologous genes, which are part of but not sufficient as a complete sucrose utilizing cassette systems, or a PEP-PTS system, which in combination with a further heterologous polypeptide would allow a genetically modified cell to utilize sucrose as a, main and/or sole carbon and/or energy source, a simple PCR testing can be performed to identify such components.

A Heterologous Fusion Polypeptide

The heterologous polypeptide of the invention may also be a heterologous fusion polypeptide recombining two or more heterologous polypeptides, wherein for instance one part of a polypeptide is a trans-membrane or membrane embedded polypeptide, and the second part of the recombined polypeptide is a heterologous polypeptide, as mentioned above, capable of hydrolysing sucrose, e.g., Bff or SacC_Agal. Thus, in one embodiment, the invertase of the invention is recombined into a fusion polypeptide, wherein one fragment directs and/or anchors and/or inserts the fusion polypeptide into a specific cell membrane. According to the invention, the membrane may be the periplasmic membrane and/or the cytosolic membrane.

In an embodiment wherein the heterologous polypeptide is part of a fusion polypeptide, the other part of the fusion polypeptide is not part of the heterologous polypeptide as such and does thus not count when determining amino acid sequence identity as described herein.

A Signal Peptide

A recombined fusion polypeptide according to the present disclosure can e.g., comprise an enzyme and a signal peptide which can function to prompt the host cell to translocate the enzyme after expression in the cytosol. In general, a signal peptide may direct an expressed polypeptide to a specific cellular compartment and/or organelle, to the periplasm or signal for cellular excretion. In the present context, a signal peptide preferably directs the expressed polypeptide to the plasma membrane, the periplasmic membrane, the periplasm, or to cellular excretion.

A signal peptide is typically 16-30 amino acids long and present at the N-terminus of a newly synthesized polypeptide. In relation to the nucleic acid construct of the invention, the signal peptide is encoded by a nucleic acid sequence that may be operably linked to the heterologous nucleic acid sequence encoding a polypeptide according to the invention. The signal peptide may also be a polypeptide tag, with an amino acid sequence comprising more than 30 amino acids.

The signal peptide acts as a polypeptide tag to promote selectively secretion of the polypeptide of the invention, e.g., a polypeptide tag that promotes the secretion of the polypeptide of the invention, i.e., promoting the secretion of Bff and/or SacC_Agal.

In relation to the invention, wherein the encoded polypeptide enables hydrolysis of sucrose, the secretion of the polypeptide into the periplasm or extracellular space is favoured, since sucrose is only capable of permeating from the outside into the cell to a very low degree, which does not or at least only very limited facilitates cellular utilization of sucrose as a carbon and/or energy source.

The signal peptide is typically selected from the group consisting of, but not limited to, signal sequences listed in table 1 below.

TABLE 1 signal sequences useful for in combination with the heterologous polypeptide of the invention

| Signal sequence | Origin | Amino Acid Sequence | SEQ ID NO: |
|---|---|---|---|
| yvcE | B. subtilis | MRKSLITLGLASVIGTSSFLIPFTSKTASA | 5 |
| yoqM | B. subtilis | MKLRKVLTGSVLSLGLLVSASPAFA | 6 |
| yuaB | B. subtilis | MKRKLLSSLAISALSLGLLVSAPTASFAAE | 7 |
| pel | B. subtilis | MKKVMLATALFLGLTPAGANA | 8 |
| pelB | B. subtilis | MKRLCLWFTVFSLFLVLLPGKALG | 9 |
| yoaW | B. subtilis | MKKMLMLAFTFLLALTIHVGEASA | 10 |
| yqxI | B. subtilis | MFKKLLLATSALTFSLSLVLPLDGHAKA | 11 |
| lipA | B. subtilis | MKFVKRRIIALVTILMLSVTSLFALQPSAKAA | 12 |
| lipB | B. subtilis | MKKVLMAFIICLSLILSVLAAPPSGAKA | 13 |
| yoqH | B. subtilis | MKRFILVLSFLSIIVAYPIQTNA | 14 |
| ybfO | B. subtilis | MKRMIVRMTLPLLIVCLAFSSFSASARA | 15 |
| sacB | B. subtilis | MNIKKFAKQTVLTFTTALLAGGATQAFA | 16 |
| bglS | B. subtilis | MPYLKRVLLLLVTGLFMSLFAVTATASA | 17 |
| yddT | B. subtilis | MRKKRVITCVMAASLTLGSLLPAGYASA | 18 |
| yobB | B. subtilis | MKIRKILLSSALSFGMLISAVPALA | 19 |
| pelB | S. cerevisiae | MKYLLPTAAAGLLLLAAQPAMA | 20 |
| phoA | E. coli | MKQSTIALALLPLLFTPVTKA | 21 |
| lamB | E. coli | MMITLRKLPLAVAVAAGVMSAQAMA | 22 |
| ompA | E. coli | MKKTAIAIAVALAGFATVAQA | 23 |
| fhuD | E. coli | MSGLPLISRRRLLTAMALSPLLWQMNTAHA | 24 |
| mdoD | E. coli | MDRRRFIKGSMAMAAVCGTSGIASLFSQAAFA | 25 |
| ycdO | E. coli | MTINFRRNALQLSVAALFSSAFMANA | 26 |
| dsbA | E. coli | MKKIWLALAGLVLAFSASA | 27 |
| Af-ss | Alcaligenes faecalis | MQKGLVRTGLAAAGLILGWAGAPTHA | 28 |

In an embodiment the heterologous polypeptide is part of a fusion polypeptide comprising a signal sequence, wherein the signal sequence is not part of the heterologous polypeptide as such and does thus not count when determining amino acid sequence identity as described herein.

In a preferred embodiment the heterologous nucleic acid sequence encoding a heterologous enzyme of the invention (such as SacC_Agal or Bff) also encodes the signal peptide of SEQ ID NO: 28, preferably the N-terminal of the a heterologous enzyme of the invention, alternatively at the C-terminal of the heterologous enzyme of the invention.

A Nucleic Acid Construct

The heterologous polypeptide of the invention is expressed from a nucleic acid construct comprising the nucleic acid sequence encoding the individual heterologous polypeptide. The nucleic acid construct of the invention may further comprise additional elements, e.g., regulatory sequences ensuring the proper level of expression of the polypeptide as well as a nucleic acid sequence encoding one or more signal peptide(s), ensuring the translocation and/or proper sorting and/or secretion of the expressed polypeptide of the invention. Thus, the invention also relates to a nucleic acid construct which upon insertion into a (Suc⁻) host cell, or into a host cell only inefficiently utilizing sucrose, enables said genetically modified cell to utilize sucrose as the main and/or the sole, carbon source and/or energy source.

A nucleic acid construct according to the present disclosure may be a part of a vector DNA. In another embodiment, the nucleic acid construct is an expression cassette/cartridge that is integrated in the genome of a host cell. Accordingly, in the present context the term "nucleic acid construct" means an artificially constructed segment of nucleic acid, in particular a nucleic acid segment, which is intended to be introduced into a host cell, e.g., a microbial cell. In the context of the invention, the nucleic acid construct comprises a recombinant and/or heterologous nucleic acid sequence coding for a heterologous polypeptide.

Typically, the recombinant and/or heterologous nucleic acid sequence essentially comprises one or more non-coding nucleic acid sequence(s) comprising a regulatory nucleic acid sequence, such as, but not limited to a promoter nucleic acid sequence and one or more coding nucleic acid sequence(s) encoding a gene of interest, e.g. a sucrose hydrolysing enzyme which upon insertion into a (Suc⁻) host cell, or into a host cell only inefficiently utilizing sucrose, enables said genetically modified cell to utilize sucrose as the main and/or the sole, carbon source and/or energy source, preferably as the main and/or the sole carbon source and/or energy source.

In addition, the recombinant and/or heterologous nucleic acid sequence can further comprise a non-coding and/or coding sequence useful for production of a human milk oligosaccharide (HMO) in a genetically modified cell, such as, but not limited to, coding for a glycosyltransferase. Alternatively, said non-coding and/or coding sequence useful for production of an HMO in a genetically modified cell can be introduced and/or can have been introduced in the host cell by another nucleic acid sequence. In one embodiment the genetically modified cell comprises at least one recombinant glycosyltransferase selected from the group of enzymes having the activity of an α-1,2-fucosyltransferase, α-1,3-fucosyltransferase, α-1,3/4-fucosyltransferase, α-1,4-fucosyltransferase α-2,3-sialyltransferase, α-2,6-sialyltransferase, β-1,3-N-acetylglucosaminyltransferase, β-1,6-N-acetylglucosaminyltransferase, β-1,3-galactosyltransferase and β-1,4-galactosyltransferase. Glycosyl transferases suitable for the production of HMOs are described in the section "functional enzymes in biosynthetic production of one or more HMO(s)" below.

In relation to the current invention, the term "heterologous" refers to a polypeptide, amino acid sequence, nucleic acid molecule, nucleic acid sequence or nucleotide sequence that is foreign to a cell or organism, i.e., a polypeptide, amino acid sequence, nucleic acid molecule, nucleic acid sequence or nucleotide sequence that does not naturally occur in said cell or organism. A "heterologous sequence" or a "heterologous nucleic acid" or "heterologous polypeptide", as used herein, is one that originates from a source foreign to the particular host cell (e.g., from a different individual, strain or species), or, if it originates from the same source, is modified from its original form. Thus, a heterologous nucleic acid operably linked to a promoter is from a source different from that from which the promoter was derived, or, if from the same source, is modified from its original form. The heterologous sequence may be stably introduced, e.g., by transfection, transformation, conjugation or transduction, into the genome of the microbial host cell, thus rendering the host cell a genetically modified host cell. Techniques may be applied which will depend on the host cell as well as the sequence to be introduced. Various techniques are known to a person skilled in the art and are, e.g., disclosed in Sambrook et al., *Molecular Cloning: A Laboratory Manual,* 2nd Ed., Cold Spring Harbor Laboratory Press, Cold Spring Harbor, N.Y. (1989).

In that regard, a nucleic acid construct according to the present disclosure is in a presently preferred embodiment a nucleic acid construct that comprises,
  a) a nucleic acid sequence encoding a heterologous polypeptide which upon expression is located extracellularly, periplasmic and/or membrane-bound or membrane-embedded and which is capable of hydrolysing sucrose into fructose and glucose, wherein the expression of said polypeptide enables utilization of sucrose as the main and/or the sole carbon and/or as the main and/or the sole energy source of a genetically modified cell, and
  b) a nucleic acid sequence comprising regulatory element(s), capable of modulating the expression of said nucleic acid sequence, and optionally
  c) a nuclei acid sequence encoding a signal peptide enabling the continuous secretion of said polypeptide into the periplasm of the genetically modified cell and/or into the fermentation media.

In one embodiment, a nucleic acid construct according to the present disclosure, comprises a nucleic acid sequence encoding a heterologous polypeptide as shown in SEQ ID NO: 1 or a functional homologue thereof having an amino acid sequence which is at least 70%, such as at least 80%, such as at least 85%, such as at least 90%, such as at least 95%, such as at least 98% identical to SEQ ID NOs: 1. In another embodiment, a nucleic acid construct of the present disclosure comprises a nucleic acid sequence encoding a heterologous polypeptide as shown in SEQ ID NO: 2 or a functional homologue thereof having an amino acid sequence which is at least 70%, such as at least 80%, such as at least 85%, such as at least 90%, such as at least 95%, such as at least 98% identical to SEQ ID NOs: 2.

In a preferred embodiment, the nucleic acid construct according to the present invention comprises,
  a) a nucleic acid sequence encoding an invertase, wherein said invertase is SacC Agal comprising or consisting of the amino acid sequence of SEQ ID NO: 1 or a functional homologue thereof, having an amino acid sequence which is at least 80% identical to SEQ ID NO: 1, and
  b) a nucleic acid sequence comprising regulatory element(s), capable of modulating the expression of said nucleic acid sequence, and optionally
  c) a nuclei acid sequence encoding a signal peptide enabling the continuous secretion of said polypeptide into the periplasm of the genetically modified cell and/or into the fermentation media.

In one embodiment, the regulatory element in b) is a promoter sequence.

In a presently preferred embodiment, the nucleic acid construct according to the present invention comprises,
  a) a nucleic acid sequence encoding an invertase, wherein said invertase is SacC Agal comprising or consisting of the amino acid sequence of SEQ ID NO: 1 or a functional homologue thereof, having an amino acid sequence which is at least 80% identical to SEQ ID NO: 1, and
  b) a nucleic acid sequence comprising regulatory element(s), capable of modulating the expression of said nucleic acid sequence wherein the regulatory element is a promoter selected from the group consisting of a PglpF (SEQ ID NO: 42) or Plac (SEQ ID NO: 51) or PmglB_UTR70 (SEQ ID NO: 38) or PglpA_70UTR (SEQ ID NO: 39) or PglpT_70UTR (SEQ ID NO: 40) or variants of these promoters as identified in Table 6, and optionally
  c) a nuclei acid sequence encoding a signal peptide wherein the signal peptide is selected from table 1, preferably the signal peptide of SEQ ID NO: 28.

In another preferred embodiment, the nucleic acid construct according to the present invention comprises,
  a) a nucleic acid sequence encoding an invertase, wherein said invertase is Bff comprising or consisting of the amino acid sequence of SEQ ID NO: 2 or a functional homologue thereof, having an amino acid sequence which is at least 80% identical to SEQ ID NO: 2, and
  b) a nucleic acid sequence comprising regulatory element(s), capable of modulating the expression of said nucleic acid sequence wherein the regulatory element is a promoter selected from the group consisting of a PglpF (SEQ ID NO: 42) or Plac (SEQ ID NO: 51) or PmglB_UTR70 (SEQ ID NO: 38) or PglpA_70UTR (SEQ ID NO: 39) or PglpT_70UTR (SEQ ID NO: 40) or variants of these promoters as identified in Table 6, and optionally c) a nuclei acid sequence encoding a signal peptide wherein the signal peptide is selected from table 1, preferably the signal peptide of SEQ ID NO: 28.

Furthermore, the nucleic acid construct of the invention may be integrated into the genome of the genetically modified cell, or it may be comprised in an expression vector, such as in a bacterial plasmid, an artificial chromosome, a phagemid and/or another viral vector.

As used herein, the terms "nucleic acid" and "polynucleotide" refer to a deoxyribonucleotide or a ribonucleotide polymer in either single- or double-stranded form, and unless otherwise limited, encompass known analogues of natural nucleotides that hybridize to nucleic acids in a manner similar to naturally occurring nucleotides. Unless otherwise indicated, a particular nucleic acid sequence includes the complementary sequence thereof.

A Heterologous Nucleic Acid Sequence Encoding an Enzyme which on its Own is Capable of Hydrolysing Sucrose into Fructose and Glucose In one embodiment, the nucleic acid construct of the invention encodes a polypeptide which is glycoside hydrolase family 32 protein from *Avibacterium gallinarum*, as shown in SEQ ID NO: 1 [SacC_Agal], or a functional homologue thereof, having an amino acid sequence which is at least 80% identical to SEQ ID NO: 1. Thus, the nucleic acid construct comprises a nucleic acid sequence of SEQ ID NO: 3 [SacC_Agal], or a nucleic acid sequence having at least 70% sequence identity to SEQ ID NO: 3 [SacC_Agal], such as at least 75%, such as at least 80%, such as at least 85%, such as at least 90%, such as at least 95%, or such as at least 99% sequence identity to SEQ ID NO: 3 [SacC_Agal].

In one embodiment the nucleic acid sequence encoding a polypeptide of SEQ ID NO: 1 [SacC_Agal], or a functional homologue thereof, having an amino acid sequence which is at least 80% identical to SEQ ID NO: 1 [SacC_Agal], is a nucleic acid sequence of SEQ ID NO: 3 [SacC_Agal].

In another embodiment, the nucleic acid construct of the invention is a construct, wherein the encoded polypeptide is beta-fructofuranosidase protein from *Arthrobacter globiformis* IFO 3062, as shown in SEQ ID NOs: 2 [Bff], or a functional homologue thereof, having an amino acid sequence which is at least 80% identical to SEQ ID NO: 2. Thus, the nucleic acid construct comprises a nucleic acid sequence of SEQ ID NO:4 [Bff], or a nucleic acid sequence having at least 70% sequence identity to SEQ ID NO: 4 [Bff], such as at least 75%, such as at least 80%, such as at least 85%, such as at least 90%, such as at least 95% or such as at least 99% sequence identity to SEQ ID NO: 4 [Bff]. In one embodiment the nucleic acid sequence encoding a polypeptide of SEQ ID NO: 2 [Bff], or a functional homologue thereof, having an amino acid sequence which is at least 80% identical to SEQ ID NO: 2 [Bff], is a nucleic acid sequence of SEQ ID NO: 4 [Bff].

Determining Sequence Identity

The term "sequence identity of [a certain]%" in the context of two or more nucleic acid or amino acid sequences means that the two or more sequences have nucleotides or amino acids in common in the given percent when compared and aligned for maximum correspondence over a comparison window or designated sequences of nucleic acids or amino acids (i.e. the sequences have at least 90 percent (%) identity). Percent identity of nucleic acid or amino acid sequences can be measured using a BLASTn or BLASTp sequence comparison algorithm with default parameters, or by manual alignment and visual inspection (see e.g. http://www.ncbi.nlm.nih.gov/BLAST/). This definition also applies to the complement of a test sequence and to sequences that have deletions and/or additions, as well as those that have substitutions. An example of an algorithm that is suitable for determining percent identity and for alignment is the BLAST 2.2.20+ algorithm, which is described in Altschul et al. *Nucl. Acids Res.* 25, 3389 (1997). BLAST 2.2.20+ is used to determine percent sequence identity for the nucleic acids and/or amino acids of the invention. Software for performing BLAST analyses is publicly available through the National Center for Biotechnology Information (http://www.ncbi.nlm.nih.gov/). Examples of commonly used sequence alignment algorithms are:

CLUSTAL Omega (http://www.ebi.ac.uk/Tools/msa/clustalo/),

EMBOSS Needle (http://www.ebi.ac.uk/Tools/psa/emboss needle/),

MAFFT (http://mafft.cbrc.jp/alignment/server/), or

MUSCLE (http://www.ebi.ac.uk/Tools/msa/muscle/).

Preferably sequence identity between two amino acid sequences is determined using the Needleman-Wunsch algorithm (Needleman and Wunsch, 1970, *J. Mol. Biol.* 48: 443-453) as implemented in the Needle program of the EMBOSS package (EMBOSS: The European Molecular Biology Open Software Suite, Rice et al., 2000, Trends Genet. 16: 276-277), preferably version 5.0.0 or later (available at https://www.ebi.ac.uk/Tools/psa/emboss needle/). The parameters used are gap open penalty of 10, gap extension penalty of 0.5, and the EBLOSUM62 (EMBOSS version of 30 BLOSUM62) substitution matrix. The output of Needle labelled "longest identity" (obtained using the –nobrief option) is used as the percent identity and is calculated as follows: (Identical Residues×100)/(Length of Alignment–Total Number of Gaps in Alignment).

For purposes of the present invention, the sequence identity between two nucleotide sequences is determined using the Needleman-Wunsch algorithm (Needleman and Wunsch, 1 970, supra) as implemented in the Needle program of the EMBOSS package (EMBOSS: The European Molecular Biology Open Software Suite, Rice et al., 2000, Trends Genet. 16: 276-277), 10 preferably version 5.0.0 or later. The parameters used are gap open penalty of 10, gap extension penalty of 0.5, and the DNAFULL (EMBOSS version of NCBI NUC4.4) substitution matrix. The output of Needle labelled "longest identity" (obtained using the –nobrief option) is used as the percent identity and is calculated as follows: (Identical Deoxyribonucleotides×100)/(Length of Alignment–Total Number of Gaps in Alignment).

One or More Copies of Said Heterologous Nucleic Acid Sequence Encoding an Enzyme which on its Own is Capable of Hydrolysing Sucrose into Fructose and Glucose A single copy of the construct according to the invention may be sufficient to enable a genetically modified cell to utilize sucrose as the main and/or the sole carbon source and/or energy source, and to achieve the otherwise desired effects according to the invention as disclosed. Accordingly, in some preferred embodiments, the invention relates to a nucleic acid construct and/or a genetically modified cell comprising one, two, three, or more copies of a heterologous nucleic acid sequence, of a regulatory element and/or of a signal peptide.

In some embodiments the single copy of the nucleic acid construct is preferred.

In such an embodiment, the invention relates to a genetically modified cell according to the present disclosure, wherein the heterologous nucleic acid sequence encodes a single copy of a heterologous polypeptide capable of hydrolysing sucrose into fructose and glucose.

Further, the inventors disclose herein the effects of including one or more copies of a construct comprising a regulatory element and a heterologous nucleic acid sequence encoding the polypeptides Bff or SacC_Agal, on the capability of a genetically modified cell to utilize sucrose as the main and/or the sole carbon source and/or energy source, as can be seen from Example 2.

A nucleic acid construct of the invention may comprise one or more copies of the nucleic acid sequences encoding the polypeptides of the invention; thus, it may also comprise one or more copies of the one or more regulatory element(s) and/or one or more nucleic acid sequences encoding one or more signal peptide(s).

Thus, in one embodiment of the invention, the nucleic acid construct of the invention is a nucleic acid construct, comprising one or more copies of said heterologous nucleic acid sequence.

The more than one heterologous nucleic acid sequences may be identical or different.

Accordingly, in one embodiment of the invention the genetically modified cell comprises at least two copies of the heterologous nucleic acid sequence encoding the polypeptides Bff or SacC_Agal, such as 2, 3 or 4 genomically integrated copies of a heterologous nucleic acid sequence encoding the polypeptides Bff or SacC_Agal.

An alternative way of increasing the capability of a genetically modified cell to utilize sucrose as the main and/or the sole carbon source and/or energy source can also be to place the nucleic acid sequence under control of a strong promoter.

In one embodiment of the present invention the nucleic acid sequence encoding the polypeptides Bff or SacC_Agal are under control of a promoter which is at least 20%, such as at least 50% stronger than the PglpF promoter in table 6.

In a preferred embodiment the nucleic acid sequence encoding the polypeptides Bff or SacC_Agal are under control of a promoter selected from the group consisting of: PmglB_70UTR_SD8, PmglB_70UTR_SD10, PmglB_54UTR, Plac_70UTR, PmglB_70UTR_SD9, PmglB_70UTR_SD4, PmglB_70UTR_SD5, PglpF_SD4, PmglB_70UTR_SD7, PmglB_70UTR, PglpA_70UTR and PglpT_70UTR (shown in table 6).

When the nucleic acid construct of the invention comprises more than one regulatory element, the regulatory element may or may not be operably linked with the heterologous nucleic acid sequence encoding the one or more polypeptide(s) of the invention, or the nucleic acid sequence encoding one or more signal peptide(s). Also, when the nucleic acid construct of the invention comprises more than one heterologous nucleic acid sequences as described above, the nucleic acid construct of the invention may or may not comprise one or more nucleic acid sequence encoding a signal peptide, which may or may not be operably linked to the heterologous nucleic acid sequence of the invention.

In that sense, the nucleic acid construct may be constructed in a way, wherein the sequences are encompassed in the following sequence: regulatory element, nucleic acid sequence encoding the signal peptide and heterologous nucleic acid encoding a polypeptide. The nucleic acid sequence encoding the signal peptide may also be absent, or there may be several copies of either of the elements, or they may be shuffled and appear in a different sequence.

The term "operably linked" as used herein, shall mean a functional linkage between one nucleic acid and a second nucleic acid sequence. This could for instance be a nucleic acid sequence comprising a regulatory element which affects transcription and/or translation of the nucleic acid corresponding to the second sequence.

A Regulatory Element for Regulating the Expression

The nucleic acid construct of the invention may comprise regulatory elements enabling the controlled overexpression of endogenous or heterologous and/or synthetic nucleic acid sequences. The term "regulatory element", comprises promoter sequences, signal sequence, and/or arrays of transcription factor binding sites, which sequences affect transcription and/or translation of a nucleic acid sequence operably linked to the regulatory element.

Regulatory elements are found at transcriptional and post-transcriptional levels and further enable molecular networks at those levels. For example, at the post-transcriptional level, the biochemical signals controlling mRNA stability, translation and subcellular localization are processed by regulatory elements. RNA binding proteins are another class of post-transcriptional regulatory elements and are further classified as sequence elements or structural elements. Specific sequence motifs that may serve as regulatory elements are also associated with mRNA modifications. A variety of DNA regulatory elements are involved in the regulation of gene expression and rely on the biochemical interactions involving DNA, the cellular proteins that make up chromatin, and transcription factors.

Promoters and enhancers are the primary genomic regulatory components of gene expression. Promoters are DNA regions within 1-2 kilobases (kb) of a gene's transcription start site (TSS); they contain short regulatory elements (DNA motifs) necessary to assemble RNA polymerase transcriptional machinery. However, transcription is often minimal without the contribution of DNA regulatory elements located more distal to the TSS. Such regions, often termed enhancers, are position-independent DNA regulatory elements that interact with site-specific transcription factors to establish cell type identity and regulate gene expression. Enhancers may act independently of their sequence context and at distances of several to many hundreds of kb from their target genes through a process known as looping. In relation to the present disclosure regulator elements may or may not be post-translational regulators or they may or may not be translational regulators.

In one embodiment of the invention the regulatory element comprises one or more elements capable of enhancing the expression of the heterologous nucleic acid sequence according to the invention.

In a presently preferred embodiment, the regulatory element capable of regulating the expression of the heterologous nucleic acid of the invention is a promoter sequence.

A Promoter Sequence

The term "promoter" designates a nucleic acid sequence which usually precedes a heterologous nucleic acid sequence encoding a polypeptide in a nucleic acid construct and provides a site for initiation of the transcription into mRNA. Collectively referred to as "promoter" or "control" nucleic acid sequences, these sequences which precede a selected heterologous nucleic acid sequence encoding a polypeptide (or series of sequences) in a functional nucleic acid construct, cooperate to determine whether the transcription (and eventual expression) of a heterologous nucleic acid sequence encoding a polypeptide will occur. Nucleic acid sequences which "follow" a heterologous nucleic acid sequence encoding a polypeptide in a nucleic acid construct and provide a signal for termination of the transcription into mRNA are referred to as transcription "terminator" sequences.

In general, a promoter may comprise homologous, heterologous or synthetic nucleic acid sequences, and may be a recombinant nucleic acid sequence, recombining two or more nucleic acid sequences or same or different origin as described above, thereby generating a homologous, heterologous or synthetic nucleic promoter sequence, and/or a homologous, heterologous or synthetic nucleic regulatory element. A wide selection of promoter sequences derived from the PglpF, PglpA, PglpT, PgatY, Plac and PmglB promoter systems are described in detail WO2019123324 and WO2020/255054, some of which are shown in table 6.

TABLE 6

Selected promoter sequences

| Promoter name | % activity relative to PglpF* | Strength | reference | Seq ID in appl. |
|---|---|---|---|---|
| PmglB_70UTR_SD8 | 291% | high | WO2020255054 | 29 |
| PmglB_70UTR_SD10 | 233-281% | high | WO2020255054 | 30 |
| PmglB_54UTR | 197% | high | WO2020255054 | 31 |
| Plac_70UTR | 182-220% | high | WO2019123324 | 32 |
| PmglB_70UTR_SD9 | 180-226% | high | WO2020255054 | 33 |
| PmglB_70UTR_SD4 | 153%-353% | high | WO2020255054 | 34 |
| PmglB_70UTR_SD5 | 146-152% | high | WO2020255054 | 35 |
| PglpF_SD4 | 140-161% | high | WO2019123324 | 36 |
| PmglB_70UTR_SD7 | 127-173% | high | WO2020255054 | 37 |
| PmglB_70UTR | 124-234% | high | WO2020255054 | 38 |
| PglpA_70UTR | 102-179% | high | WO2019123324 | 39 |
| PglpT_70UTR | 102-240% | high | WO2019123324 | 40 |
| PgatY_70UTR | 112% | high | WO2019123324 | 41 |
| PglpF | 100% | high | WO2019123324 | 42 |
| PglpF_SD10 | 88-96% | high | WO2019123324 | 43 |
| PglpF_SD5 | 82-91% | high | WO2019123324 | 44 |
| PglpF_SD8 | 81-82% | high | WO2019123324 | 45 |
| PmglB_16UTR | 78-171% | high | WO2019123324 | 46 |
| PglpF_SD9 | 73-93% | middle | WO2019123324 | 47 |
| PglpF_SD7 | 47-57% | middle | WO2019123324 | 48 |
| PglpF_SD6 | 46-47% | middle | WO2019123324 | 49 |
| PglpA_16UTR | 38-64% | middle | WO2019123324 | 50 |
| Plac_wt | 15-28% | low | WO2019123324 | 51 |
| PglpF_SD3 | 9% | low | WO2019123324 | 52 |
| PglpF_SD1 | 5% | low | WO2019123324 | 53 |

*The promoter activity is assessed in the LacZ assay described below with the PglpF promoter run as positive reference in the same assay. To compare across assays the activity is calculated relative to the PglpF promoter, a range indicates results from multiple assays.

The promoter may be of heterologous origin, native to the genetically modified cell or it may be a recombinant promoter, combining heterologous and/or native elements.

One way to increase the production of a product may be to regulate the production of the desired enzyme activity used to produce the product, such as the glycosyltransferases or enzymes involved in the biosynthetic pathway of the glycosyl donor.

Increasing the promoter strength driving the expression of the desired enzyme may be one way of doing this. The strength of a promoter can be assed using a lacZ enzyme assay where β-galactosidase activity is assayed as described previously (see e.g. Miller J. H. *Experiments in molecular genetics*, Cold spring Harbor Laboratory Press, NY, 1972). Briefly the cells are diluted in Z-buffer and permeabilized with sodium dodecyl sulfate (0.1%) and chloroform. The LacZ assays is performed at 30° C. Samples are preheated, the assay initiated by addition of 200 μl ortho-nitro-phenyl-β-galactosidase (4 mg/ml) and stopped by addition of 500 μl of 1 M $Na_2CO_3$ when the sample had turned slightly yellow. The release of ortho-nitrophenol is subsequently determined as the change in optical density at 420 nm. The specific activities are reported in Miller Units (MU) [A420/(min*ml*A600)]. A regulatory element with an activity above 10,000 MU is considered strong and a regulatory element with an activity below 3,000 MU is considered weak, what is in between has intermediate strength. An example of a strong regulatory element is the PglpF promoter with an activity of approximately 14.000 MU and an example of a weak promoter is Plac which when induced with IPTG has an activity of approximately 2300 MU.

Thus, in one embodiment of the invention, the invention relates to a nucleic acid construct, comprising one or more regulatory elements which are one or more promoter sequences. Preferably a promoter sequence from table 6. In the light of the present disclosure, a promoter promotes the expression of SacC_Agal or Bff.

A promoter sequence is a sequence capable of promoting and/or enhancing the expression of a nucleic acid sequence encoding a polypeptide, in a constitutive or inductive manner.

The invention relates to a nucleic acid construct as described above, wherein the one or more promoter sequence(s) is/are one or more inducible promoter(s) and/or one or more constitutive promoter(s).

An Inducible Promoter

In one embodiment of the invention, the one or more promoter sequences is/are one or more inducible promoter(s). Accordingly, in another embodiment the one or more promoter sequences is/are one or more constitutive promoter(s).

In embodiments of the invention the expression of selected nucleic acid sequences of the present invention is under control of a PglpF (SEQ ID NO: 42) or Plac (SEQ ID NO: 51) or PmglB_UTR70 (SEQ ID NO: 38) or PglpA_70UTR (SEQ ID NO: 39) or PglpT_70UTR (SEQ ID NO: 40) or PgatY (SEQ ID NO: 41) or variants of these promoters as identified in Table 6.

Specific PglpF variants can be selected from the group consisting of SEQ ID NO: 36, 43, 44, 45, 47, 48, 49, 52 or 53. A specific Plac variant is SEQ ID NO: 32. Specific PmglB_70UTR variants can be selected from the group consisting of SEQ ID NO:29, 30, 31, 33, 34, 35, 37 or 46.

Further suitable variants of PglpF, PglpA_70UTR, PglpT_70UTR and PmglB_70UTR promoter sequences are described in or WO2019/123324 and WO2020/255054 respectively (hereby incorporated by reference).

In one or more exemplary embodiments, the regulatory element is a promoter with high or middle strength, such as a promoter sequence selected from the group consisting of PmglB_70UTR_SD8, PmglB_70UTR_SD10, PmglB_54UTR, Plac_70UTR, PmglB_70UTR_SD9, PmglB_70UTR_SD4, PmglB_70UTR_SD5, PglpF_SD4, PmglB_70UTR_SD7, PmglB_70UTR, PglpA_70UTR, PglpT_70UTR, pgatY_70UTR, PglpF, PglpF_SD10, PglpF_SD5, PglpF_SD8, PmglB_16UTR, PglpF_SD9, PglpF_SD7, PglpF_SD6 and PglpA_16UTR, Pscr.

In on referred embodiment the promoter is a strong promoter selected from the group consisting of PmglB_70UTR_SD8, PmglB_70UTR_SD10, PmglB_54UTR, Plac_70UTR, PmglB_70UTR_SD9, PmglB_70UTR_SD4, PmglB_70UTR_SD5, PglpF_SD4, PmglB_70UTR_SD7, PmglB_70UTR, PglpA_70UTR, PglpT_70UTR, pgatY_70UTR, PglpF, PglpF_SD10, PglpF_SD5, PglpF_SD8, and PmglB_16UTR.

In another embodiment the promoter is selected from the group consisting of promoters with middle strength, such as PglpF_SD9, PglpF_SD7, PglpF_SD6 and PglpA_16UTR.

In another embodiment the promoter is selected from the group consisting of promoters with low strength, such as Plac wt. PglpF_SD3 and PglpF_SD1.

In a preferred embodiment of the invention, the invention relates to a nucleic acid construct as described above comprising a regulatory element, wherein the regulatory element is a promoter selected from the group consisting of, PgatY_70UTR, PglpF, PglpF_SD1, PglpF_SD10, PglpF_SD2, PglpF_SD3, PglpF_SD4, PglpF_SD5, PglpF_SD6, PglpF_SD7, PglpF_SD8, PglpF_SD9, Plac_16UTR, Plac, PmglB_70UTR, PmglB_70UTR_SD4, Pxyl, Ptet, PsacB, PxylA, PrpR, PnitA, PBAD, PT7, Ptac, PL, PR, PnisA and Pb. The group of promoters is not exhaustive. More examples are illustrated in prior art e.g., Carrol et. al., Applied and Environmental Microbiology, June 2005, p. 3077-3084.

The nucleic acid construct of the invention may thus comprise a promoter sequence operably linked to a heterologous nucleic acid sequence encoding a heterologous polypeptide of the invention, thereby enhancing the expression of said nucleic acid sequence upon a specific cue, such as pH, nutrient, sugar related, regulatory proteins, ions such as phosphate, organic chemicals such as IPTG or carbohydrates, physical parameters such as temperature, pH, signalling molecules, short nucleic acids, toxin related or similar intra- or extracellular related cues.

Thus, in one embodiment of the invention, the invention relates to a nucleic acid construct as described above comprising a regulatory element, wherein the regulatory element comprises an inducible promoter which is a sucrose inducible promoter, such as but not limited to Pscr and/or PsacB.

In a further preferred embodiment of the invention, the invention relates to a nucleic acid construct as described above comprising a regulatory element, wherein the regulatory element is the inducible promoter Pscr.

In another embodiment of the invention, the invention relates to a nucleic acid construct as described above, that comprises an inducible promoter, wherein the inducible promoter is PglpF (SEQ ID NO: 42) and/or Plac (SEQ ID NO: 51). In yet another embodiment of the invention, the invention relates to a nucleic acid construct as described above, that comprises an inducible promoter, wherein the inducible promoter is PglpF (SEQ ID NO: 42)

A Constitutive Promoter

In another preferred embodiment of the invention, the invention relates to a nucleic acid construct as described above comprising a regulatory element, wherein the regulatory element comprises a constitutive promoter.

When the regulatory element comprises a constitutive promoter, i.e., which constitutively promotes the expression of a heterologous nucleic acid encoding a heterologous polypeptide according to the invention, the constitutive promoter may be a strong or a weak constitutive promoter. Typical constitutive promotors of the present disclosure are mentioned in Liang et al, *Activities of Constitutive Promoters in Escherichia coli*, J. Mol. Biol. (1999) 292, 19-37, Yim et al, *Molecular Characterization of the Promoter of osmY, a rpoS-DependentGene*, JOURNAL OF BACTERIOLOGY, January 1994, p. 100-107, and Jensen and Hammer, *Appl Environ Microbiol.* 1998 January; 64(1):82-7.

In that regard, in a preferred embodiment of the invention, the invention relates to a nucleic acid construct as described above, that comprises a constitutive promoter, wherein the constitutive promoter is selected from the group consisting of, CP6, PosmY, Pspc, Pbla, Prrn1 and Prrn2.

A Signal Peptide

In one embodiment of the invention, the nucleic acid construct comprises a nucleic acid sequence encoding a signal peptide as described above. Thus, in a preferred embodiment of the invention, a nucleic acid construct according to the present disclosure comprises a nucleic acid sequence encoding a signal peptide, wherein the signal peptide is placed upstream or downstream of the heterologous nucleic acid encoding a polypeptide capable of hydrolysing sucrose. Preferably, the signal peptide is selected from Table 1, and even more preferably the signal peptide is SEQ ID NO:28.

A Genetically Modified Cell

The present disclosure relates to a genetically modified cell which comprises a heterologous nucleic acid sequence encoding an extracellular, periplasmic and/or membrane-bound or membrane-embedded heterologous polypeptide which is an enzyme capable of hydrolysing sucrose into fructose and glucose, wherein the expression of said polypeptide enables utilization of sucrose as the main and/or the sole carbon source and/or energy source. Alternatively, as the main and/or the sole carbon and/or as the main and/or the sole energy source, or even as sole carbon source and as sole energy source of said genetically modified cell. Preferably, the heterologous enzyme that is capable of hydrolysing sucrose into fructose and glucose, can use unmodified sucrose, such as non-phosphorylated sucrose, as substrate.

One aspect of the present invention is a genetically modified cell which comprises a heterologous nucleic acid sequence encoding a heterologous enzyme which on its own is capable of hydrolysing sucrose into fructose and glucose on the extracellular side of the genetically modified cell, and wherein the expression of said enzyme is sufficient to enable utilization of sucrose as carbon and/or as energy source of said genetically modified cell.

In one embodiment of the invention the enzyme is located in the periplasm or in the extracellular space of the cell.

In one embodiment the enzyme is anchored, embedded and/or attached either at the periplasmic, the extracellular and/or the cytosolic side of the plasma membrane.

In another embodiment the enzyme is soluble.

As discussed above uneven sucrose gradients in the fermentation process may lead to metabolic stress of the genetically modified cell. To circumvent this, the parts of the endogenous glucose transport system can be fully or partially inactivated, to slow the uptake of glucose from the media down.

Thus, in an embodiment, the endogenous glucose transport system of the genetically modified cell is fully or partially inactivated.

Accordingly, in a preferred embodiment the genetically modified cell of the present invention does not contain a functional ptsG gene and does therefore not produce the glucose-specific EIICB component (UniProt P69786) of the native *E. coli* glucose PTS system. In another preferred embodiment the ptsG gene, encoding a cytoplasmic-membrane glucose permease is fully or partially inactivated. A cell with a non-functional ptsG gene has a reduced or limited glucose uptake compared to a cell with a functional ptsG gene. The ptsG can either be deleted from the cell, alternatively it can be edited resulting in loss of function of the ptsG gene or gene product, or which abolishes the function of the polypeptide encoded by the mutated ptsG gene. Suitable methods for such editing of genes are well known to the person skilled in the art.

Genetically modified cells can in general contain one or more genes that are not present in the native (not genetically engineered) form of the cell. Techniques for introducing exogenous nucleic acid molecules/sequences and/or inserting exogenous nucleic acid molecules/sequences (recombinant, heterologous) into a cell's hereditary information for inserting, deleting or altering the nucleic acid sequence of a cell's genetic information are known to the skilled artisan.

Genetically modified cells can contain one or more genes that are present in the native form of the cell, wherein said genes are modified and re-introduced into the microbial cell by artificial means.

The term "genetically modified" also encompasses cells that contain a nucleic acid molecule being endogenous to the cell that has been modified without removing the nucleic acid molecule from the cell.

Such modifications include those obtained by gene replacement, site-specific mutations, and related techniques.

Genetically modified cells of the invention can be provided using standard methods of the art e.g., those described in the manuals by Sambrook et al., Wilson & Walker, "Maniatis et al., and Ausubel et al.

Host cells Regarding the genetically modified cell, there are, in principle, no limitations, they may be eubacteria (gram-positive or gram-negative) or archaebacteria, as long as they allow genetic manipulation for insertion of a gene of interest and can be cultivated on a manufacturing scale. Preferably, the host cell has the property to allow cultivation to high cell densities.

In general, a suitable host organism is a host cell that does not naturally contain genes enabling the cell to utilize sucrose as carbon source, so as to confer on said recipient organism a new ability to utilize sucrose or to enhance an already existing, limited sucrose utilization capacity by adding the gene of the invention.

Examples of said host organisms include a wide variety of microorganism that do not have a native ability to utilize sucrose, or that utilize sucrose poorly. The only limitation is that the recipient organism must be capable of being genetically altered (by genetic engineering, mating, transduction, transformation, etc.), such that the sucrose utilization gene of the invention may be installed in the host strain.

Non-limiting examples of bacterial host cells that are suitable for recombinant industrial production of an HMO(s) according to the invention could be *Erwinia herbicola* (*Pantoea agglomerans*), *Citrobacter freundii*, *Campylobacter* sp, *Pantoea citrea*, *Pectobacterium carotovorum*, or *Xanthomonas campestris*. Bacteria of the genus *Bacillus* may also be used, including *Bacillus subtilis*, *Bacillus licheniformis*, *Bacillus coagulans*, *Bacillus thermophilus*, *Bacillus laterosporus*, *Bacillus megaterium*, *Bacillus mycoides*, *Bacillus pumilus*, *Bacillus lentus*, *Bacillus cereus*, and *Bacillus circulans*. Similarly, bacteria of the genera *Lactobacillus* and *Lactococcus* may be engineered using the methods of this invention, including but not limited to *Lactobacillus acidophilus*, *Lactobacillus salivarius*, *Lactobacillus plantarum*, *Lactobacillus helveticus*, *Lactobacillus delbrueckii*, *Lactobacillus rhamnosus*, *Lactobacillus bulgaricus*, *Lactobacillus crispatus*, *Lactobacillus gasseri*, *Lactobacillus casei*, *Lactobacillus reuteri*, *Lactobacillus jensenii*, and *Lactococcus lactis*. *Streptococcus thermophiles* and *Proprioni bacterium freudenreichii* are also suitable bacterial species for the invention described herein. Also included as part of this invention are strains, engineered as described here, from the genera *Enterococcus* (e.g., *Enterococcus faecium* and *Enterococcus thermophiles*), *Bifidobacterium* (e.g., *Bifidobacterium longum*, *Bifidobacterium infantis*, and *Bifidobacterium bifidum*), *Sporolactobacillus* spp., *Micromomospora* spp., *Micrococcus* spp., *Rhodococcus* spp., and *Pseudomonas* (e.g., *Pseudomonas fluorescens* and *Pseudomonas aeruginosa*).

Non-limiting examples of fungal host cells that are suitable for recombinant industrial production of a heterologous product are e.g., yeast cells, such as Komagataella phaffii, *Kluyveromyces lactis*, *Yarrowia lipolytica*, *Pichia pastoris*, and *Saccaromyces cerevisiae* or filamentous fungi such as *Aspargillus* sp, *Fusarium* sp or Thricoderma sp, exemplary species are *A. niger*, *A. nidulans*, *A. oryzae*, *F. solani*, *F. graminearum* and *T. reesei*.

Non-limiting examples of mammalian cell lines are chinese hamster ovary cells (CHO) and murine myeloma cells (NS0, Sp2/0), baby hamster kidney cells (BHK), Murine C127, human cell lines such as PER.C6, HKB-11, CAP and HuH-7, HEK293, HT-1080 and HeLa cells (see for example Dumont et al 2016 *Crit Rev Biotechnol* 36(6): 1110-1122).

In one or more embodiments, the genetically engineered cell is selected from the group consisting of *E. coli*, *L. lactis*, *B. subtilis*, *S. lividans*, *P. pastoris*, *Y. lipolytica* and *S. cerevisiae*.

In one or more exemplary embodiments, the genetically engineered cell is *B. subtilis*.

In one or more exemplary embodiments, the genetically engineered cell is *S. Cerevisiae* or *P pastoris*.

In one or more exemplary embodiments, the genetically engineered cell is *Escherichia coli*.

In one or more exemplary embodiments, the invention relates to a genetically engineered cell, wherein the cell is derived from the *E. coli* K-12 strain or DE3. *E. coli* K-12 strains are well known in the art (such as EMG2, MG1655, W3110, W3350, C600, and DH5a), which is the strain background for the vast majority of genetic engineering work done in *E. coli*, ATCC 8739 (*E. coli* C), ATCC 11303 (*E. coli* B), BL21 (see New England Biolabs catalog, 2007-2008) and derivatives of these strains.

In another embodiment of the present disclosure, the genetically modified cell can be selected from a group of Suc$^+$ microbial cells that in the absence of the nucleic acid sequence encoding a polypeptide conferring the capability of sucrose hydrolysis, are less and/or suboptimally capable of utilizing sucrose as carbon and energy source, and wherein the transferring of the nucleic acid sequence encoding a polypeptide according to the present disclosure enables the already Suc$^+$ microbial cells to better utilize sucrose as carbon and energy source. In said embodiment, the selected Suc$^+$ microbial cells can further be engineered to in addition to the introduction of the nucleic acid sequence encoding a polypeptide according to the present disclosure increase the expression of their endogenous sucrose invertase/hydrolase gene. A microbial cell according to said embodiment can be selected from the group consisting of Suc$^+$ *Saccharomyces cerevisiae* and Suc$^+$ *Bacillus subtilis*.

Genetic Integration

Integration of the heterologous nucleic acid of interest comprised in the construct (expression cassette) into the genome can be achieved by conventional methods, e.g. by using linear cartridges that contain flanking sequences homologous to a specific site on the chromosome, as described for the attTn7-site (Waddell C. S. and Craig N. L., Genes Dev. (1988) February; 2(2):137-49); methods for genomic integration of nucleic acid sequences in which recombination is mediated by the Red recombinase function of the phage A or the RecE/RecT recombinase function of the Rac prophage (Murphy, J Bacteriol. (1998); 180(8): 2063-7; Zhang et al., Nature Genetics (1998) 20: 123-128;

Muyrers et al., EMBO Rep. (2000) 1(3): 239-243); methods based on Red/ET recombination (Wenzel et al., Chem Biol. (2005), 12(3):349-56; Vetcher et al., Appl Environ Microbiol. (2005); 71(4):1829-35); or positive clones, i.e., clones that carry the expression cassette, can be selected e.g. by means of a marker gene, or loss or gain of gene function.

Expression of the heterologous polypeptide may in one embodiment be obtained from episomal integration, i.e. the nucleic acid encoding the heterologous polypeptide may be inserted into a nucleic acid construct, as described above, which is then subsequently comprised in a plasmid or in another chromosomal independent expression vector, wherein the expression vector might is, at some instances, capable of integrating into the chromosome, it is however not required to do so in order to obtain expression of the heterologous nucleic acid encoding a heterologous polypeptide of the invention. Examples of episomes are for instance transposons and insertion sequences.

In the scope of the invention as disclosed, the term "genomically integrated" refers to the integration of a heterologous nucleic acid into the chromosome or into an endogenous plasmid, thus being integrated into the genome of the genetically modified cell of the invention.

Thus, in a preferred embodiment, the invention relates to a genetically modified cell as described above, wherein the heterologous nucleic acid sequence encodes an episomal and/or genomically integrated copy of a heterologous polypeptide capable of hydrolysing sucrose into fructose and glucose.

In one embodiment, the heterologous nucleic acid sequence encoding the heterologous polypeptide according to the invention is integrated into the genome of the genetically modified cell in a stable manner. In another embodiment, the heterologous polypeptide according to the invention is introduced to the genetically modified cell in a transient manner.

A Cell which is Capable of Producing a Biosynthetic Product

A biosynthetic product in context of the present invention is a compound which is either directly expressed from one or more heterologous genes inserted into a host cell, or one that is produced through utilization of one or more metabolic pathways of the cell and/or one or more enzymatic activities that are engineered to produce a compound of interest. Biosynthetic products can for example be proteins, peptides, lipids, fatty acids, amino acids, organic acids, oligosaccharides, polysaccharides, polyesters or vitamins.

Biosynthetic produced proteins or polypeptides are for example biopharmaceutical compounds such as antibodies, vaccines, cytokines, blood factors, enzymes, hormones and growth factors, or industrial compounds such as enzymes. These are generally produced by inserting a recombinant gene(s) that that encode the desired protein or polypeptide into the host cell.

In that regard, the invention also relates to a polypeptide enzyme for use in a biosynthetic production, wherein the polypeptide enzyme is an invertase capable of hydrolysing sucrose into glucose and fructose and is the polypeptide enzyme SacC_Agal comprising or consisting of the amino acid sequence of SEQ ID NO: 1 or a functional homologue thereof, having an amino acid sequence which is at least 80%, such as at least 85%, such as at least 90%, such as at least 95% or such as at least 99% identical to SEQ ID NO: 1. In an embodiment the polypeptide enzyme is for use in the biosynthetic production of one or more oligosaccharides and/or polysaccharides. In a further embodiment the polypeptide enzyme is for use in the biosynthetic production of one or more HMOs.

In that regard, the invention also relates to a polypeptide enzyme for use in a biosynthetic production, wherein the polypeptide enzyme is an invertase capable of hydrolysing sucrose into glucose and fructose and is the polypeptide enzyme Bff comprising or consisting of the amino acid sequence of SEQ ID NO: 2 or a functional homologue thereof, having an amino acid sequence which is at least 80%, such as at least 85%, such as at least 90%, such as at least 95% or such as at least 99% identical to SEQ ID NO: 2. In an embodiment the polypeptide enzyme is for use in the biosynthetic production of one or more oligosaccharides and/or polysaccharides. In a further embodiment the polypeptide enzyme is for use in the biosynthetic production of one or more HMOs.

Biosynthetically produced oligosaccharides and polysaccharides are for example human milk oligosaccharides (HMOs) or biopolymers. These are generally produced by inserting genes encoding enzymes that can produce the desired compounds based on precursor molecules provided to the cell or produced by synthetic pathways in the host cell (which may also be genetically engineered).

The present invention also relates to a genetically modified cell which comprises a heterologous nucleic acid sequence encoding a heterologous enzyme which on its own is capable of hydrolysing sucrose into fructose and glucose on the extracellular side of the genetically modified cell, and wherein the expression of said enzyme is sufficient to enable utilization of sucrose as carbon and/or as energy source of said genetically modified cell, wherein said cell further comprises one or more recombinant genes that allow it to produce a biosynthetic product of interest.

A Cell which is Capable of Producing Human Milk Oligosaccharides (HMO)

The present disclosure relates to improved and efficient means to biosynthetically produce HMO(s) in modified bacterial strains for large-scale applicable solutions for HMO manufacturing. It relies on genetically modified bacteria constructed so as to express the glycosyltransferases needed for synthesis of the desired oligosaccharides and takes advantage of the bacteria's innate pool of nucleotide sugars as HMO precursors.

The invention therefore also relates to the use of a genetically modified cell or a nucleic acid construct according to the invention as disclosed, for the biosynthetic production of one or more HMO(s).

For the genetically modified cell according to the present disclosure to be capable of producing one or more HMO(s), it requires multiple genetic modifications. Some of these modifications may include the inclusion of glycosyl transferases, which enables the biosynthesis of one or more HMO(s) essentially from lactose and a carbon donor, such as an activated sugar nucleotide, biosynthetic pathways for producing the activated sugar nucleotide and potentially transporters for import of lactose or export of product.

Above-mentioned modifications relate to metabolic engineering as well as introduction and expression of functional enzymes that enable the production of said one or more HMO(s) from a starting material, that is often lactose.

Thus, the ability of a cell to produce one or more HMO(s) combined with its ability to utilize sucrose as a carbon and as an energy source and/or main carbon and main energy source, and/or sole carbon and sole energy source, requires multiple genetic modifications, thus said genetically modified cell of the invention, in order to satisfy the invention as disclosed herein, comprises a heterologous nucleic acid sequence encoding a heterologous polypeptide capable of hydrolysing sucrose, said polypeptide having an amino acid sequence which is at least 70%, more preferably at least 80%, more preferably at least 90%, more preferably at least 95% and even more preferably at least 99% sequence identity to SEQ ID NO: 1 or SEQ ID NO: 2.

Further, the invention relates to a genetically modified cell optimized for the production of one or more particular oligosaccharides, in particular one or more particular HMO(s), said cell comprising a heterologous nucleic acid encoding a polypeptide having at least 70%, such as at least 90% sequence identity, preferably at least 95%, more preferably at least 97%, more preferably at least 98%, and even more preferably at least 99% sequence identity to the amino acid sequence of SEQ ID NO: 1 or SEQ ID NO: 2.

Accordingly, one embodiment of the invention relates to a genetically modified cell capable of producing one or more Human Milk Oligosaccharides (HMO(s)), wherein said genetically modified cell comprises a heterologous nucleic acid sequence encoding a polypeptide capable of hydrolysing sucrose, said nucleic acid sequence having an nucleic acid sequence which is 70%, more preferably at least 75%, more preferably at least 80% more preferably at least 90% and even more preferably at least 95%, such as 99% sequence identity to SEQ ID NO: 1 or SEQ ID NO: 2.

As the production of one or more HMO(s), in a genetically modified cell capable of utilizing sucrose as a carbon and as an energy source, or the main carbon and the main energy source or the sole carbon and the sole energy source, further requires one or more functional enzymes, these are described in detail in the below paragraphs.

An HMO

The term "human milk oligosaccharide" or "HMO" in the present context means a complex carbohydrate found in human breast milk (for reference, see Urashima et al.: Milk Oligosaccharides. Nova Science Publisher (2011); or Chen, Adv. Carbohydr. Chem. Biochem. 72, 113 (2015)). The HMO(s) have a core structure comprising a lactose unit at the reducing end that can be elongated by one or more β-N-acetyl-lactosaminyl and/or one or more β-lacto-N-biosyl units, and this core structure can be substituted by an α-L-fucopyranosyl and/or an α-N-acetyl-neuraminyl (sialyl) moiety. In this regard, the non-acidic (or neutral) HMO(s) are devoid of a sialyl residue, and the acidic HMO(s) have at least one sialyl residue in their structure. The non-acidic (or neutral) HMO(s) can be fucosylated or non-fucosylated. Examples of such neutral non-fucosylated HMO(s) include lacto-N-triose II (LNT-II) lacto-N-tetraose (LNT), lacto-N-neotetraose (LNnT), lacto-N-neohexaose (LNnH), para-lacto-N-neohexaose (pLNnH), para-lacto-N-hexaose (pLNH) and lacto-N-hexaose (LNH). Examples of neutral fucosylated HMO(s) include 2'-fucosyllactose (2'-FL), lacto-N-fucopentaose I (LNFP-I), lacto-N-difucohexaose I (LNDFH-I), 3-fucosyllactose (3-FL), difucosyllactose (DFL), lacto-N-fucopentaose II (LNFP-II), lacto-N-fucopentaose III (LNFP-III), lacto-N-difucohexaose III (LNDFH-III), fucosyl-lacto-N-hexaose II (FLNH-II), lacto-N-fucopentaose V (LNFP-V), lacto-N-difucohexaose II (LNDFH-II), fucosyl-lacto-N-hexaose I (FLNH-I), fucosyl-para-lacto-N-hexaose I (FpLNH-I), fucosyl-para-lacto-N-neohexaose II (F-pLNnH II) and fucosyl-lacto-N-neohexaose (FLNnH). Examples of acidic HMO(s) include 3'-sialyllactose (3'-SL), 6'-sialyllactose (6'-SL), 3-fucosyl-3'-sialyllactose (FSL), 3'-O-sialyllacto-N-tetraose a (LST a), fucosyl-LST a (FLST a), 6'-O-sialyllacto-N-tetraose b (LST b), fucosyl-LST b (FLST b), 6'-O-sialyllacto-N-neotetraose (LST c), fucosyl-LST c (FLST c), 3'-O-sialyllacto-N-neotetraose (LST d), fucosyl-LST d (FLST d), sialyl-lacto-N-hexaose (SLNH), sialyl-lacto-N-neohexaose I (SLNH-I), sialyl-lacto-N-neohexaose II (SLNH-II) and disialyl-lacto-N-tetraose (DSLNT). In the context of the present disclosure lactose is not regarded as an HMO species.

Thus, in one embodiment, the one or more HMO(s) produced by the genetically modified cell is/are selected from the group consisting of lacto-N-triose II (LNT-II) lacto-N-tetraose (LNT), lacto-N-neotetraose (LNnT), lacto-N-neohexaose (LNnH), para-lacto-N-neohexaose (pLNnH), para-lacto-N-hexaose (pLNH), lacto-N-hexaose (LNH), 2'-fucosyllactose (2'-FL), lacto-N-fucopentaose I (LNFP-I), lacto-N-difucohexaose I (LNDFH-I), 3-fucosyllactose (3-FL), difucosyllactose (DFL), lacto-N-fucopentaose II (LNFP-II), lacto-N-fucopentaose III (LNFP-III), lacto-N-difucohexaose III (LNDFH-III), fucosyl-lacto-N-hexaose II (FLNH-II), lacto-N-fucopentaose V (LNFP-V), lacto-N-difucohexaose II (LNDFH-II), fucosyl-lacto-N-hexaose I (FLNH-I), fucosyl-para-lacto-N-hexaose I (FpLNH-I), fucosyl-para-lacto-N-neohexaose II (F-pLNnH II), fucosyl-lacto-N-neohexaose (FLNnH), 3'-sialyllactose (3'-SL), 6'-sialyllactose (6'-SL), 3-fucosyl-3'-sialyllactose (FSL), 3'-O-sialyllacto-N-tetraose a (LST a), fucosyl-LST a (FLST a), 6'-O-sialyllacto-N-tetraose b (LST b), fucosyl-LST b (FLST b), 6'-O-sialyllacto-N-neotetraose (LST c), fucosyl-LST c (FLST c), 3'-O-sialyllacto-N-neotetraose (LST d), fucosyl-LST d (FLST d), sialyl-lacto-N-hexaose (SLNH), sialyl-lacto-N-neohexaose I (SLNH-I), sialyl-lacto-N-neohexaose II (SLNH-II) and disialyl-lacto-N-tetraose (DSLNT).

In another embodiment of the invention said one or more HMO(s), is one or more HMO(s) according to formula 1,

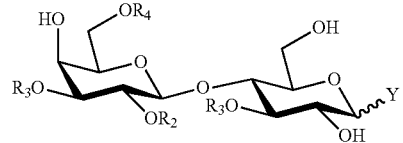

wherein Y is OH,
R1 is fucosyl or H,
R2 is fucosyl or H,
R3 is selected from H, sialyl, N-acetyl-lactosaminyl and lacto-N-biosyl groups, wherein the N-acetyl-lactosaminyl group can carry a glycosyl residue comprising one or more N-acetyl-lactosaminyl and/or one or more lacto-N-biosyl groups; each of the N-acetyl-lactosaminyl and lacto-N-biosyl groups can be substituted with one or more sialyl and/or fucosyl residue,
R4 is selected from H, sialyl and N-acetyl-lactosaminyl groups optionally substituted with a glycosyl residue comprising one or more N-acetyl-lactosaminyl and/or one or more lacto-N-biosyl groups; each of the N-acetyl-lactosaminyl and lacto-N-biosyl groups can be substituted with one or more sialyl and/or fucosyl residue, provided that at least one of the R2, R2, R3 and R4 groups is/are different from H.

β-Galactosidase

A host suitable for the HMO production, e.g. E. coli, may comprise an endogenous β-galactosidase gene or an exogenous β-galactosidase gene, e.g. E. coli comprises an endogenous lacZ gene (e.g., GenBank Accession Number V00296 (GI:41901)). For the purposes of the invention, an HMO-producing host cell is genetically manipulated to either not comprise any β-galactosidase gene or to comprise a β-galactosidase gene that is inactivated. The gene may be inactivated by a complete or partial deletion of the corresponding nucleic acid sequence from the bacterial genome, or the gene sequence is mutated in the way that it is not transcribed, or, if transcribed, the transcript is not translated or if translated to a protein (i.e. β-galactosidase), the protein does not have the corresponding enzymatic activity. In this way the HMO-producing bacterium accumulates an increased intracellular lactose pool which is beneficial for the production of HMOs.

Functional Enzymes in Biosynthetic Production of One or More HMO(s)

As described above, for the cell to be capable of synthesizing one or more HMO(s), the genetically modified cell of the invention must comprise at least one additional heterologous nucleic acid, besides the heterologous nuclei acid enabling utilization of sucrose as the main and/or the sole carbon source and/or as the main and/or the sole energy source, wherein the additional heterologous nucleic acid sequence(s) encodes one or more functional enzyme(s) with glycosyltransferase activity. The glycosyltransferase gene may be integrated into the genome (by chromosomal integration) of the genetically modified cell, or alternatively, it may be comprised in a plasmid and expressed as plasmid-borne, as described for the heterologous nucleic acid sequence of the invention. If two or more glycosyltransferases are needed for the genetically modified cell to be capable of producing an HMO, e.g. LNT or LNnT, two or more heterologous nucleic acids encoding different enzymes with glycosyltransferase activity may be integrated into the nucleic acid construct of the invention or it may be individual nucleic acid sequences, which may be integrated in the genome and/or expressed from a plasmid, e.g. a β-1,3-N-acetylglucosaminyltransferase (a first heterologous nucleic acid sequence encoding a first glycosyltransferase) in combination with a β-1,3-galactosyltransferase (a second heterologous nucleic acid sequence encoding a second glycosyltransferase) for the production of LNT, where the first and second heterologous nucleic acid sequences can independently from each other be integrated chromosomally or on a plasmid or they can be combined into a nucleic acid construct, optionally comprised in the nucleic acid construct of the invention also comprising the features described above.

In one preferred embodiment, both the first and second heterologous nucleic acids encoding one or more glycosyltransferases are stably integrated into the chromosome of the genetically modified cell; in another preferred embodiment the first and second heterologous nucleic acids encoding one or more glycosyltransferases are integrated independently of the heterologous nucleic acid sequence encoding the heterologous polypeptide of the invention. In a further embodiment, the first and second heterologous nucleic acids encoding one or more glycosyltransferases are integrated into the nucleic acid construct of the invention as disclosed. In another embodiment at least one of the heterologous nucleic acid sequence(s) encoding the glycosyltransferase(s) are plasmid-borne.

A protein/enzyme with glycosyltransferase activity (glycosyltransferase) may be selected in different embodiments from enzymes having the activity of α-1,2-fucosyltransferase, α-1,3-fucosyltransferase, α-1,3/4-fucosyltransferase, α-1,4-fucosyltransferase α-2,3-sialyltransferase, α-2,6-sialyltransferase, β-1,3-N-acetylglucosaminyltransferase, β-1,6-N-acetylglucosaminyltransferase, β-1,3-galactosyltransferase and β-1,4-galactosyltransferase. For example, the biosynthetic production of 2'-FL requires that the modified cell expresses an active α-1,2-fucosyltransferase enzyme; for the production of 3-FL the modified cell needs expression of an active α-1,3-fucosyltransferase enzyme; for the production of LNT the modified cell need to express at least two glycosyltransferases, a β-1,3-N-acetylglucosaminyltransferase and a β-1,3-galactosyltransferase; for the production of 6'-SL the modified cell has to express an active α-2,6-sialyltransferase enzyme and a pathway for CMP-sialic acid synthesis; for the production of 3'SL the genetically modified cell has to express an active α-2,3-sialyltransferase enzyme and a pathway for CMP-sialic acid synthesis. Some non-limiting embodiments of proteins having glycosyltransferase activity, which can be encoded by the recombinant genes comprised by the production cell, can be selected from non-limiting examples of Table 2.

TABLE 2

Glycosyltransferases suitable for HMO production

| Gene | Protein Sequence ID(GenBank) | Description | HMO example |
| --- | --- | --- | --- |
| IgtA_Nm | WP_002248149.1<br>WP_033911473.1 | β-1,3-N-acetylglucosaminyl-transferase | LNT II, LNT, LNnT, LNFP-I, LNFP-II, LNFP-III, LNFP-V, LNFP-VI, LNDFH-I, LNDFH-II, pLNH, F-pLNH I, pLNnH |
| IgtA_Nm_MC58 | AAF42258.1 | β-1,3-N-acetylglucosaminyl-transferase | LNT II, LNT, LNnT, LNFP-I, LNFP-II, LNFP-III, LNFP-V, LNFP-VI, LNDFH-I, LNDFH-II, pLNH, F-pLNH I, pLNnH |
| IgtA_Hd | AAN05638.1 | β-1,3-N-acetylglucosaminyl-transferase | LNT II, LNT, LNnT, LNFP-I, LNFP-II, LNFP-III, LNFP-V, LNFP-VI, LNDFH-I, LNDFH-II, pLNH, F-pLNH I, pLNnH |
| IgtA_Ng_PID2 | AAK70338.1 | β-1,3-N-acetylglucosaminyl-transferase | LNT II, LNT, LNnT, LNFP-I, LNFP-II, LNFP-III, LNFP-V, LNFP-VI, LNDFH-I, LNDFH-II, pLNH, F-pLNH I, pLNnH |
| IgtA_Ng_NCCP11945 | ACF31229.1 | β-1,3-N-acetylglucosaminyl-transferase | LNT II, LNT, LNnT, LNFP-I, LNFP-II, LNFP-III, LNFP-V, LNFP-VI, LNDFH-I, LNDFH-II, pLNH, F-pLNH I, pLNnH |
| IgtA_Past | AAK02595.1 | β-1,3-N-acetylglucosaminyl-transferase | LNT II, LNT, LNnT, LNFP-I, LNFP-II, LNFP-III, LNFP-V, LNFP-VI, LNDFH-I, LNDFH-II, pLNH, F-pLNH I, pLNnH |
| IgtA_Nc | EEZ72046.1 | β-1,3-N-acetylglucosaminyl-transferase | LNT II, LNT, LNnT, LNFP-I, LNFP-II, LNFP-III, LNFP-V, LNFP-VI, LNDFH-I, LNDFH-II, pLNH, F-pLNH I, pLNnH |

TABLE 2-continued

Glycosyltransferases suitable for HMO production

| Gene | Protein Sequence ID(GenBank) | Description | HMO example |
|---|---|---|---|
| IgtA_Nm_87255 | ELK60643.1 | β-1,3-N-acetylglucosaminyl-transferase | LNT II, LNT, LNnT, LNFP-I, LNFP-II, LNFP-III, LNFP-V, LNFP-VI, LNDFH-I, LNDFH-II, pLNH, F-pLNH I, pLNnH |
| HD0466 | WP_010944479.1 | β-1,3-N-acetylglucosaminyl-transferase | LNT II, LNT, LNnT, LNFP-I, LNFP-II, LNFP-III, LNFP-V, LNFP-VI, LNDFH-I, LNDFH-II, pLNH, F-pLNH I, pLNnH |
| PmnagT | WP_014390683.1 | β-1,3-N-acetylglucosaminyl-transferase | LNT II, LNT, LNnT, LNFP-I, LNFP-II, LNFP-III, LNFP-V, LNFP-VI, LNDFH-I, LNDFH-II, pLNH, F-pLNH I, pLNnH |
| Cvb3galT | WP_080969100.1 | β-1,3-galactosyltransferase | LNT, LNFP-I, LNFP-II, LNFP-V, LNDFH-I, LNDFH-II, pLNH, F-pLNH I |
| galT_Hp/ HP0826 | WP_001262061.1 | β-1,4-galactosyltransferase | LNnT, LNFP-III, LNFP-VI, pLNH I, F-pLNH I, pLNnH |
| galT_Nm/ IgtB | AAF42257.1 | β-1,4-galactosyltransferase | LNnT, LNFP-III, LNFP-VI, pLNH I, F-pLNH I, pLNnH |
| wbgO | WP_000582563.1 | β-1,3-galactosyltransferase | LNT, LNFP-I, LNFP-II, LNFP-V, LNDFH-I, LNDFH-II, pLNH, F-pLNH I |
| cpsIBJ | AB050723.1 | β-1,3-galactosyltransferase | LNT, LNFP-I, LNFP-II, LNFP-V, LNDFH-I, LNDFH-II, pLNH, F-pLNH I |
| jhp0563 | AEZ55696.1 | β-1,3-galactosyltransferase | LNT, LNFP-I, LNFP-II, LNFP-V, LNDFH-I, LNDFH-II, pLNH, F-pLNH I |
| galTK | homologous to WP_111735921 | β-1,3-galactosyltransferase | LNT, LNFP-I, LNFP-II, LNFP-V, LNDFH-I, LNDFH-II, pLNH, F-pLNH I |
| futC | WP_080473865.1 | α-1,2-fucosyl-transferase | 2'-FL, DFL, LNFP-I, LNDFH-I |
| FucT2_HpUA802 | AAC99764.1 | α-1,2-fucosyl-transferase | 2'-FL, DFL, LNFP-I, LNDFH-I |
| FucT2_EcO126t | ABE98421.1 | α-1,2-fucosyl-transferase | 2'-FL, DFL, LNFP-I, LNDFH-I |
| FucT2_Hm12198 | CBG40460.1 | α-1,2-fucosyl-transferase | 2'-FL, DFL, LNFP-I, LNDFH-I |
| FucT2_Pm9515 | ABM71599.1 | α-1,2-fucosyl-transferase | 2'-FL, DFL, LNFP-I, LNDFH-I |
| FucT2_HpF57 | BAJ59215.1 | α-1,2-fucosyl-transferase | 2'-FL, DFL, LNFP-I, LNDFH-I |
| FucT6_3_Bf | CAH09151.1 | α-1,3-fucosyl-transferase | 2'-FL, 3-FL, DFL, LNFP-I, LNFP-III, LNFP-V, LNFP-VI, LNDFH-II, F-pLNH I |
| FucT7_3_Bf | CAH09495.1 | α-1,3-fucosyl-transferase | 2'-FL, 3-FL, DFL, LNFP-I, LNFP-III, LNFP-V, LNFP-VI, LNDFH-II, F-pLNH I |
| FucT_3_Am | ACD04596.1 | α-1,3-fucosyl-transferase | 2'-FL, 3-FL, DFL, LNFP-I, LNFP-III, LNFP-V, LNFP-VI, LNDFH-II, F-pLNH I |
| MAMA_R764 | AGC02224.1 | α-1,3-fucosyl-transferase | 2'-FL, 3-FL, DFL, LNFP-I, LNFP-III, LNFP-V, LNFP-VI, LNDFH-II, F-pLNH I |
| Mg791 | AEQ33441.1 | α-1,3-fucosyl-transferase | 2'-FL, 3-FL, DFL, LNFP-I, LNFP-III, LNFP-V, LNFP-VI, LNDFH-II, F-pLNH I |
| Moumou_00703 | YP_007354660 | α-1,3-fucosyl-transferase | 2'-FL, 3-FL, DFL, LNFP-I, LNFP-III, LNFP-V, LNFP-VI, LNDFH-II, F-pLNH I |
| futA | NP_207177.1 | α-1,3-fucosyl-transferase | 2'-FL, 3-FL, DFL, LNFP-I, LNFP-III, LNFP-V, LNFP-VI, LNDFH-II, F-pLNH I |
| fucT | AAB81031.1 | α-1,3-fucosyl-transferase | 2'-FL, 3-FL, DFL, LNFP-I, LNFP-III, LNFP-V, LNFP-VI, LNDFH-II, F-pLNH I |
| fucTIII | AY450598.1 | α-1,4-fucosyl-transferase | LNDFH-I, LNDFH-II |
| fucTa | AF194963.1 | α-1,3/4-fucosyl-transferase | LNFP-II, LNDFH-I, LNDFH-II |
| Pd2,6ST | BAA25316.1 | α-2,6-sialyltransferase | 6'-SL |
| PspST6 | BAF92026.1 | α-2,6-sialyltransferase | 6'-SL |
| PiST6_145 | BAF91416.1 | α-2,6-sialyltransferase | 6'-SL |
| PiST6_119 | BAI49484.1 | α-2,6-sialyltransferase | 6'-SL |
| NST | AAC44541.1 | α-2,3-sialyltransferase | 3'-SL |
| Smob | WP_126455392.1 | α-1,2-fucosyltransferase | 2'-FL, LNFP-I |
| Mtun | WP_031437198.1 | α-1,2-fucosyltransferase | 2'-FL, LNFP-I, LNDFH-I |

The above-mentioned enzymes enable the biosynthetic production of HMO core structures as well as fucosylated and/or sialylated HMO(s) and its glycosidic derivatives. The genes encoding the above-mentioned transferases have been described in the literature.

Activated Sugar Nucleotides

Each activated sugar nucleotide generally comprises a phosphorylated glycosyl residue attached to a nucleoside, and the specific glycosyl transferase enzyme accepts only the specific sugar nucleotide. Thus, preferably the following activated sugar nucleotides are involved in the glycosyl transfer: UDP-Glc, UDP-Gal, UDP-GlcNAc, UDP-GalNAc, UDP-glucuronic acid, GDP-Man, GDP-Fuc and CMP-sialic acid, particularly those selected from the group consisting of UDP-Gal, UDP-GlcNAc, GDP-Fuc and CMP-sialic acid.

The genetically modified cell according to the present disclosure possesses a biosynthetic pathway to the above-mentioned activated sugar nucleotides, that is, it has one or more sets of genes encoding one or more enzymes responsible for the synthesis of one or more activated glycosyl nucleotides, ready for glycosylation in glycosyl transferase mediated reaction in the cell, when cultured. The sets of genes are either naturally present in the cell or introduced into the cell by means of genetic integration as described in detail above, of the nucleic acid sequences encoding the relevant genes. The biosynthetic production of the activated glycosyl nucleotides by the cell takes place under the action of enzymes involved in the biosynthetic pathway of that respective sugar nucleotide stepwise reaction sequence starting from a carbon source, in the current disclosure the sole carbon source is sucrose (for a review for monosaccharide metabolism see e.g. H. H. Freeze and A. D. Elbein: Chapter 4: *Glycosylation precursors*, in: Essentials of Glycobiology, $2^{nd}$ edition (Eds. A. Varki et al.), Cold Spring Harbour Laboratory Press (2009)).

It should be emphasized, that cellular biosynthetic production of the activated sugar nucleotides by the genetically modified cell via its own biosynthetic pathway is advantageous compared to in vitro versions of transfer glycosylation, as it avoids using the very expensive sugar nucleotide type donors added exogenously, hence the donors are formed by the cell in situ and the phosphatidyl nucleoside leaving groups are recycled in the cell.

According, to the invention, extracellular or periplasmic sucrose may enter the cell with the aid of a general sugar permease, or it may be diffused into the periplasm from the extracellular medium, or it may be located close to the cell in the extracellular medium, where, according to the invention, the sucrose is hydrolysed by the invertase to glucose and fructose, followed by uptake of glucose and fructose through respective permeases and/or phosphorylation of the glucose and/or fructose, making then activated sugars, thus enabling their use in cellular metabolism and glycolysis, thus allowing sucrose to act as sole carbon and sole energy source of the genetically modified cell.

Colanic Acid Gene Cluster

For the production of fucosylated HMO's the colanic acid gene cluster is important to ensure presence of sufficient GDP-fucose. In *Escherichia coli* GDP-fucose is an intermediate in the production of the extracellular polysaccharide colanic acid, a major oligosaccharide of the bacterial cell wall. In the context of the present invention the colanic acid gene cluster encodes the enzymes involved in the de novo synthesis of GDP-fucose (gmd, wcaG, wcaH, wcaI, manB, manC), whereas one or several of the genes downstream of GDP-L-fucose, such as wcaJ, can be deleted to prevent conversion of GDP-fucose to colanic acid.

The colanic acid gene cluster responsible for the formation of GDP-fucose comprises or consists of the genes: gmd which encodes the protein GDP-mannose-4,6-dehydratase; wcaG (fcl) which encodes the protein GDP-L-fucose synthase; wcaH which encodes the protein GDP-mannose mannosyl hydrolase; wcaI which encodes the colanic acid biosynthesis glycosyltransferase, manB which encodes the protein phosphomannomutase and manC which encodes the protein mannose-1-phosphate guanylyltransferase.

In one or more exemplary embodiment(s), the colanic acid gene cluster responsible for the formation of GDP-fucose may be expressed from its native genomic locus. The expression may be actively modulated to increase GDP-fucose formation. The expression can be modulated by swapping the native promoter with a promoter of interest, and/or increasing the copy number of the colanic acid genes coding said protein(s) by expressing the gene cluster from another genomic locus than the native, or episomally expressing the colanic acid gene cluster or specific genes thereof.

In relation to the present disclosure, the term "native genomic locus", in relation to the colanic acid gene cluster, relates to the original and natural position of the gene cluster in the genome of the genetically engineered cell.

Sialic Acid Catabolic and Biosynthetic Pathways

In some embodiments, the genetically modified cell, contains a deficient sialic acid catabolic pathway. By "sialic acid catabolic pathway" is meant a sequence of reactions, usually controlled and catalyzed by enzymes, which results in the degradation of sialic acid. An exemplary sialic acid catabolic pathway described herein is the *E. coli* pathway. In this pathway, sialic acid (Neu5Ac; N-acetylneuraminic acid) is degraded by the enzymes NanA (N-acetylneuraminic acid lyase) and NanK (N-acetylmannosamine kinase) and NanE (N-acetylmannosamine-6-phosphate epimerase), all encoded from the nanATEK-yhcH operon, and repressed by NanR (http://ecocyc.org/ECOLI). A deficient sialic acid catabolic pathway is rendered in the *E. coli* host by introducing a mutation in the endogenous nanA (N-acetylneuraminate lyase) (e.g., GenBank Accession Number D00067.1(GI:216588)) and/or nanK (N-acetylmannosamine kinase) (e.g., GenBank Accession Number (amino acid) BAE77265.1 (GI:85676015)), and/or nanE (N-acetylmannosamine-6-phosphate epimerase, GI: 947745, incorporated herein by reference). Optionally, the nanT (N-acetylneuraminate transporter) gene is also inactivated or mutated. Other intermediates of sialic acid metabolism include: (ManNAc-6-P)N-acetylmannosamine-6-phosphate; (GlcNAc-6-P)N-acetylglucosamine-6-phosphate; (GlcN-6-P) Glucosamine-6-phosphate, and (Fruc-6-P) Fructose-6-phosphate. In some preferred embodiments, nanA is mutated. In other preferred embodiments, nanA and nanK are mutated, while nanE remains functional. In another preferred embodiment, nanA and nanE are mutated, while nanK has not been mutated, inactivated or deleted. A mutation is one or more changes in the nucleic acid sequence coding the gene product of nanA, nanK, nanE, and/or nanT. For example, the mutation may be 1, 2, up to 5, up to 10, up to 25, up to 50 or up to 100 changes in the nucleic acid sequence. For example, the nanA, nanK, nanE, and/or nanT genes are mutated by a null mutation. Null mutations as described herein encompass amino acid substitutions, additions, deletions, or insertions, which either cause a loss of function of the enzyme (i.e. reduced or no activity) or loss of the enzyme (i.e. no gene product). By "deleted" is meant that the coding region is removed completely or in part such that no (functional) gene product is produced. By inactivated is meant that the coding sequence has been altered such that the resulting gene product is functionally inactive or encodes for a gene product with less than 100%, e.g. 90%, 80%, 70%, 60%, 50%, 40%, 30% or 20% of the activity of the native, naturally occurring, endogenous gene product. A "not mutated" gene or protein does not differ from a native, naturally-occurring, or endogenous coding sequence by 1, 2, up to 5, up to 10, up to 20, up to 50, up to 100, up to 200 or up to 500 or more codons, or to the corresponding encoded amino acid sequence.

Furthermore, the bacterium (e.g., *E. coli*) may also comprise a sialic acid synthetic capability. For example, the bacterium comprises a sialic acid synthetic capability through provision of an exogenous UDP-GlcNAc 2-epimerase (e.g., neuC of *Campylobacter jejuni* (GenBank AAK91727.1) or equivalent (e.g. (GenBank CAR04561.1)), a Neu5Ac synthase (e.g., neuB of *C. jejuni* (GenBank AAK91726.1) or equivalent, (e.g. *Flavobacterium limnosediminis* sialic acid synthase, GenBank WP_023580510.1), and/or a CMP-Neu5Ac synthetase (e.g., neuA of *C. jejuni*(GenBank AAK91728.1) or equivalent, (e.g. *Vibrio brasiliensis* CMP-sialic acid synthase, GenBank WP_006881452.1).

MFS Transporters

Biosynthetic products may vary in size and ability to diffuse across the production cell wall once it is formed. In particular larger products may benefit from the presence of an active transporter being expressed in the genetically modified cell to facilitate the export of the produced bioproduct.

By the term "Major Facilitator Superfamily (MFS)" is meant a large and exceptionally diverse family of the secondary active transporter class, which is responsible for transporting a range of different substrates, including sugars, drugs, hydrophobic molecules, peptides, organic ions, etc., across the cellular membrane(s).

Thus, in one or more exemplary embodiments, the genetically engineered cell according to the method described herein further comprises a gene product that acts as a MFS transporter. The gene product that acts as a MFS transporter may be encoded by a recombinant nucleic acid sequence that is expressed in the genetically engineered cell. The recombinant nucleic acid sequence encoding a MFS transporter, may be integrated into the genome of the genetically engineered cell.

In a preferred embodiment of the invention the MFS transporter facilitates transport of an oligosaccharide, preferably, an HMO, through the cell membrane, preferably transport of an HMO/oligosaccharide synthesized by the genetically engineered cell as described herein from the cell cytosol to the cell medium. Additionally, or alternatively, the MFS transporter may also facilitate efflux of molecules that are not considered HMO or oligosaccharides, such as lactose, glucose, cell metabolites and/or toxins.

In one or more exemplary embodiments, the MFS transporter protein is selected from the group consisting of Bad, Nec, YberC, Fred, Vag and Marc.

The MFS transporter protein identified herein as "Bad protein" or "Bad transporter" or "Bad", interchangeably, has the amino acid sequence of SEQ ID NO: 59; The amino acid sequence identified herein as SEQ ID NO: 59 is an amino acid sequence that has 100% identity with the amino acid sequence having the GenBank accession ID WP_017489914.1.

In one or more exemplary embodiments, the MFS transport protein is Bad.

The MFS transporter protein having the amino acid sequence of SEQ ID NO: 60 is identified herein as "Nec protein" or "Nec transporter" or "Nec", interchangeably; a nucleic acid sequence encoding nec protein is identified herein as "Nec coding nucleic acid/DNA" or "nec gene" or "nec"; The amino acid sequence identified herein as SEQ ID NO: 60 is the amino acid sequence that is 100% identical to the amino acid sequence having the GenBank accession ID WP_092672081.1.

In one or more exemplary embodiments, the MFS transport protein is Nec. In a further embodiment the MFS transporter has the amino acid sequence of SEQ ID NO: 4 or is a functional homologue having an amino acid sequence which is at least 70% identical, such as at least 80% identical, such as at least 85% identical, such as at least 90% identical, such as at least 95% identical or such as at least 99% identical to any one of SEQ ID NO: 60.

In one or more exemplary embodiments, the MFS transport protein is Nec.

The MFS transporter protein having the amino acid sequence of SEQ ID NO: 61 is identified herein as "YberC protein" or "YberC transporter" or "YberC", interchangeably; a nucleic acid sequence encoding yberC protein is identified herein as "YberC coding nucleic acid/DNA" or "yberC gene" or "yberC"; The amino acid sequence identified herein as SEQ ID NO: 61 is the amino acid sequence that is 100% identical to the amino acid sequence having the GenBank accession ID EEQ08298.1.

In one or more exemplary embodiments, the MFS transport protein is YberC. In a further embodiment the MFS transporter has the amino acid sequence of SEQ ID NO: 61 or is a functional homologue having an amino acid sequence which is at least 70% identical, such as at least 80% identical, such as at least 85% identical, such as at least 90% identical, such as at least 95% identical or such as at least 99% identical to any one of SEQ ID NO: 61.

In one or more exemplary embodiments, the MFS transport protein is YberC.

The MFS transporter protein having the amino acid sequence of SEQ ID NO: 62 is identified herein as "Fred protein" or "Fred transporter" or "Fred", interchangeably; a nucleic acid sequence encoding fred protein is identified herein as "Fred coding nucleic acid/DNA" or "fred gene" or "fred"; The amino acid sequence identified herein as SEQ ID NO: 62 is the amino acid sequence that is 100% identical to the amino acid sequence having the GenBank accession ID WP_087817556.1.

In one or more exemplary embodiments, the MFS transport protein is Fred. In a further embodiment the MFS transporter has the amino acid sequence of SEQ ID NO: 62 or is a functional homologue having an amino acid sequence which is at least 70% identical, such as at least 80% identical, such as at least 85% identical, such as at least 90% identical, such as at least 95% identical or such as at least 99% identical to any one of SEQ ID NO: 62.

In one or more exemplary embodiments, the MFS transport protein is Fred.

The MFS transporter protein having the amino acid sequence of SEQ ID NO: 63 is identified herein as "Vag protein" or "Vag transporter" or "Vag", interchangeably; a nucleic acid sequence encoding vag protein is identified herein as "Vag coding nucleic acid/DNA" or "vag gene" or "vag"; The amino acid sequence identified herein as SEQ ID NO: 63 is the amino acid sequence that is 100% identical to the amino acid sequence having the GenBank accession ID WP_048785139.1.

In one or more exemplary embodiments, the MFS transport protein is vag. In a further embodiment the MFS transporter has the amino acid sequence of SEQ ID NO: 63 or is a functional homologue having an amino acid sequence which is at least 70% identical, such as at least 80% identical, such as at least 85% identical, such as at least 90% identical, such as at least 95% identical or such as at least 99% identical to any one of SEQ ID NO: 63.

In one or more exemplary embodiments, the MFS transport protein is Vag.

The MFS transporter protein having the amino acid sequence of SEQ ID NO: 64 is identified herein as "Marc protein" or "Marc transporter" or "Marc", interchangeably; a nucleic acid sequence encoding marc protein is identified herein as "Marc coding nucleic acid/DNA" or "marc gene" or "Marc"; The amino acid sequence identified herein as SEQ ID NO: 64 is the amino acid sequence that is 100% identical to the amino acid sequence having the GenBank accession ID WP_060448169.1.

In one or more exemplary embodiments, the MFS transport protein is marc. In a further embodiment the MFS transporter has the amino acid sequence of SEQ ID NO: 64 or is a functional homologue having an amino acid sequence which is at least 70% identical, such as at least 80% identical, such as at least 85% identical, such as at least 90% identical, such as at least 95% identical or such as at least 99% identical to any one of SEQ ID NO: 64 In one or more exemplary embodiments, the MFS transport protein is Marc.

A Method for the Biosynthetic Production of One or More HMO(s) or Another Biosynthetic Product The invention relates to the use of a nucleic acid construct, as well as a genetically modified host cell as described above, in a biosynthetic production of one or more HMO(s). The biosynthetic production is characterized in the way that it utilizes a genetically modified cell, wherein the nucleic acid construct is incorporated as described in detail above, into said cell, whereafter the genetically modified cell is capable of utilizing sucrose as the main and/or the sole, carbon source and/or as the main and/or the sole energy source, preferably as main and/or the sole carbon source and/or as the main and/or the sole energy source.

The method for the biosynthetic production of one or more HMO(s) comprises the steps of:
a) providing a heterologous nucleic acid construct according to the invention,
b) integrating or transforming the nucleic acid construct into a cell capable of producing one or more HMO(s);
c) culturing the cell of b) in a suitable cell culture medium, containing sucrose as the sole carbon source, and
d) harvesting the HMO(s) produced in step c).

The heterologous nucleic acid construct of the invention may be incorporated into a cell capable of producing one or more HMO(s) in any suitable method, potentially as described above.

Thus, a preferred embodiment of the invention relates to a method for the biosynthetic production of one or more HMO(s), the method comprising the steps of:
a) providing a genetically modified cell according to the present disclosure,
b) culturing the cell of a) in a suitable cell culture medium, containing sucrose as the sole carbon source, and
c) harvesting the HMO(s) produced in step b).

The method for the biosynthetic production of a biosynthetic product of interest comprising the steps of:
a) providing a heterologous nucleic acid construct according to the invention,
b) integrating or transforming the nucleic acid construct into a cell capable of producing biosynthetic product of interest;
c) culturing the cell of b) in a suitable cell culture medium, containing sucrose as the sole carbon source, and
d) harvesting the biosynthetic product of interest produced in step c).

The heterologous nucleic acid construct of the invention may be incorporated into a cell capable of producing one or more HMO(s) in any suitable method, potentially as described above.

Thus, a preferred embodiment of the invention relates to a method for the biosynthetic production of biosynthetic product of interest, the method comprising the steps of:
a) providing a genetically modified cell with a heterologous polypeptide according to the present disclosure which is also capable of producing the biosynthetic product of interest,
b) culturing the cell of a) in a suitable cell culture medium, containing sucrose as the sole carbon source, and
c) harvesting the biosynthetic product of interest produced in step b).

Culturing

During culturing of the genetically modified cell capable of utilizing sucrose as the main and/or the sole, carbon source and/or as the main and/or the sole energy source and capable of producing one or more HMO(s), according to the invention, the oligosaccharide-producing cell is fed with sucrose that provides energy via glycolysis for growing, reproducing and maintaining its structure. In addition, the sucrose taken up by the cell provides, via the described sucrose catabolism, precursors for the synthesis of the activated sugar nucleotide(s) necessary for the glycosylation process that takes place in the cell, as described above. The internalized carbohydrate acceptor, such as lactose, participates in the glycosyl transferase induced glycosylation reaction, in which a glycosyl residue of an activated nucleotide donor produced by the cell is transferred so that the acceptor is glycosylated. Optionally, when more than one glycosyl transferase is expressed by the cell, additional glycosylation reactions can occur resulting in the formation of the target oligosaccharide. Of course, the cell preferably lacks any enzyme activity which would degrade the oligosaccharide derivatives produced in the cell.

According to the invention, the term "culturing" (or "cultivating" or "cultivation", also termed "fermentation") relates to the propagation of bacterial expression cells in a controlled bioreactor according to methods known in the industry.

According to said method the genetically modified cell, preferably a bacterium, more preferably an *E. coli*, is a strain that is optimized for an industrially profitable transformation like oligosaccharide production, because such a strain generally has no ability to utilize sucrose. Therefore, a polypeptide enabling sucrose utilization should be introduced, using an appropriate expression plasmid or via chromosome integration, converting the sucrose minus cell to a sucrose plus cell as described in detail above.

To produce one or more HMO(s), the HMO-producing microorganism as described herein are cultivated according to the procedures known in the art in the presence of sucrose as a, or the main or the sole carbon and as an, the main or the sole energy source, and the produced HMO is harvested from the cultivation media and the biomass formed during the cultivation process. Thereafter, the HMO(s) are purified according to the procedures known in the art, e.g., such as described in WO2015188834, WO2017182965 or WO2017152918, and the purified HMO(s) are used as nutraceuticals, pharmaceuticals, or for any other purpose, e.g. for research.

Biosynthetic Production

A method of the invention relating to the production of one or more biosynthetic products of interest, in particular the production of one or more HMO(s). A method of the invention also encompasses the manufacturing of the biosynthetic product(s) of interest or HMO(s) in large scale productions. Manufacturing biosynthetic products of interest or HMO(s) is typically accomplished by performing cultivation in larger volumes.

The terms "manufacturing" or "manufacturing scale" or "large-scale production" or "large-scale fermentation", are used interchangeably and in the meaning of the invention defines a fermentation with a minimum volume of 100 L, such as 1000 L, such as 10.000 L, such as 100.000 L, such as 200.000 L culture broth. Usually, a "manufacturing scale" process is defined by being capable of processing large volumes yielding amounts of the HMO product of interest that meet, e.g., in the case of a therapeutic compound or composition, the demands for toxicity tests, clinical trials as well as for market supply. In addition to the large volume, a manufacturing scale method, as opposed to simple lab scale methods like shake flask cultivation, is characterized by the use of the technical system of a bioreactor (fermenter) which is equipped with devices for agitation, aeration, nutrient feeding, monitoring and control of process parameters (pH, temperature, dissolved oxygen tension, back pressure, etc.). To a large extent, the behaviour of an expression system in a lab scale method, such as shake flasks, benchtop bioreactors or the deep well format described in the examples of the disclosure, does allow to predict the behaviour of that system in the complex environment of a bioreactor.

With regard to the suitable cell medium used in the fermentation process, there are no limitations, except that with regard to the invention, the media contains sucrose as the primary carbon and energy source.

Harvesting

The term "harvesting" in the context in the invention relates to collecting the produced HMO(s) following the termination of fermentation. In different embodiments it may include collecting the HMO(s) included in both the biomass (i.e., the genetically modified cells) and cultivation media, i.e., before/without separation of the fermentation broth from the biomass. In other embodiments the produced HMO(s) may be collected separately from the biomass and fermentation broth, i.e., after/following the separation of biomass from cultivation media (i.e., fermentation broth). The separation of cells from the medium can be carried out with any of the methods well known to the skilled person in the art, such as any suitable type of centrifugation or filtration. The separation of cells from the medium can follow immediately after harvesting the fermentation broth or be carried out at a later stage after storing the fermentation broth at appropriate conditions. Recovery of the produced HMO(s) from the remaining biomass (or total fermentation) include extraction thereof from the biomass (the production cells). It can be done by any suitable methods of the art, e.g., by sonication, boiling, homogenization, enzymatic lysis using lysozyme, or freezing and grinding.

After recovery from fermentation, HMO(s) are available for further processing and purification.

Purification of HMO(s) produced by fermentation can be done using a suitable procedure described in WO2016/095924, WO2015/188834, WO2017/152918, WO2017/182965, US2019/0119314.

Use of a Sucrose Hydrolysing Enzyme In Vitro

Preparation of sugars that are suitable for fermentation-based manufacturing is currently costly and inefficient, as described above. Sucrose is a cost-efficient alternative to other sugars due to its high abundancy and simple handling. Sucrose is easier prepared for fermentation than for instance glucose, also as described above. Nevertheless, many production cells used in manufacturing are incapable of utilizing sucrose as carbon and energy source sufficiently well, if at all. Thus, one aspect of the invention relates to the use of the invertases of the invention, namely Bff and SacC_Agal, in the preparation of glucose and fructose from sucrose.

Thus, one embodiment of the invention relates to the use of a polypeptide of any one of SEQ ID NOs: 1 or 2 [SacC Agal or Bff], or a functional homologue of any one of SEQ ID NOs: 1 or 2, having an amino acid sequence which is more than 70% identical to any one of SEQ ID NO: 1 or 2, in the production and/or manufacturing of glucose and/or fructose. Another embodiment of the invention relates to the use of a polypeptide of any one of SEQ ID NOs: 1 or 2 [SacC Agal or Bff], or a functional homologue of any one of SEQ ID NOs: or 2, having an amino acid sequence which is more than 70%, such as at least 80%, such as at least 85%, such as at least 90%, such as at least 95% or such as at least 99% identical to any one of SEQ ID NO: 1 or 2, in the production of glucose and fructose.

Another embodiment of the invention relates to a method for obtaining glucose and/or fructose from sucrose, the method comprising,
a) reacting sucrose with a polypeptide of any one of SEQ ID NOs: 1 or 2 [SacC Agal and Bff], or a functional homologue of any one of SEQ ID NOs: 1 or 2, having an amino acid sequence which is more than 70%, such as at least 80%, such as at least 85%, such as at least 90%, such as at least 95% or such as at least 99% identical to any one of SEQ ID NO: 1 or 2,
b) extracting said polypeptide from the reaction composition after completion of the reaction, and
c) extracting and/or purifying glucose and/or fructose from the reaction composition.

SEQUENCE ID'S

The current application contains a sequence listing in text format and electronical format which is hereby incorporated by reference as are the sequences listed in the corrected sequence list in the priority application DK PA 2021 70248. And DK PA 2022 70138 Below is a summary of the sequences that are not represented in table 1 or 6.
SEQ ID NO: 1 [SacC_Agal, invertase protein]
SEQ ID NO: 2 [Bff, invertase protein]
SEQ ID NO: 3 [SacC_Agal, DNA encoding an invertase]
SEQ ID NO: 4 [Bff DNA encoding an invertase]
SEQUENCE ID NO 55 [lgtA protein—β-1,3-N-acetyl-glucosaminyltransferase]
SEQUENCE ID NO 56 [galT—beta-1,4-galactosyltransferase]
SEQUENCE ID NO 57 [galTK—β-1,3-galactosyltransferase]
SEQUENCE ID NO 58 [smob—α-1,2-fucosyltransferase]
SEQ ID NO: 59 [Bad, MFS transporter]
SEQ ID NO: 60 [Nec, MFS transporter]

SEQ ID NO: 61 [YberC, MFS transporter]
SEQ ID NO: 62 [Fred, MFS transporter]
SEQ ID NO: 63 [Vag, MFS transporter]
SEQ ID NO: 64 [Marc, MFS transporter]
SEQ ID NO: 65 [ScrY, poin in scr PEP-PTS system]
SEQ ID NO: 66 [ScrA, sucrose transport protein Enzyme IIScr in scr PEP-PTS system]
SEQ ID NO: 67 [ScrB invertase in scr PEP-PTS system]
SEQ ID NO: 68 [ScrR repressor protein in in scr PEP-PTS system]

General

It should be understood that any feature and/or aspect discussed above in connection with the described invention apply by analogy to the methods described herein.

The terms Lacto-N-triose, LNT-II, LNT II, LNT2 and LNT 2, are used interchangeably.

The terms nucleic acid sequence and nucleotide sequence are used interchangeably.

The following figures and examples are provided below to illustrate the present disclosure. They are intended to be illustrative and are not to be construed as limiting in any way.

Items

1. A genetically modified cell which comprises a heterologous nucleic acid sequence encoding a heterologous enzyme which on its own is capable of hydrolysing sucrose into fructose and glucose on the extracellular side and/or in the periplasmic space of the genetically modified cell, and wherein the expression of said enzyme is sufficient to enable utilization of sucrose as carbon and/or as energy source of said genetically modified cell.

2. The genetically modified cell according to item 1, wherein the enzyme is located in the periplasm or in the extracellular space of the cell.

3. The genetically modified cell according to item 1 or 2, wherein the enzyme is anchored, embedded and/or attached either at the periplasmic, the extracellular and/or the cytosolic side of the plasma membrane.

4. The genetically modified cell according to item 1 or 2, wherein the enzyme is soluble.

5. The genetically modified cell according to any one of items 1 to 4, wherein the cell is capable of producing one or more human milk oligosaccharide(s) (HMO(s)).

6. The genetically modified cell according to any of the preceding items, wherein the heterologous enzyme is capable of hydrolysing non-phosphorylated sucrose.

7. The genetically modified cell according to any of the preceding items, wherein the heterologous enzyme is an invertase.

8. The genetically modified cell according to item 7, wherein the invertase is not encoded by scrB or cscA.

9. The genetically modified cell according to any of the preceding items, wherein the heterologous nucleic acid sequence encodes an episomal and/or genomically integrated copy of a heterologous enzyme capable of hydrolysing sucrose into fructose and glucose.

10. The genetically modified cell according to item 9, wherein a single genomically integrated copy of the heterologous nucleic acid sequence encoding the enzyme is capable of hydrolysing sucrose into fructose and glucose.

11. The genetically modified cell according to any of the preceding items, wherein the expression of said enzyme enables utilization of sucrose as the main and/or the sole carbon source and/or as the main and/or the sole energy source of said genetically modified cell.

12. The genetically modified cell according to any one of the preceding items, wherein the heterologous enzyme does not transport sucrose.

13. The genetically modified cell according to any one of the preceding items, wherein the cell does not contain a complete sucrose utilization system.

14. The genetically modified cell according to any one of the preceding items, wherein the cell was not capable of sustaining growth on sucrose prior to the addition of the heterologous enzyme.

15. The genetically modified cell according to any of the preceding items, wherein the heterologous nucleic acid sequence encodes an enzyme of SEQ ID NOs: 1 or 2 [SacC Agal or Bff], or a functional homologue of any one of SEQ ID NOs: 1 or 2, having an amino acid sequence which is more than 70% identical to any one of SEQ ID NO: 1 or 2.

16. The genetically modified cell according to any of the preceding items, wherein the encoded enzyme is glycoside hydrolase family 32 protein from *Avibacterium gallinarum*, as shown in SEQ ID NO: 1 [SacC Agal], or a functional homologue thereof, having an amino acid sequence which is at least 80% identical to SEQ ID NO: 1.

17. The genetically modified cell according to any of the preceding items, wherein the encoded enzyme is beta-fructofuranosidase protein from *Arthrobacter globiformis* IFO 3062, as shown in SEQ ID NOs: 2 [Bff], or a functional homologue thereof, having an amino acid sequence which is at least 80% identical to SEQ ID NO: 2.

18. The genetically modified cell according to item 16 or 17, wherein at least two copies of the nucleic acid sequence encoding the enzyme is present in the genome of the cell.

19. The genetically modified cell according to any of the preceding items, wherein the heterologous nucleic acid sequence further comprises one or more regulatory element(s) for regulating the expression of the heterologous nucleic acid sequence.

20. The genetically modified cell according to item 19, wherein the regulatory element(s) regulate(s) the expression of the specific heterologous enzyme selected from one of the amino acid sequences shown in SEQ ID NOs: 1 or 2, or a functional homologue of any one of SEQ ID NOs: 1 or 2, having an amino acid sequence which is more than 80% identical to any one of SEQ ID NO: 1 or 2.

21. The genetically modified cell according to any one of items 19 or 20, wherein the regulatory element comprises one or more inducible promoter sequence(s) and/or one or more constitutive promoter sequence(s).

22. The genetically modified cell according to any one of items 19-21, wherein the regulatory element comprises an inducible promoter.

23. The genetically modified cell according any one of items 19-22, wherein the regulatory element is selected from the group consisting of PBAD, Ptet, Pxyl, Plac, PsacB, PxylA, PrpR, PnitA, PT7, Ptac, PL, PR, PnisA, Pb, PgatY_70UTR, PglpF, PglpF_SD1, PglpF_SD10, PglpF_SD2, PglpF_SD3, PglpF_SD4, PglpF_SD5, PglpF_SD6, PglpF_SD7, PglpF_SD8, PglpF_SD9, Plac_16UTR, Plac, PmglB_70UTR and PmglB_70UTR_SD4.

24. The genetically modified cell according any one of items 19-22, wherein the regulatory element is a promoter selected from the group consisting of a PglpF (SEQ ID NO: 42) or Plac (SEQ ID NO: 51) or PmglB_UTR70 (SEQ ID NO: 38) or PglpA_70UTR (SEQ ID NO: 39) or PglpT_70UTR (SEQ ID NO: 40) or PgatY (SEQ ID NO: 41) or variants of these promoters as identified in Table 6.

25. The genetically modified cell according any one of items 19-23, wherein the regulatory element is selected from the group consisting of PmglB_70UTR_SD8, PmglB_70UTR_SD10, PmglB_54UTR, Plac_70UTR, PmglB_70UTR_SD9, PmglB_70UTR_SD4, PmglB_70UTR_SD5, PglpF_SD4, PmglB_70UTR_SD7, PmglB_70UTR, PglpA_70UTR and PglpT 70UTR.

26. The genetically modified cell according any one of items 19-23, wherein the regulatory element is a strong promoter selected from the group consisting of PmglB_70UTR_SD8, PmglB_70UTR_SD10, PmglB_54UTR, Plac_70UTR, PmglB_70UTR_SD9, PmglB_70UTR_SD4, PmglB_70UTR_SD5, PglpF_SD4, PmglB_70UTR_SD7, PmglB_70UTR, PglpA_70UTR, PglpT_70UTR, pgatY_70UTR, PglpF, PglpF_SD10, PglpF_SD5, PglpF_SD8, PgatY and PmglB_16UTR.

27. The genetically modified cell according to item 23, wherein the regulatory element is a PglpF promoter or a variant thereof.

28. The genetically modified cell according to any one of items 19-27, wherein the regulatory element comprises a constitutive promoter.

29. A genetically modified cell according to item 28, wherein the constitutive promoter is selected from the group consisting of CP6, PosmY, Pspc, Pbla, Prrn1 and Prrn2.

30. The genetically modified cell according to any one of the preceding items, wherein said heterologous nucleic acid sequence comprises a nucleic acid sequence encoding a signal peptide capable of enhancing the continuous secretion of said heterologous enzyme into the periplasm of the genetically modified cell and/or into the fermentation medium.

31. The genetically modified cell according to item 30, wherein the signal peptide is SEQ ID NO: 28.

32. The genetically modified cell according to any one of the preceding items, wherein the genetically modified cell has a limited glucose uptake.

33. The genetically modified cell according to item 32, wherein said cell does not contain a functional ptsG gene.

34. The genetically modified cell according to any one of the preceding items, wherein the cell further comprises a heterologous nucleic acid sequence encoding a major facilitator superfamily (MFS) transporter.

35. The genetically modified cell according to item 34, wherein the MFS transporter is selected from the group consisting of
   a) A heterologous nucleic acid sequence encoding the amino acid sequence of SEQ ID NO: 60 or a functional homologue thereof having an amino acid sequence which is at least 70% identical to SEQ ID NO:60,
   b) A heterologous nucleic acid sequence encoding the amino acid sequence of SEQ ID NO: 61 or a functional homologue thereof having an amino acid sequence which is at least 70% identical to SEQ ID NO: 61,
   c) A heterologous nucleic acid sequence encoding the amino acid sequence of SEQ ID NO: 59 or a functional homologue thereof having an amino acid sequence which is at least 70% identical to SEQ ID NO: 59,
   d) A heterologous nucleic acid sequence encoding the amino acid sequence of SEQ ID NO: 62 or a functional homologue thereof having an amino acid sequence which is at least 70% identical to SEQ ID NO: 62,
   e) A heterologous nucleic acid sequence encoding the amino acid sequence of SEQ ID NO: 63 or a functional homologue thereof having an amino acid sequence which is at least 70% identical to SEQ ID NO: 63, and
   f) A heterologous nucleic acid sequence encoding the amino acid sequence of SEQ ID NO: 64 or a functional homologue thereof having an amino acid sequence which is at least 70% identical to SEQ ID NO: 64.

36. The genetically modified cell according to any one of the preceding items, wherein the genetically modified cell is a single-celled organism.

37. The genetically modified cell according to any one of the preceding items, wherein the genetically modified cell is a prokaryotic or a eukaryotic cell.

38. The genetically modified cell according to any one of the preceding items, wherein the genetically modified cell is selected from the group consisting of *Escherichia coli* and *Bacillus subtilis*.

39. The genetically modified cell according to any one of the preceding items, wherein the genetically modified cell is selected from the group consisting of *Saccharomyces cerevisiae*, *Pichia pastoris* and *Yarrowia lipolytica*.

40. A nucleic acid construct comprising,
   a) a nucleic acid sequence encoding a heterologous enzyme which on its own is capable of hydrolysing sucrose into fructose and glucose on the extracellular side and/or in the periplasmic space of the genetically modified cell, and
   b) a nucleic acid sequence comprising regulatory element(s), capable of modulating the expression of said nucleic acid sequence, and optionally
   c) a nuclei acid sequence encoding a signal peptide enabling the continuous secretion of said polypeptide into the periplasm of the genetically modified cell and/or into the fermentation media.

41. The nucleic acid construct according to item 40, wherein the regulatory is a promoter selected from the group consisting of a PglpF (SEQ ID NO: 42) or Plac (SEQ ID NO: 51) or PmglB_UTR70 (SEQ ID NO: 38) or PglpA_70UTR (SEQ ID NO: 39) or PglpT_70UTR (SEQ ID NO: 40) or PgatY (SEQ ID NO: 41) or variants of these promoters as identified in Table 6.

42. The nucleic acid construct according to item 40 or 41, wherein the signal peptide is selected from table 1.

43. The nucleic acid construct according to item 42, wherein the signal peptide is SEQ ID NO: 28

44. Use of a genetically modified cell according to any one of items 1-39 or the nucleic acid construct according to any one of items 40 to 43, for biosynthetic production.

45. The use of a genetically modified cell according to 44 or the nucleic acid construct according to any one of items 40 to 43, for the biosynthetic production of one or more HMO(s).

46. A method for the biosynthetic production of one or more HMO(s), the method comprising the steps of:
   a) providing a genetically modified cell according to any of items 1-39,
   b) culturing the cell of (a) in a suitable cell culture medium, containing sucrose as a carbon source,
   c) harvesting the HMO(s) produced in step (b).

47. The method for the biosynthetic production of one or more HMO(s) according to item 46, wherein the sucrose in step b) is the main and/or sole carbon source and/or energy source.

48. A method for biosynthetic production in a genetically modified host cell capable of producing a desired biosynthetic product, the method comprising the steps of:
   a) providing a non-sucrose-utilizing (Suc⁻) host cell or a host cell with limited and/or inefficiently ability to utilize sucrose capable of producing the desired biosynthetic product, b) introducing into said host cell a heterologous nucleic acid sequence encoding a heterologous enzyme which on its own is capable of hydrolysing sucrose into fructose and glucose on the extracellular side and/or in the periplasmic space of the genetically modified cell, and wherein the expression of said enzyme is sufficient to enable utilization of sucrose as carbon and/or as energy source of said genetically modified cell, c) culturing the cell of (b) in a suitable cell culture medium, containing sucrose as a carbon source, d) harvesting the biosynthetic product produced in step c).

49. A method according to item 48, wherein the culture medium contains sucrose as the main and/or the sole, carbon source and/or as an, the main and/or the sole energy source.

EXAMPLES

Example 1—the Introduction of a Single Gene, sacC_Agal or Bff, in the *E. coli* DH1 K12 Strain Confers the Ability to Grow on Sucrose as the Sole Carbon and Energy Source Description of the Genotype of Strains MP1, MP2, MP3, MP4, MP5 and MP6 Tested in Growth Monitoring Assays As background strains for the strains the bacterial strain MDO, was used. MDO is constructed from *Escherichia coli* K-12 DH1. The *E. coli* K-12 DH1 genotype is: F⁻, λ–, gyrA96, recA1, re/A1, endA1, thi-1, hsdR17, supE44. In addition to the *E. coli* K-12 DH1 genotype MDO has the following modifications: lacZ: deletion of 1.5 kbp, lacA: deletion of 0.5 kbp, nanKETA: deletion of 3.3 kbp, me/A: deletion of 0.9 kbp, wcaJ: deletion of 0.5 kbp, mdoH: deletion of 0.5 kbp, and insertion of Plac promoter upstream of the gmd gene (WO2019/123324A1, the modifications summarised in Table 3 below).

Based on the platform strain ("MDO", MP1), were made to obtain the fully chromosomal strains MP2, MP3, MP4, MP5 and MP6.

The strain MP2 can produce the tetrasaccharide HMO, LNnT, while the other strains do not form a product of biotechnological interest. The strain MP2 bears the genes that are responsible for the biosynthesis of LNnT, namely lgtA (encoding a beta-1,3-N-acetyloglucosamine transferase) from *N. meningitidis* and galT (encoding a beta-1,4-galactosyltransferase) from *H. pylori*, as well as 4 additional genes conferring the ability to grow on sucrose as the sole carbon and energy source. These 4 genes are organized in 2 operons, scrBR and scrYA, which are controlled by a wild-type sucrose promoter (Pscr) and a synthetic dual promoter (PglpF_SD1-Pscr), respectively.

As mentioned above, the strains MP3, MP4, MP5 and MP6 neither produce an HMO or any other high-value product nor express the scrBR and scrYA operons. Instead, each of these strains bears a single genomic copy of a gene encoding a sucrose hydrolase or invertase, whose expression is driven by the synthetic inducible promoter PglpF. Specifically, the strain MP3 expresses a single PglpF-driven copy of the sacC_Msuc gene (*Mannheimia succiniciproducens*, WO2009078687A2, and NCBI Accession Nr. AAU37516.1); the strain MP4 expresses a single PglpF-driven copy of the sacA_Bsub gene (*Bacillus subtilis*, WO2009078687A2; and NCBI Accession Nr. WP_010886636.1); the strain MP5 expresses a single PglpF-driven copy of the sacC_Agal gene (*Avibacterium gallinarum*) and the strain MP6 expresses a single PglpF-driven copy of the bff gene (*Arthrobacter globiformis* IFO 3062).

In the present Example, it is demonstrated how the genomic integration of a single gene, sacC_Agal or bff, in the *E. coli* DH1 K12 strain confers the ability to grow on sucrose as the main and/or the sole carbon and as the main and/or the sole energy source. The present disclosure also demonstrates that the expression of one of these two genes in the *E. coli* host can be advantageously used as a strain engineering tool for producing strains that are capable of utilizing different carbon and energy sources, also commonly referred to as flexi-fuel strains, with a presumably improved overall cellular physiology, which results from the possibly lower metabolic burden that the bff- or sacC_Agal-expressing cells experience compared to cells being equipped with other sucrose utilization systems, such as the ScrBR-ScrYA system (SEQ ID NO: 65 to 68).

TABLE 3

Genotypes of the strains MP1, MP2, MP3, MP4, MP5 and MP6

| Strain ID | Genotype | Protein Sequence ID (GenBank) or sequence and SEQ ID NO: in seq listing |
|---|---|---|
| MP1/MDO | F-λ-ΔendA1 ΔrecA1 ΔrelA1 ΔgyrA96 Δthi-1 glnV44 hsdR17(rK-mK-) ΔlacZ wcaF::Plac ΔnanKETA ΔlacA ΔmelA ΔwcaJ ΔmdoH | n.a. |
| MP2 | MDO, x2 GlcNAcT** x1 GalT***, x1 scrBR, x1 scrYA | WP_033911473.1 ** WP_001262061.1*** WP_000056853.1 (ScrB), WP_000851062.1 (ScrR), CAA40657.1 (ScrY) CAA40658.1 (ScrA) |
| MP3 | MDO, x1 PglpF-sacC_Msuc | AAU37516.1 |
| MP4 | MDO, x1 PglpF-sacA_Bsub | WP 010886636.1 |
| MP5 | MDO, x1 PglpF-sacC_Agal | WP_103853210.1 |
| MP6 | MDO, x1 PglpF-bff | BAD18121.1 |

** GlcNAcT: beta-1,3-N-acetyloglucosamine transferase
***GalT: beta-1,4-galactosyltransferase Description of the Protocol Applied During Growth Monitoring Assays The strains disclosed in the present example were screened in 96 well microtiter plates using a 4-day protocol. During the first 24 hours, cells were grown to high densities while in the next 72 hours cells were transferred to a medium containing sucrose as the sole carbon and energy source. Specifically, during day 1, fresh inoculums were prepared using a Luria-Bertani broth containing 20% glucose. After 24 hours of incubation of the prepared cultures at 34° C., cells were transferred to a basal minimal medium (200 uL) supplemented with magnesium sulphate and thiamine to which an initial bolus of 20% glucose solution and 15 g/L sucrose solution as carbon source was provided to the cells. After inoculation of the new medium, cells were shaken at 1200 rpm at 28° C. for 72 hours. The cells were grown in a batch mode of cultivation in microtiter plates that were compatible with the Varioskan LUX Multimode Microplate Reader from ThermoFisher Scientific.

Results of the Growth Monitoring Assays

Strains were tested in growth monitoring assays using the 72-hour protocol described above, with the cultures being operated at the batch mode in the presence of sucrose. To evaluate the ability of different strains to grow on sucrose as a function of their genetic makeup (i.e., expression of different proteins associated with distinct sucrose utilization systems), the raw data on culture absorbance (in 600 nm), reported by the Varioskan LUX system, was used to inspect the growth curves on sucrose for the strains tested. The data analysis software SkanIt was used to extract all these growth curves.

Figure 2:
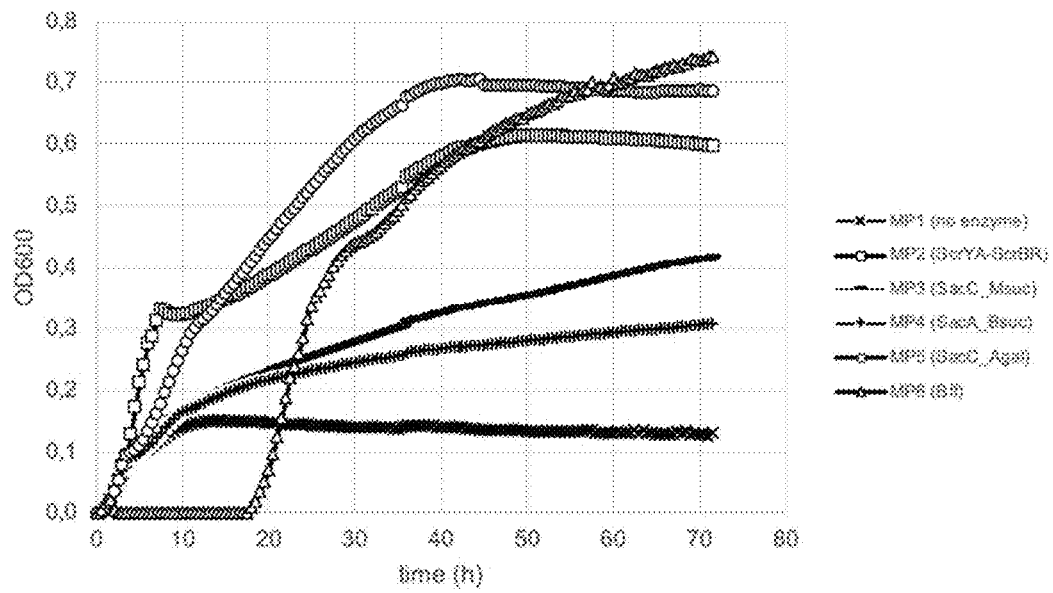

As shown in FIG. 2, the E. coli host (strain MDO, MP1), which does not express an invertase or sucrose hydrolase is expectedly unable to grow on sucrose (i.e., the strain MP1 serves as a negative control for the experiment). As expected by results presented in WO2009/078687A2, the expression of the SacA_Bsub and SacC_Msuc sucrose hydrolase enzymes makes the MDO strain capable of utilizing sucrose as the sole carbon and energy source (i.e., the strains MP3 and MP4 serve as positive controls for the experiment). The same is true for cells expressing the complex sucrose utilization system consisting of 4 proteins, namely ScrB, ScrR, ScrY and ScrA (WO2015/197082) (i.e., the strain MP2 serves also as a positive control for the experiment).

As it is shown in FIG. 2, the enzymes of the present disclosure, SacA Agal and Bff, make the MDO strain capable of utilizing sucrose as well, but each of them shows a characteristic growth profile that is much different from each other but also from the ones generated by strains expressing the sucrose hydrolases mentioned above (MP3 and MP4). Specifically, MDO cells expressing a single genomic copy of the bff gene (strain MP6) show a long lag phase, the end of which is followed by a rapid growth on sucrose leading to a high optical density. On the other hand, MDO cells expressing the sacC_Agal gene from a single genomic copy (strain MP5) reach a high optical density very quickly compared to the other three engineered strains, i.e., MP2, MP3, MP4 or MP6 (FIG. 2).

The fact that cells expressing the SacC_Agal (or Bff) enzyme can outcompete previously known extracellular sucrose hydrolases is surprising and highlights the strength of the present disclosure. Moreover, it is noteworthy that the sequence identity shared among the previously described extracellular sucrose hydrolases SacA_Bsub and SacC_Msuc (WO2009/078687A2 and NCBI accession nr's), the intracellular sucrose hydrolase ScrB (WO2015/197082 and NCBI accession Nr WP_000056853.1 and AAU37516.1, respectively) and the SacC_Agal and Bff enzymes of the present disclosure is low as shown in table 4 below. Only SacC_Agal and SacC_Msuc enzymes seem to share a bit higher sequence identity, which reaches levels of just below 70% (Table 4).

TABLE 4

Sequence identity shared among sucrose hydrolases associated with different sucrose utilization systems, using Emboss-Needle default settings.

| seq ID, % | SacA_Bsub | SacC_Msuc | SacC_Agal | Bff | ScrB |
|---|---|---|---|---|---|
| SacC_Agal | 33.6% | 66.5% | 100% | 12.3% | 30.8% |
| Bff | 12.7% | 12.1% | 12.3% | 100% | 9.2% |

Example 2—the SacC Agal Sucrose Utilization Technology can Replace the Multi-Gene Sucrose Utilization System ScrBRYA Description of the Genotype of Strains MP2, MP5, MP7 and MP8 Tested in Growth Monitoring Assays Based on the previously reported platform strain ("MDO", MP1), the modifications summarised in Table 5 below, were made to obtain the fully chromosomal strains MP2, MP5, MP7 and MP8.

The strain MP2 can produce the tetrasaccharide HMO LNnT, while the other strains do not form a product of biotechnological interest. The strain MP2 bears the genes that are responsible for the biosynthesis of LNnT, namely lgtA (encoding a beta-1,3-N-acetyloglucosamine transferase) from N. meningitidis and galT (encoding a beta-1,4-galactosyltransferase) from H. pylori, as well as 4 additional genes conferring the ability to grow on sucrose as the sole carbon and energy source. These 4 genes are organized in 2 operons, scrBR and scrYA, which are controlled by a wild-type sucrose promoter (Pscr) and a synthetic dual promoter (PglpF_SD1-Pscr), respectively.

As mentioned above, the strains MP3, MP4, MP5 and MP6 neither produce an HMO or any other high-value product nor express the scrBR and scrYA operons. Instead, each of these strains bears one of more genomic copies of the gene encoding the enzyme SacC_Agal. Specifically, the strain MP5 expresses a single PglpF-driven copy of the sacC_Agal gene; the strain MP7 expresses two PglpF-driven copies of the sacC_Agal gene; the strain MP8 expresses three PglpF-driven copies of the sacC_Agal gene.

In the present Example, it was demonstrated that the integration of two PglpF-driven expression cassettes of a single gene, sacC_Agal, into the genome of the E. coli DH1 K12 strain confers the ability to grow on sucrose as a, or the main or the sole, carbon source and as a, or the main or the sole energy source, and at levels that are higher than other single-enzyme sucrose utilization systems (e.g. SacC_Msuc or SacA_Bsub), or at least at levels comparable to the established ScrBR-ScrYA system.

TABLE 5

Genotypes of the strains MP5, MP7, MP8 and MP2

| Strain ID | Genotype | Protein Sequence ID (GenBank) or sequence and SEQ ID NO: in seq listing |
|---|---|---|
| MP5 | MDO, x1 PglpF-sacC_Agal | WP_103853210.1 |
| MP7 | MDO, x2 PglpF-sacC_Agal | WP_103853210.1 |
| MP8 | MDO, x3 PglpF-sacC_Agal | WP_103853210.1 |
| MP2 | MDO, x2 GlcNAcT** x1 GalT***, x1 scrBR, x1 scrYA | WP_033911473.1** WP_001262061.1*** WP_000056853.1 (ScrB), WP_000851062.1 (ScrR), CAA40657.1 (ScrY) CAA40658.1 (ScrA) |

**GlcNAcT: beta-1,3-N-acetyloglucosamine transferase
***GalT: beta-1,4-galactosyltransferase Description of the Protocol Applied During Growth Monitoring Assays The strains disclosed in the present example were screened in 96 well microtiter plates using a 4-day protocol. During the first 24 hours, cells were grown to high densities while in the next 72 hours cells were transferred to a medium containing sucrose as the main carbon and energy source. Specifically, during day 1, fresh inoculums were prepared using a Luria-Bertani broth containing 20% glucose. After 24 hours of incubation of the prepared cultures at 34° C., cells were transferred to a basal minimal medium (200 uL) supplemented with magnesium sulphate and thiamine to which an initial bolus of 20% glucose solution and 15 g/L sucrose solution as carbon source was provided to the cells. After inoculation of the new medium, cells were shaken at 1200 rpm at 28° C. for 72 hours. The cells were grown in a batch mode of cultivation in microtiter plates that were compatible with the Varioskan LUX Multimode Microplate Reader from ThermoFisher Scientific.

Results of the Growth Monitoring Assays

Strains were tested in growth monitoring assays using the 72-hour protocol described above, with the cultures being operated at the batch mode in the presence of sucrose. To evaluate the ability of different strains to grow on sucrose as a function of their genetic makeup (i.e., expression of different proteins associated with distinct sucrose utilization systems), the raw data on culture absorbance (in 600 nm), reported by the Varioskan LUX system, was used to inspect the growth curves on sucrose for the strains tested. The data analysis software SkanIt was used to extract all growth curves and execute various calculations, including the specific growth rate on sucrose for each of the strains tested.

Figure 3:
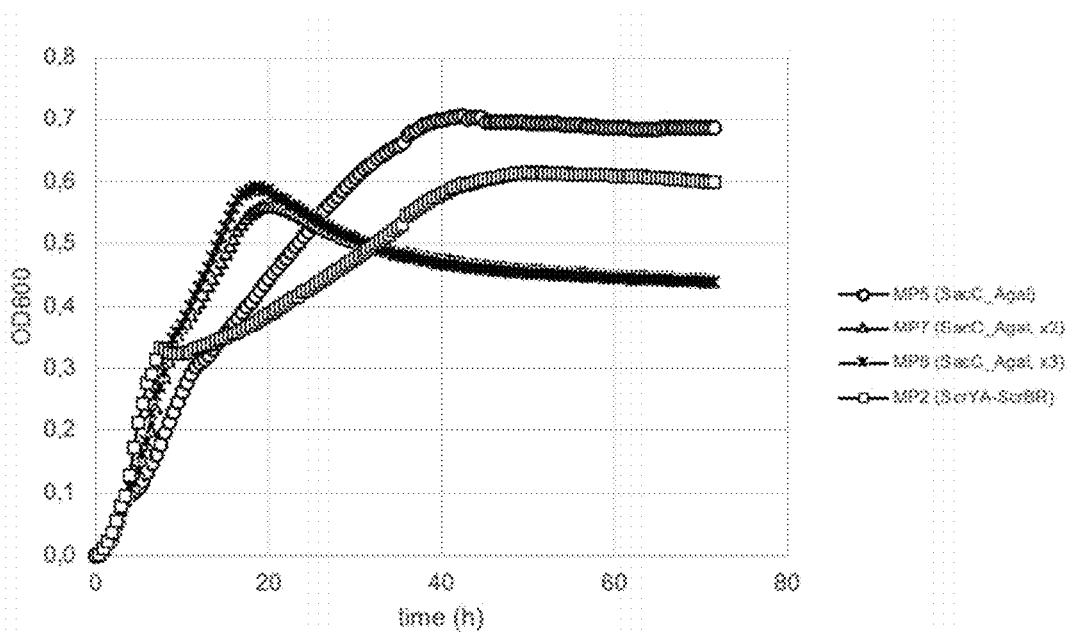
Figure 4:
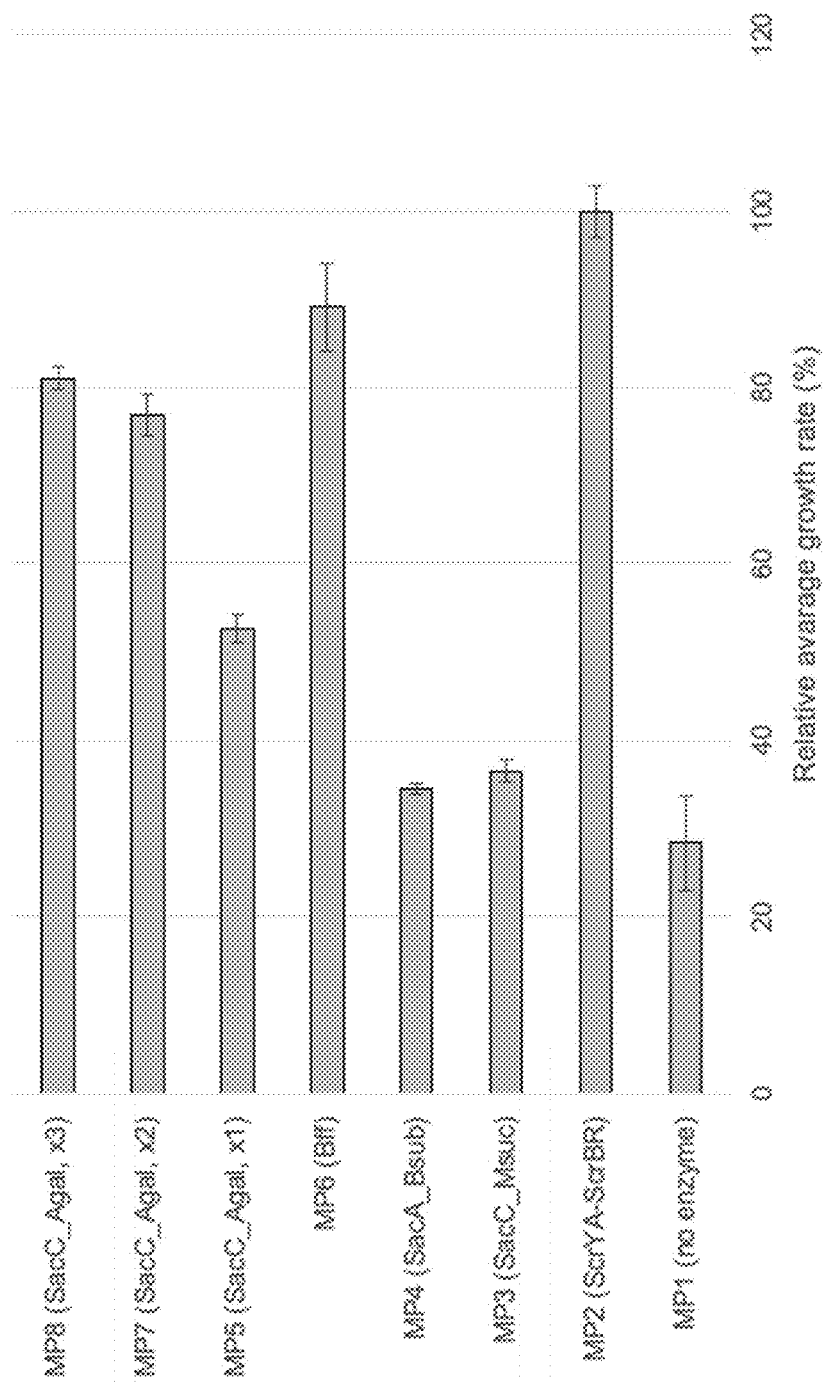

As shown in FIG. 3, the strain MP5, which bears a single sacC_Agal copy, can reach higher optical densities when grown on sucrose compared to strains with two (strain MP7) or three (strain MP8) PglpF-driven genomic copies of this gene. However, the growth rate of the strain MP5 at the early exponential phase of growth is lower than the one of the strains MP7 and MP8 (FIG. 4). Moreover, the strains with two (strain MP7) or three (strain MP8) PglpF-driven genomic copies of the sacC_Agal gene show very similar growth profiles (FIG. 3) and reach similar specific growth rates during exponential growth (FIG. 4).

In conclusion, two PglpF-driven genomic copies of the sacC_Agal gene suffice to make the MDO strain capable of utilizing sucrose almost as effective as the strain MP2, which expresses the ScrBR-ScrYA sucrose utilization system. Also, the sacC_Agal-conferred ability of E. coli DH1 K12 strain to grow efficiently on sucrose is superior to the one conferred by other single-enzyme sucrose utilization systems (e.g. SacC_Msuc or SacA_Bsub) both in terms of final optical densities being reached in batch cultures and growth rates reached in the exponential phase of growth (FIGS. 2 and 3).

In this manner, the present disclosure indicates an efficient strain engineering tool for producing flexi-fuel strains with an improved overall cellular physiology, which results from the presumably low metabolic burden of sacC_Agal-expressing cells.

Example 3—the SacC_Agal Sucrose Utilization Technology in an HMO Producing Host

In the present example the SacC_Agal sucrose invertase was introduced into the LNnT expressing host cell, identified in table 7 as MP2, exchanging the PEP-PTS sucrose system encoded by the scrYA, scrBR genes with two copies of the SacC_Agal gene. Furthermore, the SacC_Agal gene was either placed under control of the PglpF promoter (strains MP9 and MP10) or the sucrose dependent Pscr promoter (strains MP 11 and MP12). In addition, the effect of deleting the ptsG was tested in strains MP10 and MP12.

The genotypes of the strains are listed in table 7.

TABLE 7

Genotypes of MP2 and MP9 to 14

| StrainID | Genotype | Protein Sequence ID (GenBank) or sequence and SEQ ID NO: in seq listing |
|---|---|---|
| MP2 | MDO, x2 GlcNAcT** x1 GalT***, x1 scrBR, x1 scrYA | WP_033911473.1** WP_001262061.1*** WP_000056853.1 (ScrB), WP_000851062.1 (ScrR), CAA40657.1 (ScrY) CAA40658.1 (ScrA) |
| MP9 | MDO, x2 GlcNAcT** x1 GalT***, x2 PglpF-sacC_Agal | WP_033911473.1** WP_001262061.1*** WP_103853210.1 |
| MP10 | MDO, x2 GlcNAcT** x1 GalT***, x2 PglpF-sacC_Agal, ΔptsG | WP_033911473.1** WP_001262061.1*** WP_103853210.1 |
| MP11 | MDO, x2 GlcNAcT** x1 GalT***, x2 Pscr-sacC_Agal, | WP_033911473.1** WP_001262061.1*** WP_103853210.1 |
| MP12 | MDO, x2 GlcNAcT** x1 GalT***, x2 Pscr-sacC_Agal, ΔptsG | WP_033911473.1** WP_001262061.1*** WP_103853210.1 |

**GlcNAcT: beta-1,3-N-acetyloglucosamine transferase
***GalT: beta-1,4-galactosyltransferase Fermentation Protocol The E. coli strains were cultivated in 250 mL fermenters (Ambr 250 Bioreactor system, Sartorius) starting with 100 mL of mineral culture medium consisting of 31.2 g/L sucrose and a mineral medium comprised of $H_3PO_4$, $MgSO_4 \times 7H_2O$, KOH, citric acid, trace element solution, antifoam and thiamine. The dissolved oxygen level was kept at 23% by a cascade of first agitation and then airflow starting at 700 rpm (up to max 4500 rpm) and 1 VVM (up to max 3 VVM). The pH was kept at 6.8 by titration with 8.5% $NH_4OH$ solution. The cultivations were started with 2% (v/v) inoculums from pre-cultures comprise of 10 g/L sucrose, $(NH_4)_2HPO_4$, $KH_2PO_4$, $MgSO_4 \times 7H_2O$, KOH, NaOH, citric acid, trace element solution, antifoam and thiamine. After depletion of the sucrose contained in the batch medium, a sucrose containing feed solution was continuously added to the fermenter at a rate that maintained carbon-limiting conditions. The temperature was initially at 33° C. but was dropped to 27° C. after 20 hours of feeding. Lactose was added as a bolus addition at feed start of 25% lactose monohydrate solution and then every 32 hours to keep lactose from being a rate limiting factor. The growth, metabolic activity and metabolic state of the cells was followed by on-line measurements of reflectance and $CO_2$ evolution rate.

Results

The production of LNnT is shown as the molar % of the total HMO produced. The fermentations were done in duplicate except for strain MP10. The data is presented in FIG. 5.

Specifically, it can be seen that the strains with expressing sacC_Agal under the control of the PglpF promoter (strains MP9 and MP10) produced a higher amount of LNnT compared to the strain expressing the four gene PEP-PTS sucrose system. In particular, the strain which has an additional deletion of the glucose transporter ptsG (MP10) appear to have the potential to reach very high tittered LNnT production since the fermentation when terminated at 115 h, had not reached a plateau in the LNnT production.

Figure 5:
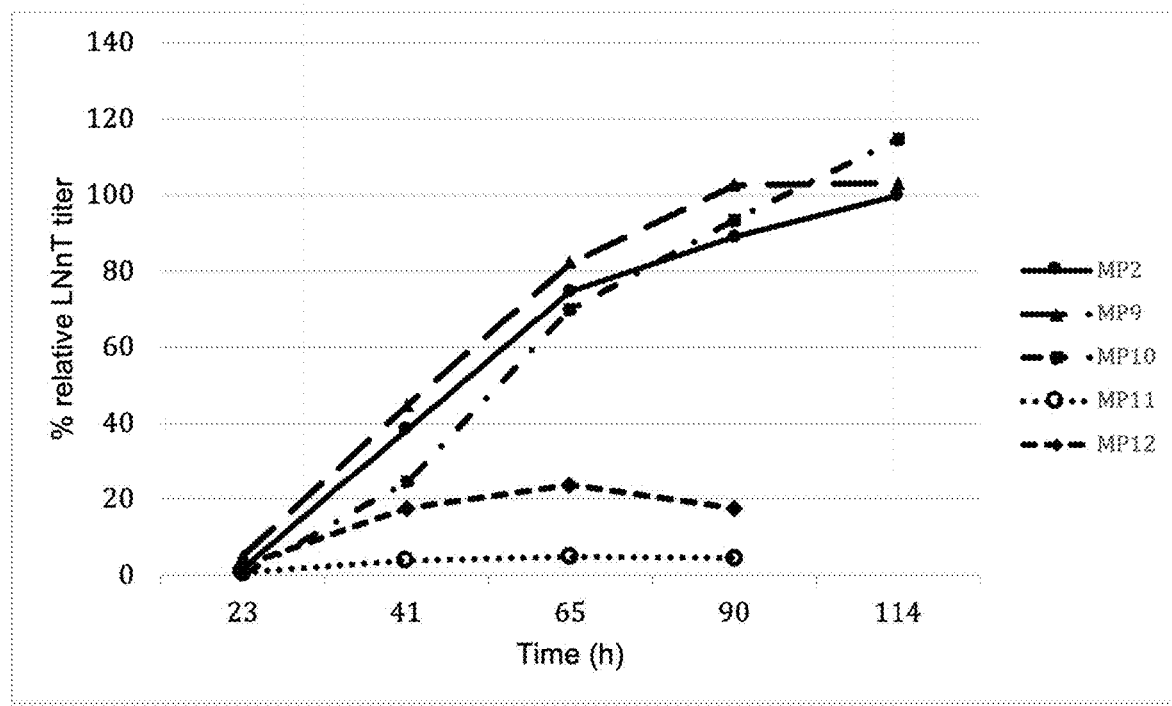

From FIG. 5 it was confirmed that the cell takes up very little sucrose as shown for the strains expressing sacC_Agal under control of the sucrose inducible promoter, Pscr (strains MP11 and MP12), which produced significantly less LNnT compared to the strains wherein the sacC_Agal expression was under control of the PglpF promoter. However, a positive effect of the ptsG deletion, regulating the glucose uptake is also observed for strain MP12 over strain MP11.

With respect to strain MP10, a further analysis was conducted with respect to by-products formation. For the MP10 strain the lactose was reduced 5.5-fold compared to the remaining lactose after fermentation of the MP2 strain. A reduced amount of lactose following fermentation is favourable since only a limited amount of lactose is allowed in the final product and it is preferable not to have to remove lactose in the down-stream processes following fermentation. Other by-products like LNT-II and pLNnH were also reduced with the MP10 strain compared to the MP2 strain (table 8).

TABLE 8

By-product formation.

| Strain | LNT-II/LNnT | pLNnH/LNnT |
|---|---|---|
| MP2 | 6-7% | 15% |
| MP10 | 3-5% | 11% |

Example 4—the SacC_Agal Sucrose Utilization Technology in E. coli Cells Producing the Complex Pentasaccharide LNFP-1

Description of the Genotype of Strains MP13, MP14 and MP15

Based on the platform strain ("MDO", MP1) described in example 1, the modifications summarised in Table 9 below, were made to obtain the fully chromosomal strains MP13, MP14 and MP15.

The strains can produce the pentasaccharide HMO LNFP-I, the tetrasaccharide HMO LNT and the trisaccharide HMO 2'-FL. The glycosyltransferase enzymes LgtA (a β-1,3-N-acetyloglucosamine transferase) from N. meningitidis, GalTK (a β-1,3-galactosyltransferase) from H. pylori, Smob (α-1,2-fucosyltransferase) from S. mobilis and the heterologous MFS transporter Nec from Rosenbergiella nectarea. are present in all three strains. Contrary to the strain MP13, the strains MP14 and MP15 can utilize sucrose as the carbon and energy source since the gene sacC_Agal from Avibacterium gallinarum is integrated on their genome in one or two loci, respectively.

This invention demonstrates how the introduction of an extracellular invertase such as SacC_Agal can be advantageously used to confer an engineered E. coli that produces the complex pentasaccharide LNFP-I the ability to utilize sucrose as carbon and/or energy source. The only difference between the strains MP13 and MP14 or MP15, as shown in the table below, is the absence of the SacC_Agal enzyme from the former and its presence in the latter two strains. Although the strain MP14 bears a single PglpF-driven copy of the sacC_Agal gene, the strain MP15 bears two such copies.

In the present Example, it is demonstrated that sacC_Agal-expressing cells not only grow robustly in batch cultures containing sucrose, but they also produce LNFP-I at high titers in fed-batch fermentation processes.

TABLE 9

Genotypes of the strains MP13, MP14 and MP15

| Strain ID | Genotype | Heterologous Protein Sequence ID (GenBank) |
|---|---|---|
| MP13 | MDO, x2 GlcNAcT[1], x1 GalTK[2], x1 CA[3], x1 smob[4], x1 PglpF-nec[6] | WP_033911473.1 BD182026.1 (modified)[5] WP_126455392.1 WP_092672081.1 |
| MP14 | MDO, x2 GlcNAcT[1], x1 GalTK[2], x1 CA[3], x1 smob[4], x1 PglpF-nec[6], x1 PglpF-sacC_Agal[7] | WP_033911473.1 BD182026.1 (modified)[5] WP_126455392.1 WP_092672081.1 WP_103853210.1 |
| MP15 | MDO, x2 GlcNAcT[1], x1 GalTK[2], x1 CA[3], x1 smob[4], x1 PglpF-nec[6], x2 PglpF-sacC_Agal[7] | WP_033911473.1 BD182026.1 (modified)[5] WP_126455392.1 WP_092672081.1 WP_103853210.1 |

[1]GlcNAcT: gene coding for the β-1,3-N-acetyloglucosamine transferase LgtA of SEQ ID NO: 55
[2]GalTK: gene coding for the β-1,3-galactosyltransferase GalTK of SEQ ID NO: 57
[3]CA: extra colanic acid gene cluster (gmd-wcaG-wcaH-wcaI-manC-manB) at a locus that is different than the native locus (see for example PCT/EP2021/086932 SEQ ID NO: 30)
[4]smob: gene coding for α-1,2-fucosyltransferase of SEQ ID NO: 58
[5]BD182026.1 (modified): compared to BD182026.1, the applied β-1,3-galactosyltransferase sequence has two deletions of 12 and 30 amino acids and shares 90% identity in the homologous regions
[6]nec: MFS transporter with GenBank accession ID GenBank accession ID WP_092672081.1 under control of PglpF promoter
[7]sacC_Agal: sucrose invertase of SEQ ID NO: 1

Description of the Protocol Applied During Growth Monitoring Assays

The strains disclosed in the present example were screened in 96 well microtiter plates using a 2,5-day protocol. During the first 24 hours, cells were grown to high densities while in the next 36 hours cells were transferred to a medium containing sucrose as the main carbon and energy source. Specifically, during day 1, fresh inoculums were prepared using a Luria-Bertani broth containing 20% glucose. After 24 hours of incubation of the prepared cultures at 34° C., cells were transferred to a basal minimal medium (200 uL) supplemented with magnesium sulphate and thiamine to which an initial bolus of 20% glucose solution and 15 g/L sucrose solution as carbon source was provided to the cells. After inoculation of the new medium, cells were shaken at 1200 rpm at 28° C. for 72 hours. The cells were grown in a batch mode of cultivation in microtiter plates that were compatible with the Varioskan LUX Multimode Microplate Reader from ThermoFisher Scientific.

Fermentation Protocol

The E. coli strains were cultivated in 250 mL fermenters (Ambr250 HT Bioreactor system, Sartorius) starting with 100 mL of mineral culture medium consisting of 30 g/L glucose or sucrose (AL-X16 and AL-X17 respectively) and a mineral medium comprised of $NH_4H_2PO_4$, $KH_2PO_4$, $MgSO_4 \times 7H_2O$, NaOH, citric acid, trace element solution, antifoam and thiamine. The dissolved oxygen level was kept at 20% by a cascade of first agitation and then airflow starting at 700 rpm (up to max 4500 rpm) and 1 VVM (up to max 3 VVM). The pH was kept at 6.8 by titration with 8.5% $NH_4OH$ solution. The cultivations were started with 2% (v/v) inoculums from pre-cultures comprised of 10 g/L glucose (AL-X16) or sucrose (AL-X17), $(NH_4)_2HPO_4$, $KH_2PO_4$, $MgSO_4 \times 7H_2O$, KOH, NaOH, citric acid, trace element solution, antifoam and thiamine. After depletion of the glucose or sucrose contained in the basal minimal medium, a glucose (AL-X16) or sucrose- (AL-X17) containing feed solution was continuously added to the fermenter at a rate that maintained carbon-limiting conditions.

The temperature was initially at 33° C. but was dropped to 30° C. after 3 hours of feeding. Lactose was added as a bolus addition of 25% lactose monohydrate solution 36 hours after feed start and then every 19 hours to keep lactose from being a rate limiting factor. The growth, metabolic activity and metabolic state of the cells was followed by on-line measurements of reflectance and $CO_2$ evolution rate. Throughout the fermentations, samples were taken to determine the concentration of HMO products, lactose and other minor by-products using HPLC.

Results of the Growth Monitoring in Assays

Strains were tested in growth monitoring assays using the 60-hour protocol described above, with the cultures being operated at the batch mode in the presence of sucrose. To evaluate the ability of different strains to grow on sucrose as a function of their genetic makeup (i.e., expression or not of the SacC_Agal enzyme that is directly associated with sucrose utilization), the raw data on culture absorbance (in 600 nm), reported by the Varioskan LUX system, was used to inspect the growth curves on sucrose for the strains tested, namely MP13, MP15 and MP15. The data analysis software SkanIt was used to extract all growth curves and execute various calculations.

Figure 6:
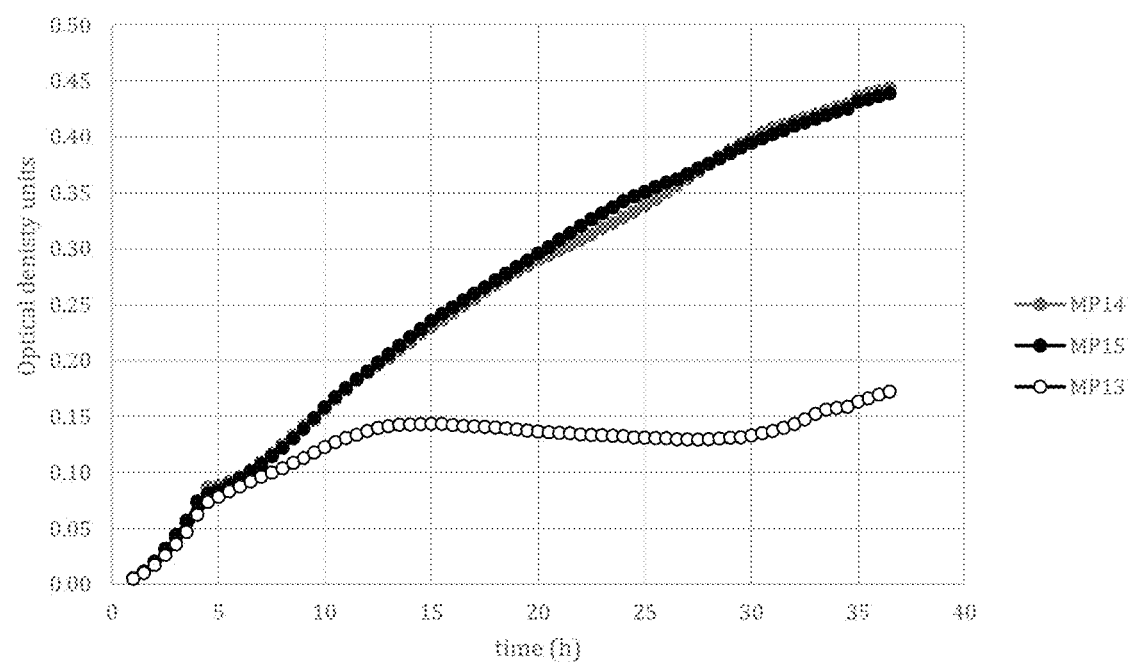

As shown in FIG. 6, the strain MP13, which does not bear the sacC_Agal on its genome, cannot grow on the sucrose that is provided in the medium being present in the prepared batch cultures. After a little growth (due to the provided low levels of glucose and the potentially partially degraded sucrose that could be present in the medium), the strain MP13 has a flat growth profile (FIG. 6). On the contrary, the strain MP14 and MP15, which bear a single or two PglpF-driven copies of the sacC_Agal gene, respectively, grow nicely on sucrose over time and reach much higher optical density values than the strain MP13 (FIG. 6). It is also noteworthy that the strains MP14 and MP15 have an almost identical growth profile, which indicates that a single PglpF-driven copy of the sacC_Agal gene should be sufficient to support robust growth on sucrose (FIG. 6).

In this manner, the present disclosure indicates an efficient strain engineering tool for producing flexi-fuel strains (capable of growing on more than one carbon source) with a normal cell physiology, which could indicate a presumably low metabolic burden in sacC_Agal-expressing cells compared to other multi-gene sucrose utilization technologies that are known in the art (e.g., scrBRYA).

In the present example the SacC_Agal sucrose invertase was introduced into the LNFP-I expressing host cell, identified in table 9 as MP13. In detail, the sacC_Agal gene was placed under control of the PglpF promoter and integrated in the chromosome in a single (strain MP14) or two copies (strain MP15). Also, it is hereby demonstrated that sacC_A-gal-expressing cells not only grow robustly in batch cultures containing sucrose, but they also produce LNFP-I at high titers in fed-batch fermentation processes as shown in the fermentation results below.

Fermentation Results

The production of LNFP-I, LNT, 2'FL and LNT-II is shown as the fraction % of the total HMO produced. A single fermentation was run with the strain MP13, while the fermentations of the strain MP9 were done in duplicate. The fermentation end-point data is presented in Table 10. In general, in the selected fermentation processes, both strains MP13 and MP15 were producing LNFP-I at high levels and similar titers.

Specifically, the strain that cannot grow on sucrose, namely MP13, provided an HMO profile that consisted of 3 HMOs when a glucose-based process (AL-X16) was implemented. In detail, the HMO profile of the strain MP13 contains approximately 95% LNFP-I, 1% LNT and 4% 2'-FL (Table 10). On the contrary, the strain expressing sacC_Agal under the control of the PglpF promoter (strain MP15) produced a higher amount of 2'-FL compared to the strain MP13 when a sucrose-based process (AL-X17) was implemented. In particular, the HMO profile of the strain MP15 contains approximately 90% LNFP-I, and 10% 2'-FL, but no LNT (Table 10).

In conclusion, the SacC_Agal sucrose utilization technology enables the high-level LNFP-I production using an accordingly engineered cell, which provides an HMO profile that is highly similar to the one obtained using glucose as the carbon source. There is, though, a trend regarding the amounts of 2'-FL in the end of the fermentation, which tend to be slightly higher (approximately 5%) for sucrose-rather than for non-sucrose-utilizing LNFP-I strains, while the LNT HMO by-product is completely gone in the sucrose-utilizing strains providing a pure blend of LNFP-I and 2'FL.

TABLE 10

HMO blend composition in total broth sample at fermentation timepoint 89 h. The strain MP13 grows on glucose (process AL-X16) while the strain MP15 (two independent runs) expresses the SacC__Agal enzyme and can thus utilize sucrose as the carbon and/or energy source (process AL-X17).

| Fermentation Batch ID GDF22xxx | Strain | Process ID | LNFP-I/ HMO (%) | 2'-FL/ HMO (%) | LNT/ HMO (%) | LNT-II/ HMO (%) |
|---|---|---|---|---|---|---|
| 240 | MP13 | AL-X16 | 94.9 | 4.2 | 0.9 | 0.0 |
| 243 | MP15 | AL-X17 | 90.5 | 9.5 | 0.0 | 0.0 |
| 244 | MP15 | AL-X17 | 90.3 | 9.7 | 0.0 | 0.0 |

The invention claimed is:

1. A genetically modified cell capable of producing one or more Human Milk Oligosaccharides (HMOs), which comprises a heterologous nucleic acid sequence encoding an invertase, wherein the invertase is SacC Agal comprising the amino acid sequence of SEQ ID NO: 1 or a functional homologue thereof, having an amino acid sequence which is at least 90% identical to SEQ ID NO: 1, wherein the cell further comprises at least one additional heterologous nucleic acid sequence encoding one or more functional enzymes with glycosyltransferase activity.

2. The genetically modified cell according to claim 1, wherein an endogenous glucose transport system is fully or partially inactivated.

3. The genetically modified cell according to claim 2, wherein the ptsG gene of the endogenou glucose transport system, encoding a cytoplasmic-membrane glucose permease is fully or partially inactivated.

4. The genetically modified cell according to claim 1, wherein the heterologous nucleic acid sequence encoding the invertase comprises a nucleic acid sequence encoding a signal peptide capable of enhancing the continuous secretion of the invertase into the periplasm of the genetically modified cell or into the extracellular medium, wherein the signal peptide is selected from the group consisting of SEQ ID Nos: 5, 6, 7, 8, 9, 10, 11, 12, 13, 14, 15, 16, 17, 18, 19, 20, 21, 22, 23, 24, 25, 26, 27 and 29.

5. The genetically modified cell according to claim 1, wherein the invertase is capable of hydrolysing non-phosphorylated sucrose into fructose and glucose in the periplasmic space or on the extracellular side of the cell.

6. The genetically modified cell according to claim 1, wherein the heterologous nucleic acid sequence encodes an episomal and/or genomically integrated copy of the invertase.

7. The genetically modified cell according to claim 6, wherein the cell comprises at least two genomically integrated copies of the heterologous nucleic acid sequence encoding the invertase.

8. The genetically modified cell according to claim 1, wherein the expression of the invertase enables utilization of sucrose as the main carbon or energy source of the genetically modified cell.

9. The genetically modified cell according to claim 1, wherein the invertase does not transport sucrose.

10. The genetically modified cell according to claim 1, wherein the cell does not contain a complete sucrose utilization system.

11. The genetically modified cell according to claim 1, wherein the heterologous nucleic acid sequence(s) further comprises one or more regulatory elements for regulating the expression of the heterologous nucleic acid sequence(s) encoding the invertase.

12. The genetically modified cell according to claim 11, wherein the one or more regulatory elements comprise one or more inducible promoter sequence or one or more constitutive promoter sequences.

13. The genetically modified cell according claim 11, wherein the regulatory element is a promoter selected from the group consisting of PmglB_70UTR_SD8, PmglB_70UTR_SD10, PmglB_54UTR, Plac_70UTR, PmglB_70UTR_SD9, PmglB_70UTR_SD4, PmglB_70UTR_SD5, PglpF_SD4, PmglB_70UTR_SD7, PmglB_70UTR, PglpA_70UTR PglpT_70UTR and PglpF.

14. The genetically modified cell according to claim 11, wherein the regulatory element comprises a constitutive promoter selected from the group consisting of CP6, PosmY, Pspc, Pbla, Prrn1 and Prrn2.

15. The genetically modified cell according to claim 1, wherein the genetically modified cell is a yeast cell of the genera Komagataella, *Kluyveromyces, Yarrowia, Pichia, Saccaromyces, Schizosaccharomyces,* or *Hansenula*; a filamentous fungous of the genera *Aspargillus, Fusarium,* or *Thricoderma*; or a procaryotic cell selected from the group consisting of *Escherichia* sp., *Bacillus* sp., *lactobacillus* sp. and *Campylobacter* sp.

16. A method for the biosynthetic production of one or more HMOs, the method comprising the steps of:
  a) providing a genetically modified cell capable of producing one or more Human Milk Oligosaccharides (HMOs) according to claim 1,
  b) culturing the cell of (a) in a suitable cell culture medium, containing sucrose as a carbon source,
  c) harvesting the one or more HMOs produced in step (b).

17. The method for the biosynthetic production of one or more HMOs according to claim 16, wherein the invertase in the genetically modified cell of step a) on its own is capable of hydrolysing sucrose into fructose and glucose on the extracellular side or in the periplasmic space of the genetically modified cell, and wherein the expression of the enzyme is sufficient to enable utilization of sucrose as a carbon or energy source of the genetically modified cell.

18. The method for the biosynthetic production of one or more HMOs according to claim 16, wherein the sucrose in step b) is the sole carbon source and energy source.

19. A method for biosynthetic production in a genetically modified host cell of claim 1, the method comprising the steps of:
  a) providing a non-sucrose-utilizing (Suc$^-$) host cell or a host cell with limited and/or inefficiently ability to utilize sucrose capable of producing the desired biosynthetic product,
  b) introducing into the host cell a heterologous nucleic acid sequence encoding an invertase, wherein said invertase is SacC Agal comprising the amino acid sequence of SEQ ID NO: 1 or a functional homologue thereof, having an amino acid sequence which is at least 90% identical to SEQ ID NO: 1,
  c) culturing the cell of (b) in a suitable cell culture medium, containing sucrose as the main and/or the sole carbon source and/or as the main and/or the sole energy source, and
  d) harvesting the biosynthetic product produced in step c).

20. The method according to claim 19, wherein an endogenous ptsG gene of the host cell, encoding a glucose permease is fully or partially inactivated.

* * * * *